(12) United States Patent
Sasaki et al.

(10) Patent No.: US 7,333,296 B2
(45) Date of Patent: Feb. 19, 2008

(54) MAGNETIC HEAD FOR PERPENDICULAR MAGNETIC RECORDING INCLUDING POLE-LAYER-ENCASING LAYER THAT OPENS IN THE TOP SURFACE THEREOF AND NONMAGNETIC CONDUCTIVE LAYER DISPOSED ON THE TOP SURFACE OF THE POLE-LAYER-ENCASING LAYER

(75) Inventors: Yoshitaka Sasaki, Milpitas, CA (US); Hironori Araki, Milpitas, CA (US); Shigeki Tanemura, Milpitas, CA (US); Takehiro Horinaka, Milpitas, CA (US)

(73) Assignee: Headway Technologies, Inc., Milipitas, CA (US)

( * ) Notice: Subject to any disclaimer, the term of this patent is extended or adjusted under 35 U.S.C. 154(b) by 366 days.

(21) Appl. No.: 10/959,140

(22) Filed: Oct. 7, 2004

(65) Prior Publication Data

US 2006/0077589 A1    Apr. 13, 2006

(51) Int. Cl.
*G11B 5/147* (2006.01)
(52) U.S. Cl. ...................................................... 360/126
(58) Field of Classification Search ................ 360/126, 360/125; 29/603.14, 603.01, 603.13
See application file for complete search history.

(56) References Cited

U.S. PATENT DOCUMENTS

| | | | | |
|---|---|---|---|---|
| 4,656,546 A | 4/1987 | Mallory | ....................... | 360/110 |
| 4,672,493 A | 6/1987 | Schewe | ....................... | 360/125 |
| 5,629,242 A | 5/1997 | Nagashima | | |
| 5,802,700 A * | 9/1998 | Chen et al. | ............... | 29/603.14 |
| 6,072,670 A * | 6/2000 | Furuichi et al. | ............ | 360/126 |
| 6,180,421 B1 * | 1/2001 | Futai et al. | ..................... | 438/3 |
| 6,369,984 B1 * | 4/2002 | Sato | .......................... | 360/126 |
| 6,504,675 B1 | 1/2003 | Shukh et al. | ............... | 360/125 |
| 6,587,316 B2 | 7/2003 | Hasegawa | ................ | 360/324.1 |
| 6,710,973 B2 | 3/2004 | Okada et al. | ............... | 360/125 |
| 7,120,988 B2 * | 10/2006 | Le et al. | .................. | 29/603.07 |
| 2003/0151850 A1 | 8/2003 | Nakamura et al. | .......... | 360/125 |
| 2006/0077590 A1 | 4/2006 | Sasaki | | |

FOREIGN PATENT DOCUMENTS

| | | |
|---|---|---|
| JP | A-7-245306 | 9/1995 |
| JP | A 10-105921 | 4/1998 |
| JP | A 2000-31147 | 1/2000 |
| JP | A 2001-14610 | 1/2001 |
| JP | A 2002-76472 | 3/2002 |
| JP | A 2002-92821 | 3/2002 |
| JP | A 2003-203311 | 7/2003 |
| JP | A 2003-242607 | 8/2003 |
| JP | A 2004-165434 | 6/2004 |

\* cited by examiner

Primary Examiner—Julie Anne Watko
(74) Attorney, Agent, or Firm—Oliff & Berridge, PLC

(57) ABSTRACT

A pole layer is disposed in a groove of a pole-layer-encasing layer made of a nonmagnetic material with a nonmagnetic film disposed between the encasing layer and the pole layer. A polishing stopper layer made of a nonmagnetic conductive material is disposed on the top surface of the encasing layer. The polishing stopper layer indicates the level at which polishing for controlling the thickness of the pole layer is stopped. The polishing stopper layer has a penetrating opening, and the edge of the opening is located directly above the edge of the groove located in the top surface of the encasing layer.

3 Claims, 44 Drawing Sheets

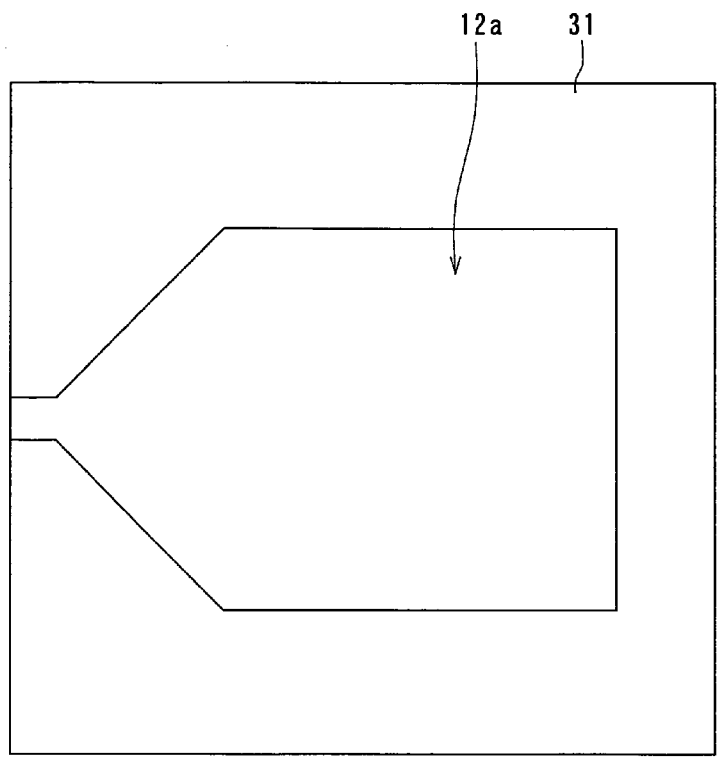
FIG. 4A
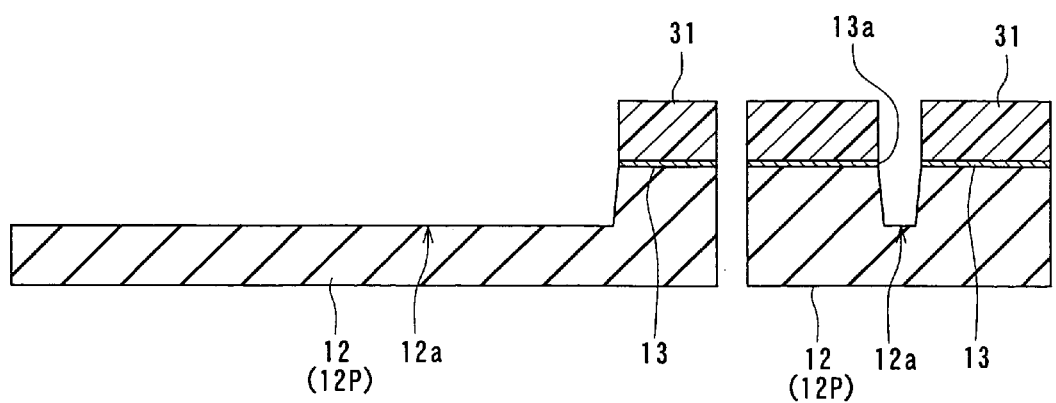
FIG. 4B
FIG. 4C

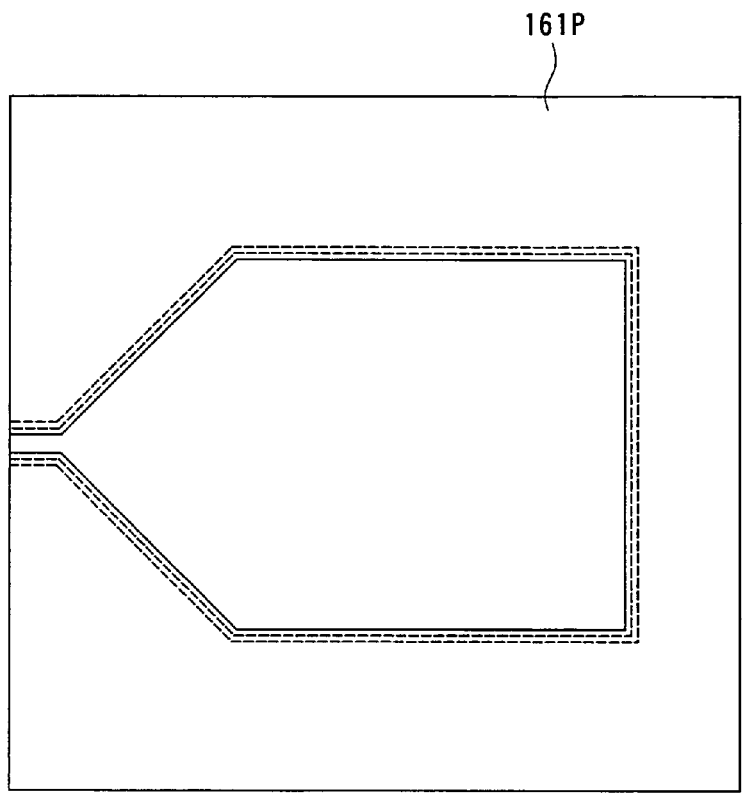
FIG. 5A
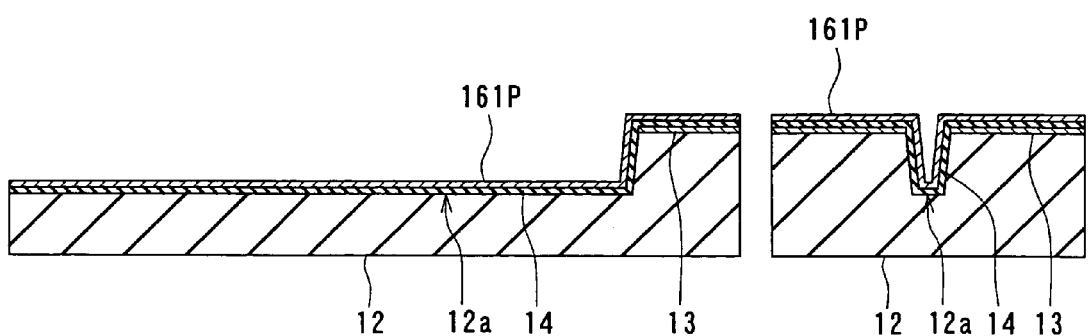
FIG. 5B
FIG. 5C

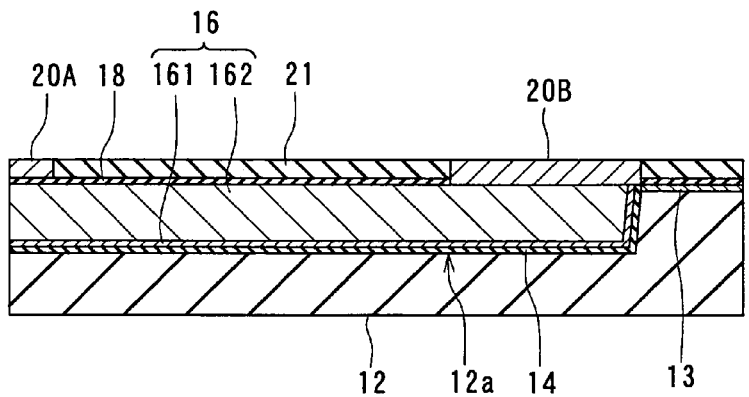 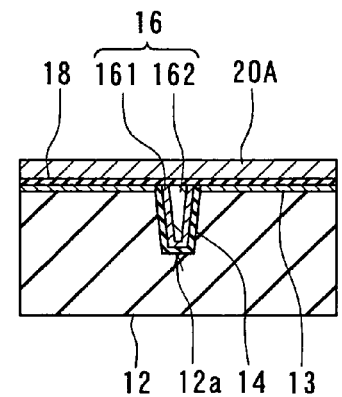
FIG. 9A    FIG. 9B
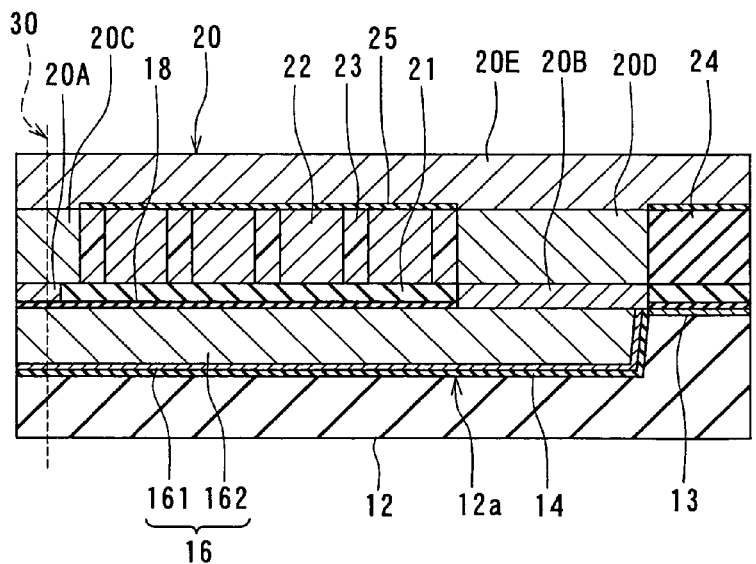 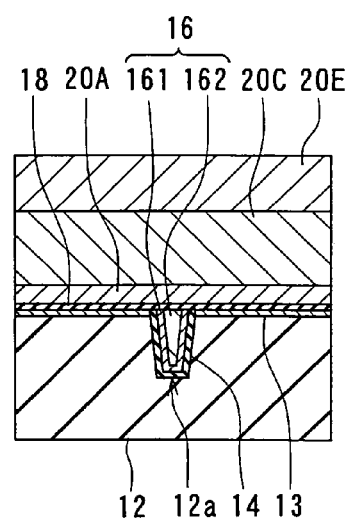
FIG. 10A    FIG. 10B

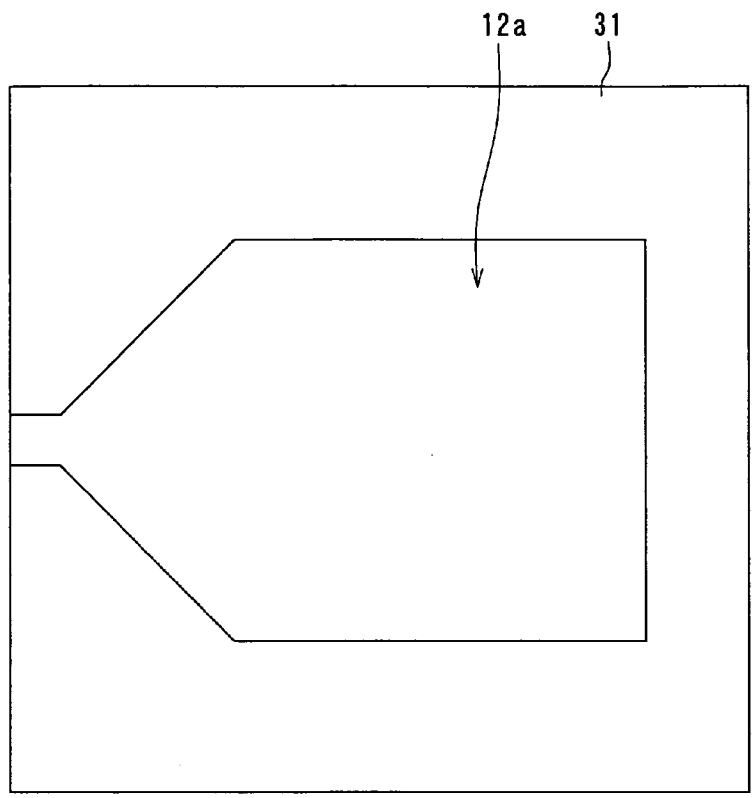
FIG. 16A
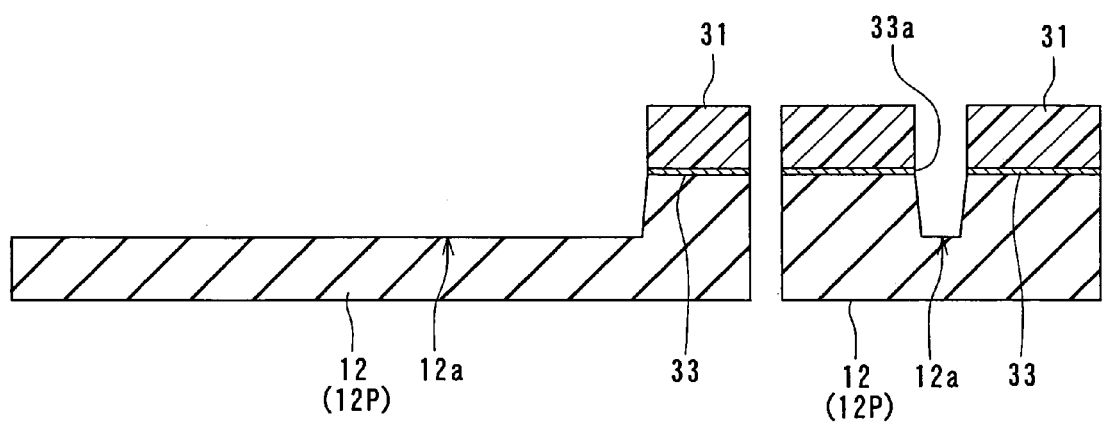
FIG. 16B
FIG. 16C

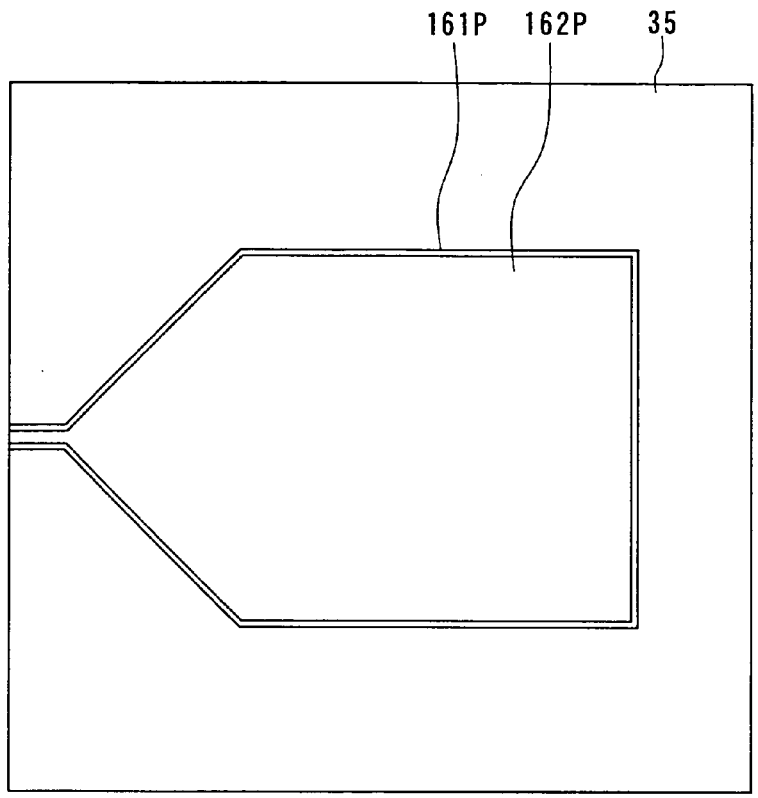
FIG. 20A
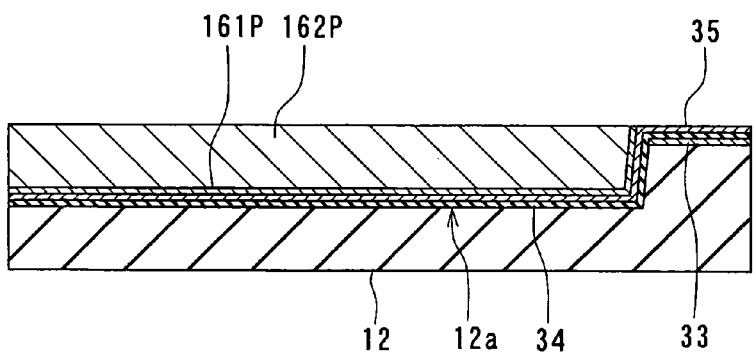 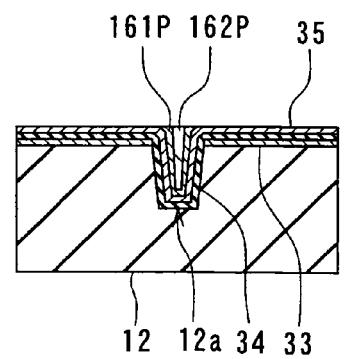
FIG. 20B  FIG. 20C

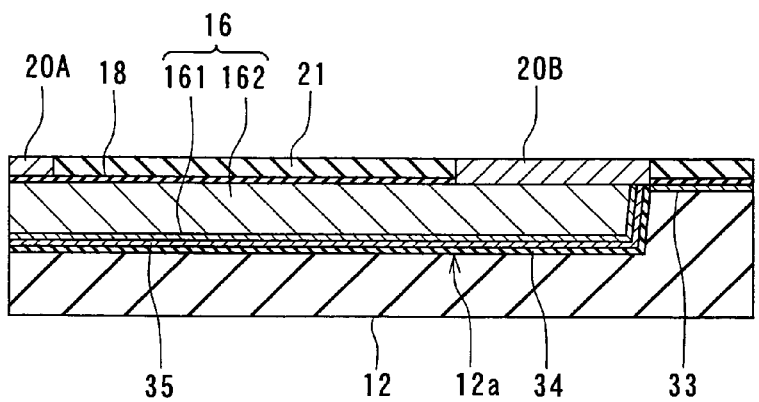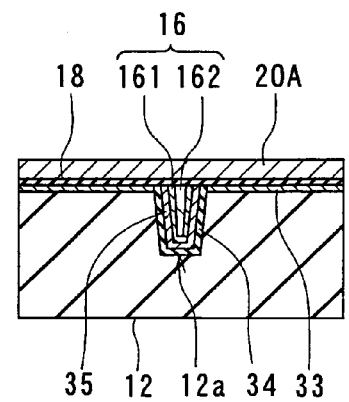
FIG. 22A  FIG. 22B
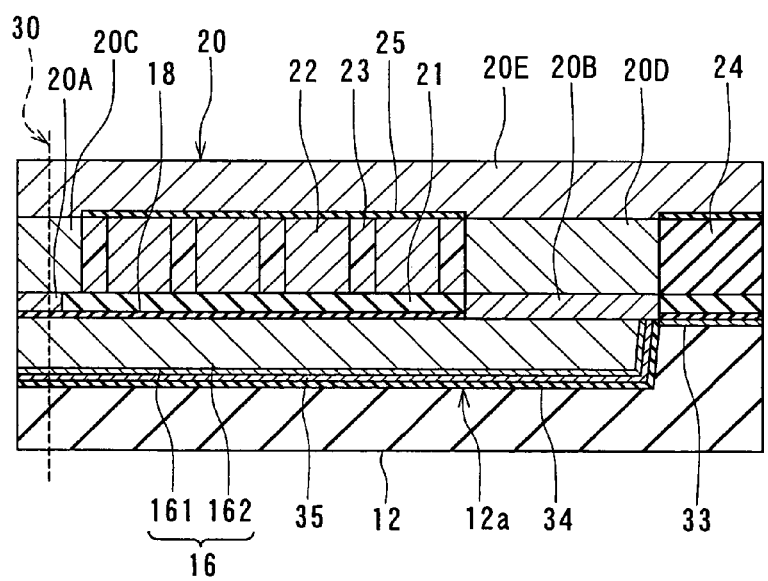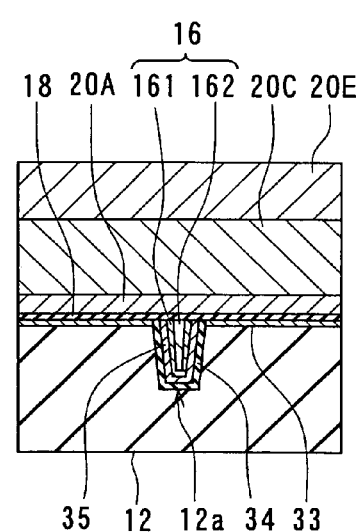
FIG. 23A  FIG. 23B

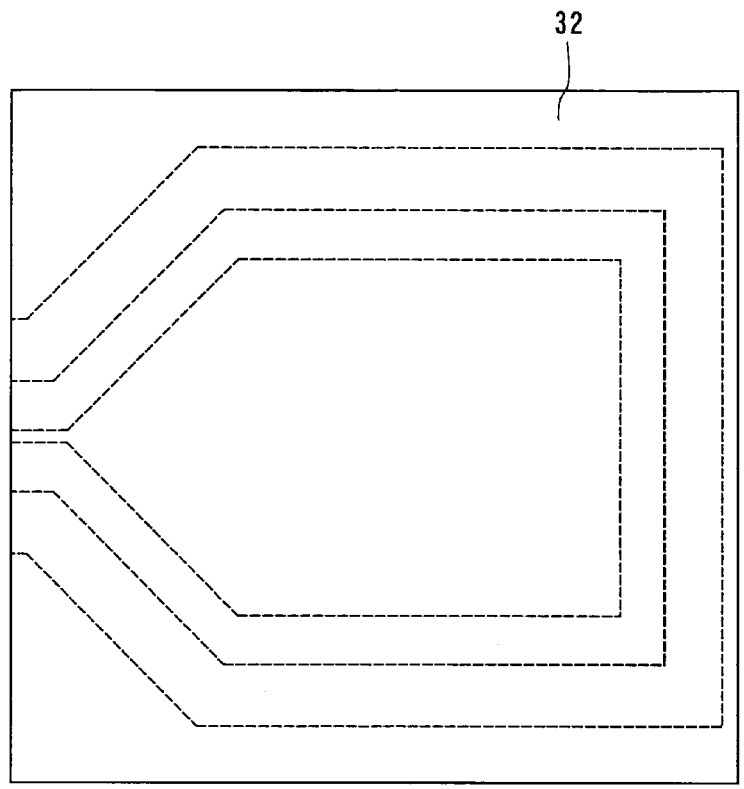
FIG. 25A
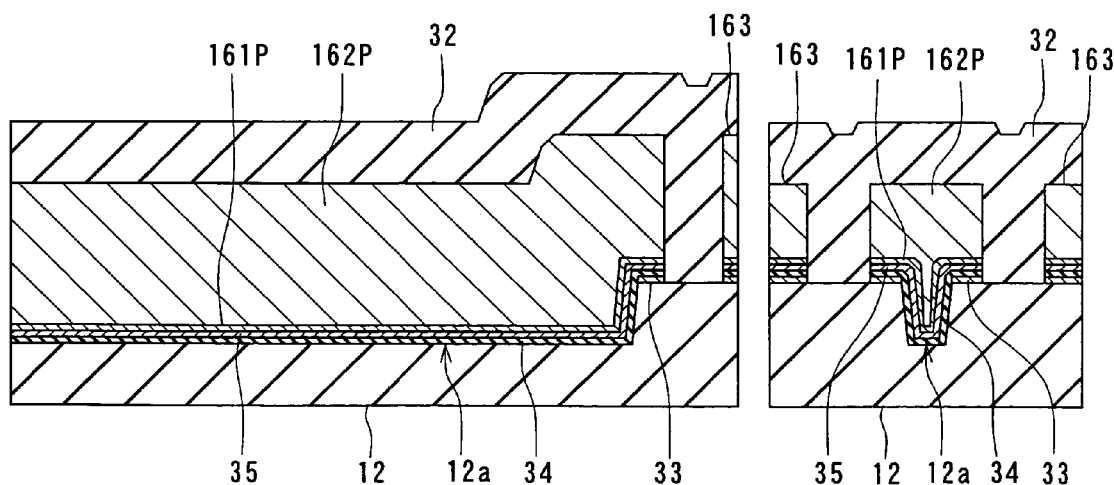
FIG. 25B
FIG. 25C

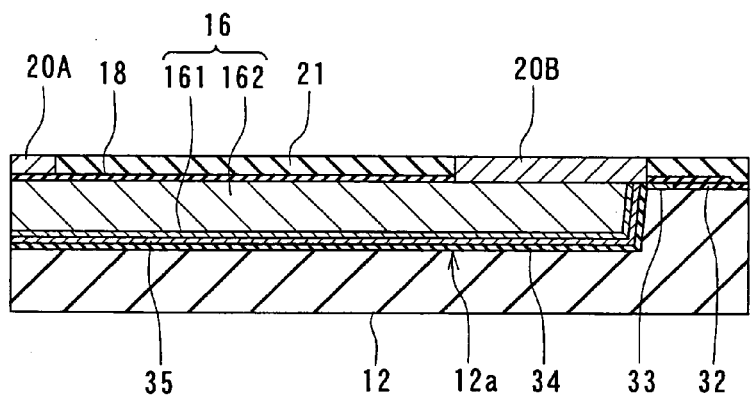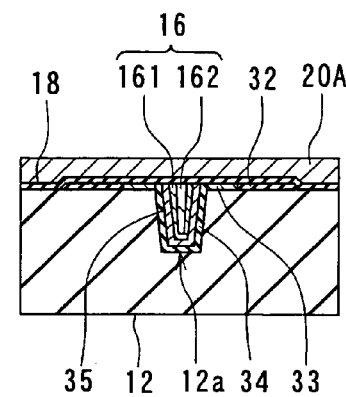
FIG. 29A  FIG. 29B
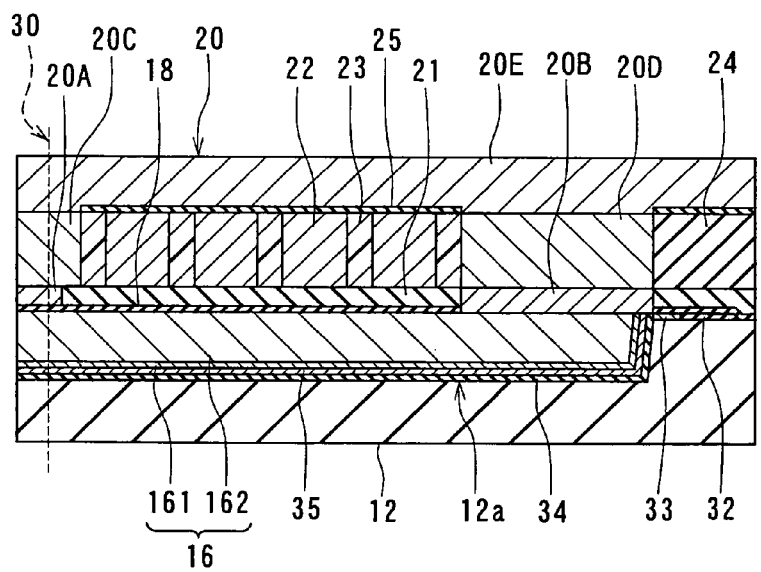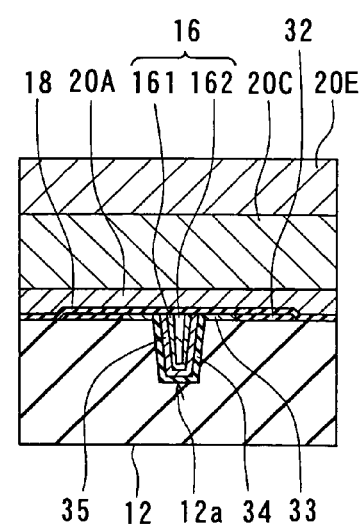
FIG. 30A  FIG. 30B

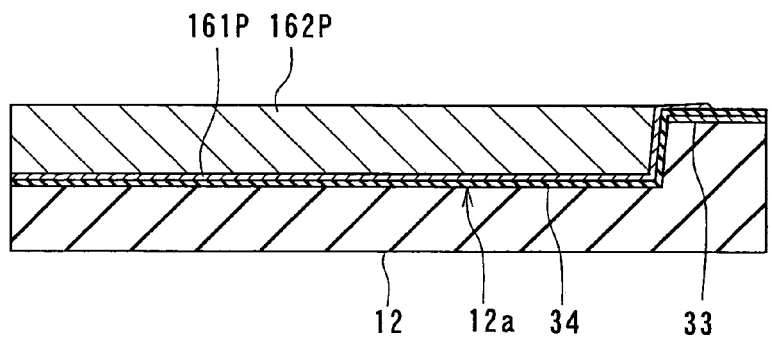 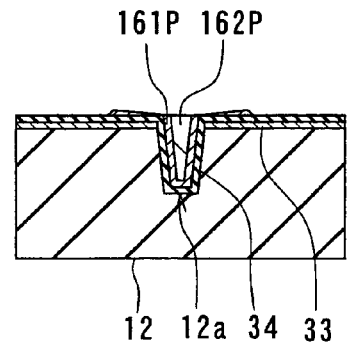
FIG. 35A  FIG. 35B
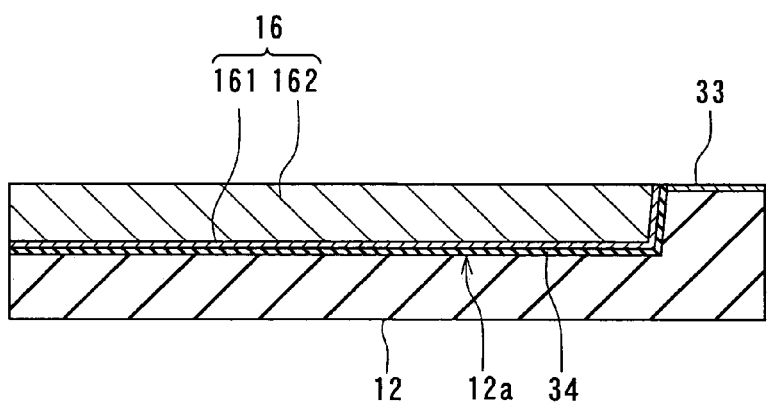 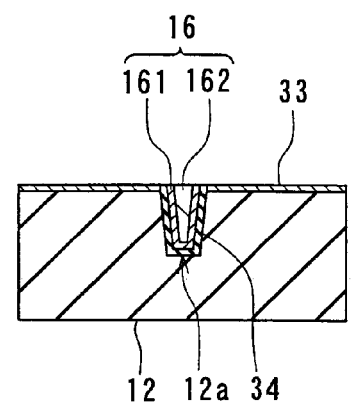
FIG. 36A  FIG. 36B

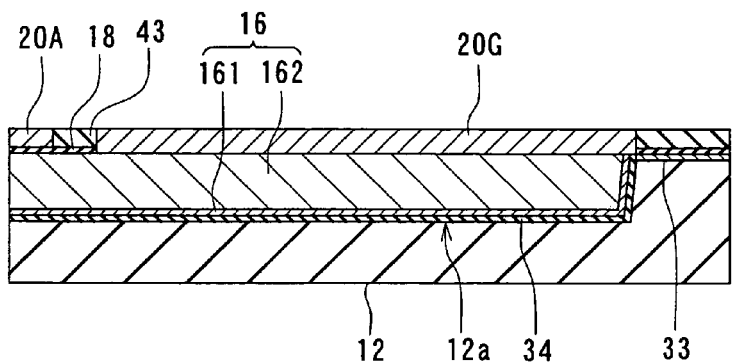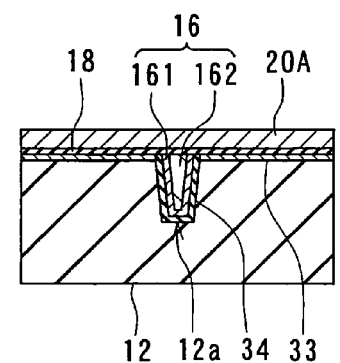
FIG. 37A  FIG. 37B
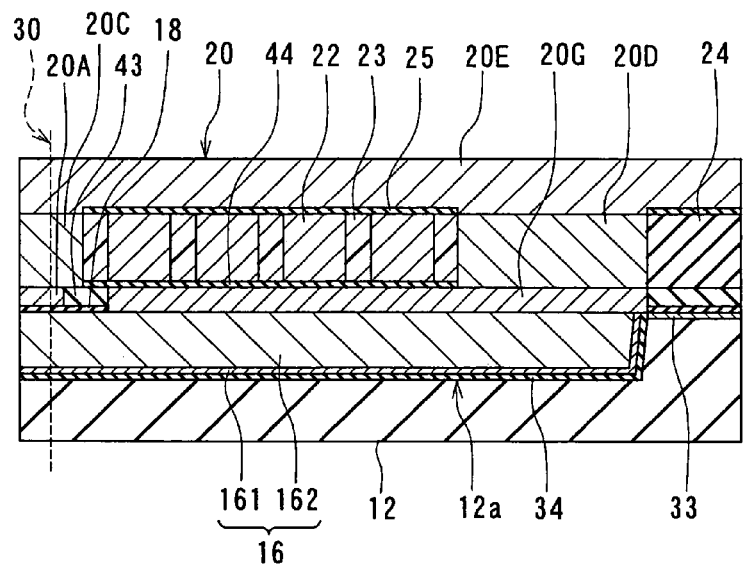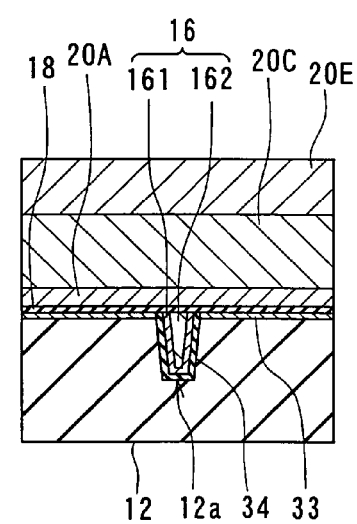
FIG. 38A  FIG. 38B

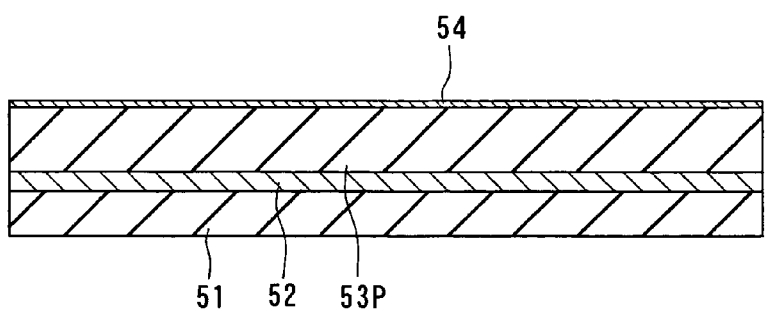 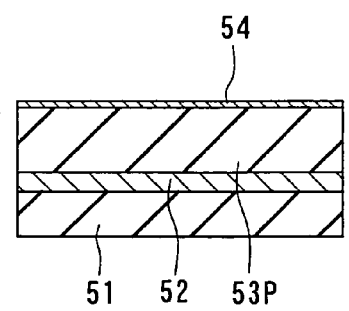
FIG. 41A                    FIG. 41B
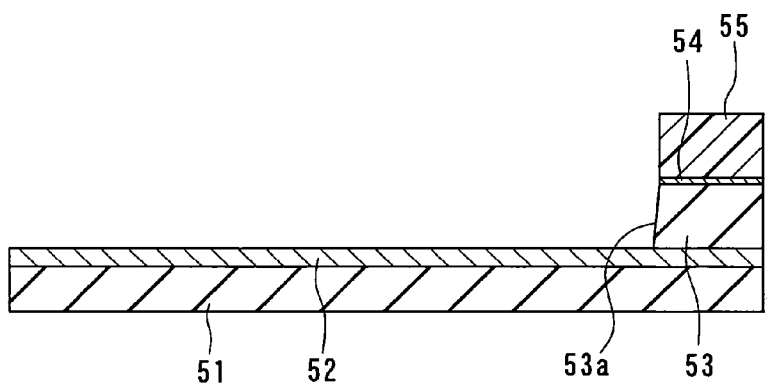 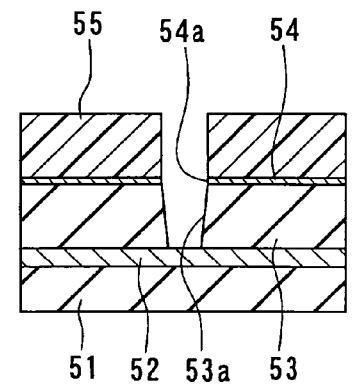
FIG. 42A                    FIG. 42B

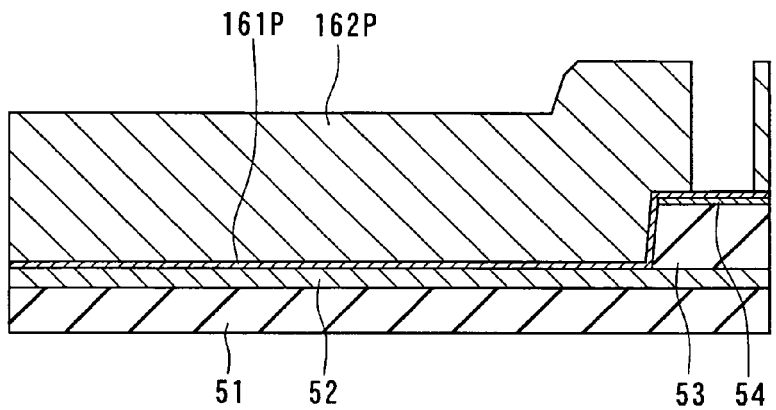 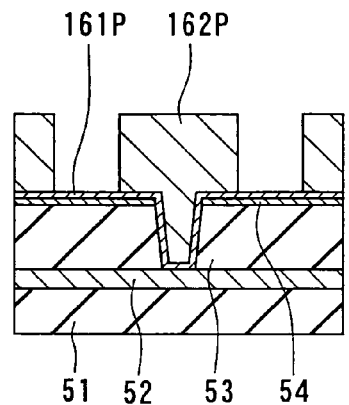
FIG. 43A    FIG. 43B
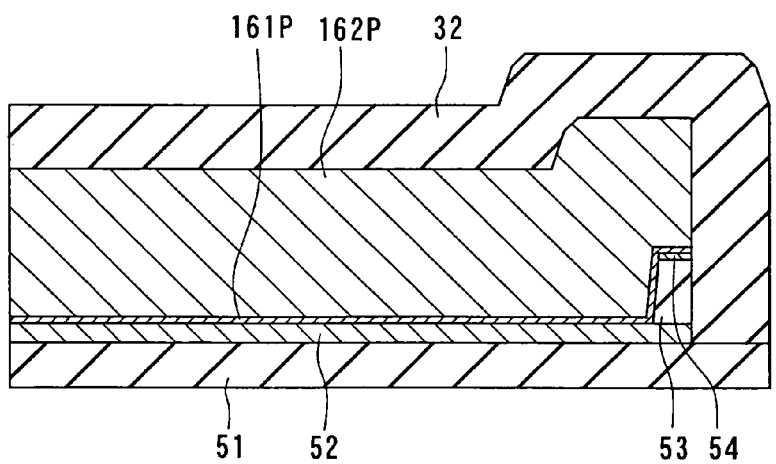 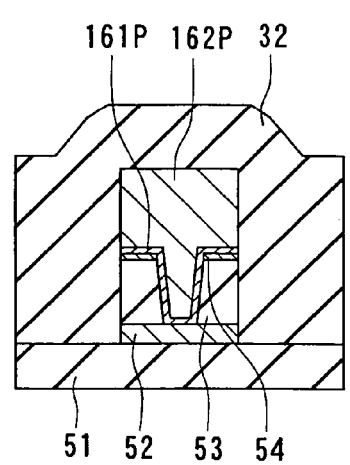
FIG. 44A    FIG. 44B

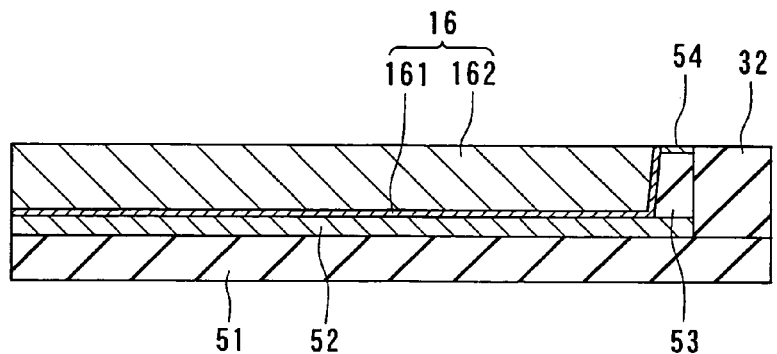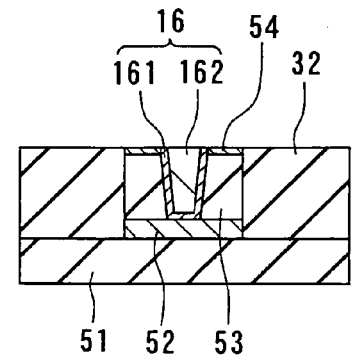
FIG. 45A  FIG. 45B
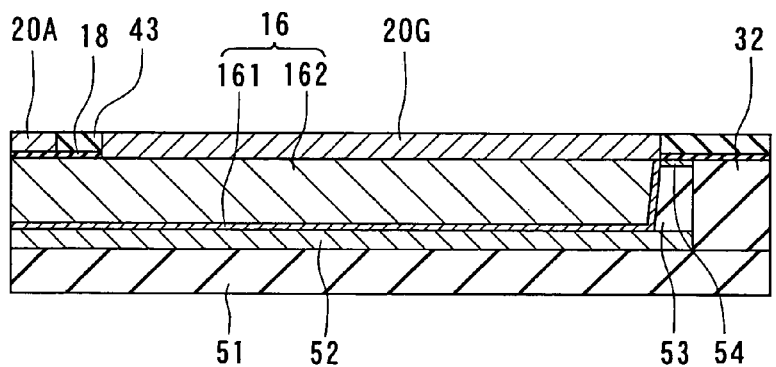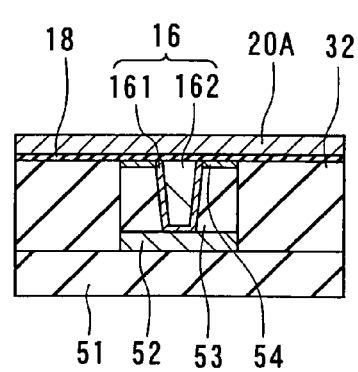
FIG. 46A  FIG. 46B

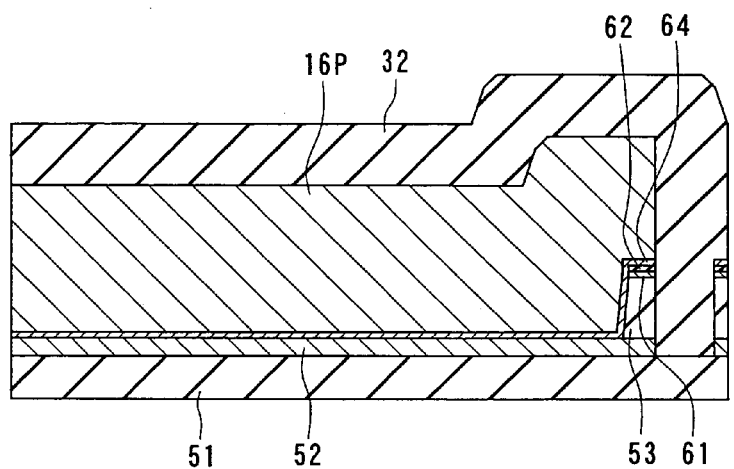 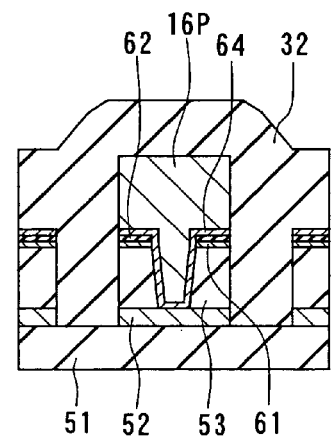
FIG. 53A  FIG. 53B
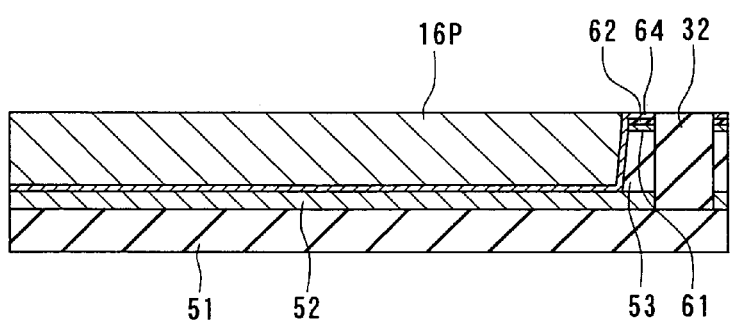 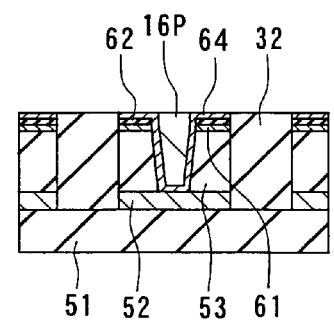
FIG. 54A  FIG. 54B

MAGNETIC HEAD FOR PERPENDICULAR MAGNETIC RECORDING INCLUDING POLE-LAYER-ENCASING LAYER THAT OPENS IN THE TOP SURFACE THEREOF AND NONMAGNETIC CONDUCTIVE LAYER DISPOSED ON THE TOP SURFACE OF THE POLE-LAYER-ENCASING LAYER

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850A1, the Published Unexamined Japanese Patent Application 2003-203311, and the U.S. Pat. No. 6,504,675B1, for example. According to this technique, the end face of the track width defining portion located in the medium facing surface is made to have a shape in which the side located backward in the direction of travel of the recording medium (that is, the side located on the air-inflow-end side of the slider) is shorter than the opposite side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such a shape that the side closer to the substrate is shorter than the side farther from the substrate.

As a magnetic head for perpendicular magnetic recording, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space. Such a magnetic head will be hereinafter called a shield-type head. In the shield-type head the shield prevents a magnetic flux from reaching the recording medium, the flux being generated from the end face of the pole layer and extending in directions except the direction orthogonal to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components orthogonal to the surface of the recording medium among components of the magnetic field generated from the medium-facing-surface-side end of the middle magnetic layer.

Consideration will now be given to a method of forming a pole layer that has a track width defining portion with an end face located in the medium facing surface and having a shape in which a side closer to the substrate is shorter than a side farther from the substrate as described above. It is frame plating that has been often used in prior art for forming such a pole layer. Reference is now made to FIG. 58 to FIG. 61 to describe an example of method of forming the pole layer by frame plating. FIG. 58 to FIG. 61 each illustrate a cross section of the track width defining portion of the pole layer and a neighborhood thereof, the cross section being parallel to the medium facing surface.

FIG. 58 illustrates a step of the method of forming the pole layer mentioned above. In this step, first, an electrode film 202 is formed on an insulating layer 201 to be a base of the pole layer. The insulating layer 201 is made of alumina ($Al_2O_3$), for example. Next, a photoresist layer is formed on the electrode film 202. The photoresist layer is then patterned to form a frame 203 having a groove whose shape corresponds to the pole layer. Next, plating is performed by feeding a current to the electrode film 202 to form the pole layer 204 in the groove. At the same time, an unwanted plating layer 205 is formed outside the frame 203.

FIG. 59 illustrates the following step. In the step, first, the frame 203 is removed. Next, a portion of the electrode film 202 that was located below the frame 203 is removed by ion beam etching, for example. At the same time, a portion of the insulating layer 201 that was located below the portion of the electrode film 202 removed is etched, too.

FIG. 60 illustrates the following step. In the step, first, the unwanted plating layer 205 and a portion of the electrode film 202 located below the plating layer 205 are removed by wet etching, for example. Next, an insulating layer 206 made of alumina, for example, is formed to cover the pole layer 204. The insulating layer 206 is made to have a thickness equal to the total thickness of the pole layer 204 and the electrode film 202 as desired. Next, a stopper film 207 is formed on the insulating layer 206 except a region near the pole layer 204. Next, an insulating layer 208 made of alumina, for example, is formed on the entire top surface of the layered structure.

Next, as shown in FIG. 61, the insulating layer 208 and the pole layer 204 are polished by chemical mechanical polishing (hereinafter referred to as CMP), for example. This polishing is stopped when the stopper film 207 is exposed. Through the polishing, the top surface of the pole layer 204 is flattened, and the thickness of the pole layer 204 is controlled to have a desired value.

Problems of the method of forming the pole layer illustrated in FIG. 58 to FIG. 61 will now be described. As shown in FIG. 61, when the polishing of the insulating layer 208 and the pole layer 204 is completed, there is a difference 'd' in level between the top surface of the stopper film 207 and the top surface of the pole layer 204 such that the top surface of the pole layer 204 is lower. The greater the distance D between the stopper film 207 and the pole layer 204 (See FIG. 60), the greater is the difference 'd' in level. The difference 'd' in level increases as the amount of polishing the insulating layer 208 and the pole layer 204 increases. The distance D is about 10 to 15 μm. Here, the distance D is 15 μm by way of example, and the initial thickness of the insulating layer 208 is 0.6 μm. In this case, the difference 'd' in level is about 0.15 μm. As thus described, if the difference 'd' in level is created, there arises a problem that the thickness of the pole layer 204 falls out of a desired value.

The end face of the track width defining portion located in the medium facing surface has such a shape that the side closer to the substrate is shorter than the side farther from the substrate, as described above. The side farther from the substrate has a length equal to the track width. Here, if the thickness of the pole layer 204 falls out of a desired value as described above, there arises a problem that the track width defined by the above-mentioned length of the side farther from the substrate falls out of a desired value.

Through the method of forming the pole layer illustrated in FIG. 58 to FIG. 61, it is impossible to measure with accuracy the shape of the end face of the track width defining portion located in the medium facing surface in the course of manufacturing process of the magnetic head. Therefore, even if the thickness of the pole layer 204 or the track width falls out of a desired value as described above, it is impossible to recognize that until the magnetic head is completed, and the efficiency in manufacturing the magnetic head is reduced.

The Published U.S. Patent Application No. 2003/0151850A1 discloses a method in which a groove having a shape corresponding to the pole layer is formed in an inorganic insulating film, and the pole layer is formed in the groove by plating or sputtering. In this method the width of the pole layer, that is, the track width, is defined by the width of the groove formed in the inorganic insulating film. In addition, the Published U.S. Patent Application No. 2003/0151850A1 discloses that, when the pole layer is formed in the groove by plating, a stopper film used for CMP may be formed after the plating base film is formed. However, this publication does not disclose any range in which the stopper film for CMP is formed.

OBJECT AND SUMMARY OF THE INVENTION

It is an object of the invention to provide a magnetic head for perpendicular magnetic recording that allows a pole layer having a desired shape to be formed with accuracy, and to provide a method of manufacturing such a magnetic head.

A magnetic heads for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; a pole-layer-encasing layer made of a nonmagnetic material and having a groove that opens in a top surface of the encasing layer and accommodates the pole layer; and a nonmagnetic conductive layer made of a nonmagnetic conductive material and disposed on the top surface of the encasing layer.

In the magnetic head of the invention the nonmagnetic conductive layer has a penetrating opening having an edge located directly above an edge of the groove located in the top surface of the encasing layer. It is thereby possible to control the thickness of the pole layer and the width of the top surface of the pole layer with accuracy.

The magnetic head of the invention may further comprise a substrate on which the encasing layer, the pole layer, the nonmagnetic conductive layer and the coil are stacked. In this case, the end face of the pole layer located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the pole layer may have a width that decreases as the distance from the first side decreases.

The magnetic head of the invention may further comprise a nonmagnetic film made of a nonmagnetic material and disposed in the groove between the encasing layer and the pole layer.

A magnetic head for perpendicular magnetic recording manufactured by a first or a second method of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; and a pole-layer-encasing layer made of a nonmagnetic material and having a groove that opens in a top surface of the encasing layer and accommodates the pole layer.

The first method of manufacturing the magnetic head for perpendicular magnetic recording of the invention comprises the steps of: forming a nonmagnetic layer that will be formed into the encasing layer by forming the groove therein later; forming a polishing stopper layer on a top surface of the nonmagnetic layer, the polishing stopper layer being made of a nonmagnetic conductive material and having a penetrating opening with a shape corresponding to a plane geometry of the pole layer, the polishing stopper layer indicating a level at which polishing to be performed later is stopped; forming the groove in the nonmagnetic layer by selectively etching a portion of the nonmagnetic layer exposed from the opening of the polishing stopper layer, so that the nonmagnetic layer is formed into the encasing layer; forming a magnetic layer to be the pole layer such that the groove is filled and a top surface of the magnetic layer is located higher than a top surface of the polishing stopper layer; forming a coating layer so as to cover the magnetic layer and the polishing stopper layer; polishing the coating layer and the magnetic layer until the polishing stopper layer is exposed, so that the magnetic layer is formed into the pole layer; and forming the coil.

According to the first method of the invention, it is possible to control the thickness of the pole layer and the width of the top surface of the pole layer with accuracy.

The first method of the invention may further comprise the step of forming a nonmagnetic film made of a nonmagnetic material and disposed in the groove between the encasing layer and the pole layer, the step being performed after the step of forming the groove in the nonmagnetic layer and before the step of forming the magnetic layer.

The first method of the invention may further comprise the step of removing the polishing stopper layer after the step of polishing the coating layer and the magnetic layer. The polishing stopper layer may be removed and a portion of the magnetic layer may be etched by ion beam etching in the step of removing the polishing stopper layer.

The first method of the invention may further comprise the step of measuring the width of the opening of the polishing stopper layer through the use of an electron microscope after the step of forming the groove in the nonmagnetic layer and before the step of forming the magnetic layer.

The second method of manufacturing the magnetic head for perpendicular magnetic recording of the invention comprises: the step of forming a nonmagnetic layer that will be formed into the encasing layer by forming the groove therein later; the step of forming a lower polishing stopper layer on a top surface of the nonmagnetic layer, the lower polishing stopper layer having a penetrating opening with a shape corresponding to a plane geometry of the pole layer, the lower polishing stopper layer indicating a level at which polishing of a second polishing step to be performed later is stopped; the step of forming the groove in the nonmagnetic layer by selectively etching a portion of the nonmagnetic layer exposed from the opening of the lower polishing stopper layer, so that the nonmagnetic layer is formed into the encasing layer; the step of forming a spacer layer having a specific thickness on the lower polishing stopper layer before or after the step of forming the groove; the step of forming an upper polishing stopper layer on the spacer layer, the upper polishing stopper layer indicating a level at which polishing of a first polishing step to be performed later is stopped; the step of forming a magnetic layer to be the pole layer after the step of forming the groove and the step of forming the upper polishing stopper layer, such that the groove is filled and a top surface of the magnetic layer is located higher than a top surface of the upper polishing stopper layer; the step of forming a coating layer so as to cover the magnetic layer and the upper polishing stopper layer; the first polishing step of polishing the coating layer and the magnetic layer until the upper polishing stopper layer is exposed; the step of removing the upper polishing stopper layer after the first polishing step; the second polishing step of polishing the spacer layer and the magnetic layer until the lower polishing stopper layer is exposed, so that the magnetic layer is formed into the pole layer; and the step of forming the coil.

According to the second method of the invention, it is possible to control the thickness of the pole layer and the width of the top surface of the pole layer with accuracy.

In the second method of the invention, the lower polishing stopper layer may be made of a nonmagnetic conductive material. In this case, the second method may further comprise the step of measuring the width of the opening of the lower polishing stopper layer through the use of an electron microscope after the step of forming the groove in the nonmagnetic layer and before the step of forming the magnetic layer.

In the second method of the invention, the spacer layer may be made of an insulating material or a semiconductor material. The spacer layer may be formed in the groove, too.

In the second method of the invention, the upper polishing stopper layer may be made of a nonmagnetic conductive material. The upper polishing stopper layer may be formed in the groove, too.

The second method of the invention may further comprise the step of removing the lower polishing stopper layer after the second polishing step. The lower polishing stopper layer may be removed and a portion of the magnetic layer may be etched by ion beam etching in the step of removing the lower polishing stopper layer.

The magnetic head manufactured by the first or second method of the invention may further comprise a substrate on which the encasing layer, the pole layer and the coil are stacked. In this case, the end face of the pole layer located in the medium facing surface may have: a first side close to the substrate; a second side located opposite to the first side; a third side connecting an end of the first side to an end of the second side; and a fourth side connecting the other end of the first side to the other end of the second side. In addition, the second side may define the track width, and the end face of the pole layer may have a width that decreases as the distance from the first side decreases.

If the end face of the pole layer located in the medium facing surface is made to have a width that decreases as the distance from the first side decreases, the first or second method of the invention may further comprise the step of measuring a width of the groove in the top surface of the encasing layer and a width of the bottom of the groove after the step of forming the groove in the nonmagnetic layer and before the step of forming the magnetic layer.

In the first or second method of the invention, if the end face of the pole layer located in the medium facing surface is made to have a width that decreases as the distance from the first side decreases, the nonmagnetic layer may be made of $Al_2O_3$, and the nonmagnetic layer may be etched by reactive ion etching in the step of forming the groove in the nonmagnetic layer. In this case, an etching gas used in the reactive ion etching may include a first gas containing chlorine or bromine and a second gas containing fluorine.

The first gas may contain any of $BCl_3$, $Cl_2$, $BBr_3$ and $HCl$. The second gas may contain any of $CF_4$, $C_2F_6$, $SF_6$ and $CHF_3$.

The first gas may be a mixed gas of a $BCl_3$ gas and a $Cl_2$ gas, the second gas may be a $CF_4$ gas, and the flow rate of the first gas may fall within a range of four times to twenty times the flow rate of the second gas inclusive.

The first gas may be a mixed gas of a $BCl_3$ gas and a $Cl_2$ gas, and the flow rate of the $BCl_3$ gas may fall within a range of one time to twenty times the flow rate of the $Cl_2$ gas inclusive.

In the magnetic head for perpendicular magnetic recording of the invention, the nonmagnetic conductive layer has the penetrating opening having the edge located directly above the edge of the groove located in the top surface of the pole-layer-encasing layer. According to the invention, it is thereby possible to control the thickness of the pole layer and the width of the top surface of the pole layer with accuracy. As a result, it is possible to form the pole layer having a desired shape with accuracy.

According to the first method of manufacturing the magnetic head for perpendicular magnetic recording of the invention, the edge of the opening of the polishing stopper layer is located directly above the edge of the groove located in the top surface of the pole-layer-encasing layer. According to the invention, it is thereby possible to control the thickness of the pole layer and the width of the top surface of the pole layer with accuracy. As a result, it is possible to form the pole layer having a desired shape with accuracy.

According to the second method of manufacturing the magnetic head for perpendicular magnetic recording of the invention, the edge of the opening of the lower polishing stopper layer is located directly above the edge of the groove located in the top surface of the pole-layer-encasing layer. According to the invention, it is thereby possible to control the thickness of the pole layer and the width of the top surface of the pole layer with accuracy. Furthermore, the second method of the invention comprises the first and second polishing steps. As a result, it is possible to control the thickness of the pole layer with higher accuracy. These features of the invention allow the pole layer having a desired shape to be formed with accuracy.

Other and further objects, features and advantages of the invention will appear more fully from the following description.

BRIEF DESCRIPTION OF THE DRAWINGS

FIG. 4A to FIG. 4C are views for illustrating a step of a method of manufacturing the magnetic head of the first embodiment of the invention.

FIG. 5A to FIG. 5C are views for illustrating a step that follows the step shown in FIG. 4A to FIG. 4C.

FIG. 9A and FIG. 9B are views for illustrating a step that follows the step shown in FIG. 8A to FIG. 8C.

FIG. 10A and FIG. 10B are views for illustrating a step that follows the step shown in FIG. 9A and FIG. 9B.

FIG. 16A to FIG. 16C are views for illustrating a step of a method of manufacturing a magnetic head of a second embodiment of the invention.

FIG. 20A to FIG. 20C are views for illustrating a step that follows the step shown in FIG. 19A to FIG. 19C.

FIG. 22A and FIG. 22B are views for illustrating a step that follows the step shown in FIG. 21A to FIG. 21C.

FIG. 23A and FIG. 23B are views for illustrating a step that follows the step shown in FIG. 22A and FIG. 22B.

FIG. 25A to FIG. 25C are views for illustrating a step of a method of manufacturing a magnetic head of a third embodiment of the invention.

FIG. 29A and FIG. 29B are views for illustrating a step that follows the step shown in FIG. 28A to FIG. 28C.

FIG. 30A and FIG. 30B are views for illustrating a step that follows the step shown in FIG. 29A and FIG. 29B.

FIG. 35A and FIG. 35B are views for illustrating a step that follows the step shown in FIG. 34A and FIG. 34B.

FIG. 36A and FIG. 36B are views for illustrating a step that follows the step shown in FIG. 35A and FIG. 35B.

FIG. 37A and FIG. 37B are views for illustrating a step that follows the step shown in FIG. 36A and FIG. 36B.

FIG. 38A and FIG. 38B are views for illustrating a step that follows the step shown in FIG. 37A and FIG. 37B.

FIG. 41A and FIG. 41B are views for illustrating a step of a method of manufacturing the magnetic head of the fifth embodiment of the invention.

FIG. 42A and FIG. 42B are views for illustrating a step that follows the step shown in FIG. 41A and FIG. 41B.

FIG. 43A and FIG. 43B are views for illustrating a step that follows the step shown in FIG. 42A and FIG. 42B.

FIG. 44A and FIG. 44B are views for illustrating a step that follows the step shown in FIG. 43A and FIG. 43B.

FIG. 45A and FIG. 45B are views for illustrating a step that follows the step shown in FIG. 44A and FIG. 44B.

FIG. 46A and FIG. 46B are views for illustrating a step that follows the step shown in FIG. 45A and FIG. 45B.

FIG. 53A and FIG. 53B are views for illustrating a step that follows the step shown in FIG. 52A and FIG. 52B.

FIG. 54A and FIG. 54B are views for illustrating a step that follows the step shown in FIG. 53A and FIG. 53B.

DETAILED DESCRIPTION OF THE PREFERRED EMBODIMENTS

First Embodiment

Figure 1:
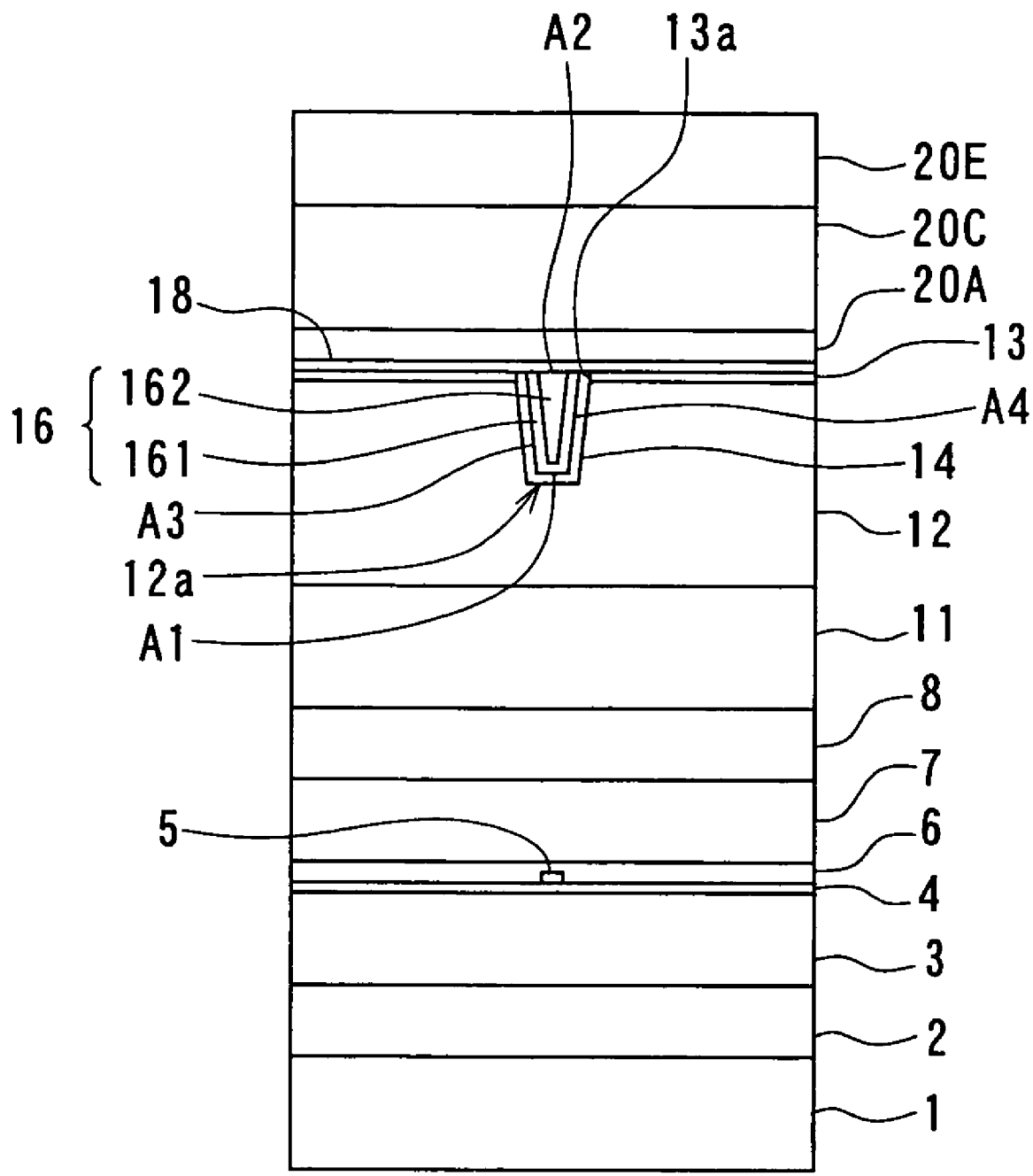
FIG. 1 is a front view of the medium facing surface of a magnetic head of a first embodiment of the invention.
Figure 2:
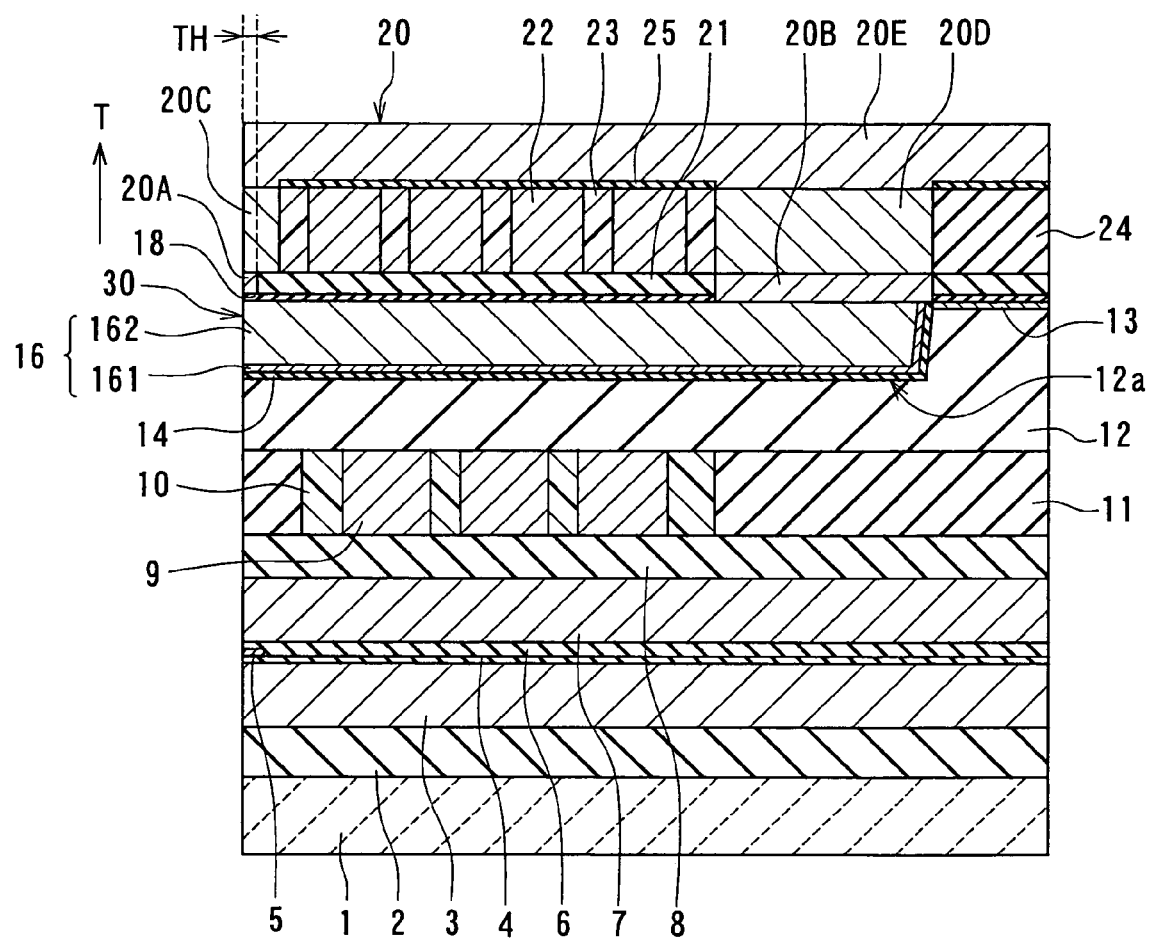
FIG. 2 is a cross-sectional view for illustrating the configuration of the magnetic head of the first embodiment of the invention.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention. FIG. 1 is a front view for illustrating the medium facing surface of the magnetic head of the embodiment. FIG. 2 is a cross-sectional view for illustrating the configuration of the magnetic head of the embodiment. FIG. 2 illustrates a cross section orthogonal to the medium facing surface and a surface of a substrate. The arrow indicated with T in FIG. 2 shows the direction of travel of a recording medium.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 make up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material and disposed on the top shield layer 7; a coil 9 formed on the insulating layer 8; an insulating layer 10 made of an insulating material and disposed around the coil 9 and in the space between adjacent ones of the turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 8 and 11 are made of alumina, for example. The insulating layer 10 is made of photoresist, for example. The coil 9 is made of a conductive material such as copper.

The magnetic head further comprises a pole-layer-encasing layer 12 made of a nonmagnetic material and disposed on the flattened top surfaces of the coil 9 and the insulating layers 10 and 11. The pole-layer-encasing layer 12 has a groove 12a that opens in the top surface thereof and that accommodates the pole layer described later. Although the groove 12a does not penetrate the pole-layer-encasing layer 12 in FIG. 1 and FIG. 2, the groove 12a may penetrate the encasing layer 12. The encasing layer 12 may be made of any of alumina, silicon oxide (SiO$_x$), and silicon oxynitride (SiON), for example.

The magnetic head further comprises a polishing stopper layer 13 made of a nonmagnetic conductive material and disposed on the top surface of the pole-layer-encasing layer 12. The polishing stopper layer 13 corresponds to the nonmagnetic conductive layer of the invention. The polishing stopper layer 13 has an opening 13a that penetrates, and the edge of the opening 13a is located directly above the edge of the groove 12a in the top surface of the pole-layer-encasing layer 12. The polishing stopper layer 13 may be made of any of Ta, Mo, W, Ti, Ru, Rh, Re, Pt, Pd, Ir, TiN, TiW and NiCr, for example.

The magnetic head further comprises: a nonmagnetic film 14 made of a nonmagnetic material and disposed in the groove 12a and on the top surface of the polishing stopper layer 13; and the pole layer 16 disposed in the groove 12a with the nonmagnetic film 14 provided between the pole layer 16 and the encasing layer 12. The pole layer 16 incorporates: a first layer 161 located closer to the surface of the groove 12a; and a second layer 162 located farther from the surface of the groove 12a. The polishing stopper layer 13 and the pole layer 16 have flattened top surfaces.

The nonmagnetic film 14 may be made of an insulating material or a semiconductor material. The insulating material for making the nonmagnetic film 14 may be any of alumina, silicon oxide (SiO$_x$), and silicon oxynitride (SiON), for example. The semiconductor material for making the nonmagnetic film 14 may be polycrystalline silicon or amorphous silicon, for example.

Each of the first layer 161 and the second layer 162 is made of a magnetic material. The first layer 161 may be made of any of CoFeN, CoNiFe and NiFe, for example. The second layer 162 may be made of any of NiFe, CoNiFe and CoFe, for example.

The magnetic head further comprises a gap layer 18 disposed on the top surfaces of the polishing stopper film 13 and the pole layer 16. The gap layer 18 has an opening located at a distance from the medium facing surface 30. The gap layer 18 may be made of an insulating material such as alumina or a nonmagnetic metal material such as Ru, NiCu, Ta, W or NiB.

The magnetic head further comprises a shield layer 20. The shield layer 20 has: a first layer 20A disposed on the gap layer 18; a second layer 20C disposed on the first layer 20A; a coupling layer 20B disposed on a portion of the pole layer 16 where the opening of the gap layer 18 is formed; a coupling layer 20D disposed on the coupling layer 20B; and a third layer 20E disposed to couple the second layer 20C to the coupling layer 20D. The first layer 20A, the second layer 20C, the coupling layers 20B and 20D, and the third layer 20E are each made of a magnetic material. These layers 20A to 20E may be made of any of CoFeN, CoNiFe and NiFe, for example.

The magnetic head further comprises a nonmagnetic layer 21 made of a nonmagnetic material and disposed around the coupling layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: a coil 22 disposed on the nonmagnetic layer 21; an insulating layer 23 disposed around the coil 22 and in the space between adjacent ones of the turns of the coil 22; an insulating layer 24 disposed around the insulating layer 23; and an insulating layer 25 disposed on the coil 22 and the insulating layers 23 and 24. The coil 22 is flat-whorl-shaped. A portion of the coil 22 passes between the second layer 20C and the coupling layer 20D. The coil 22 is made of a conductive material such as copper. The second layer 20C, the coupling layer 20D and the insulating layers 23 and 24 have flattened top surfaces. The insulating layer 23 is made of photoresist, for example. The insulating layers 24 and 25 are made of alumina, for example.

The portion from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the pole-layer-encasing layer 12, the polishing stopper layer 13, the nonmagnetic film 14, the pole layer 16, the gap layer 18, the shield layer 20, and the coil 22. The coils 9 and 22 generate a magnetic field corresponding to data to be written on the recording medium. The coil 9 is not a component requisite for the write head and may be omitted. The nonmagnetic film 14 may be omitted.

The pole layer 16 has an end face located in the medium facing surface 30. The pole layer 16 allows the magnetic flux corresponding to the field generated by the coil 22 to pass therethrough and generates a write magnetic field for writing the data on the medium by using the perpendicular magnetic recording system.

The shield layer 20 has an end located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the pole layer 16 along the direction T of travel of the recording medium with a specific space created by the thickness of the gap layer 18. At least part of the coil 22 is disposed between the pole layer 16 and the shield layer 20 and insulated from the pole layer 16 and the shield layer 20.

The shield layer 20 has: the first layer 20A disposed adjacent to the gap layer 18; the second layer 20C disposed on a side of the first layer 20A farther from the gap layer 18;

the coupling layers 20B and 20D disposed on the portion of the pole layer 16 where the opening of the gap layer 18 is formed; and the third layer 20E disposed to couple the second layer 20C to the coupling layer 20D. The second layer 20C is disposed between the medium facing surface 30 and the at least part of the coil 22.

Figure 3:
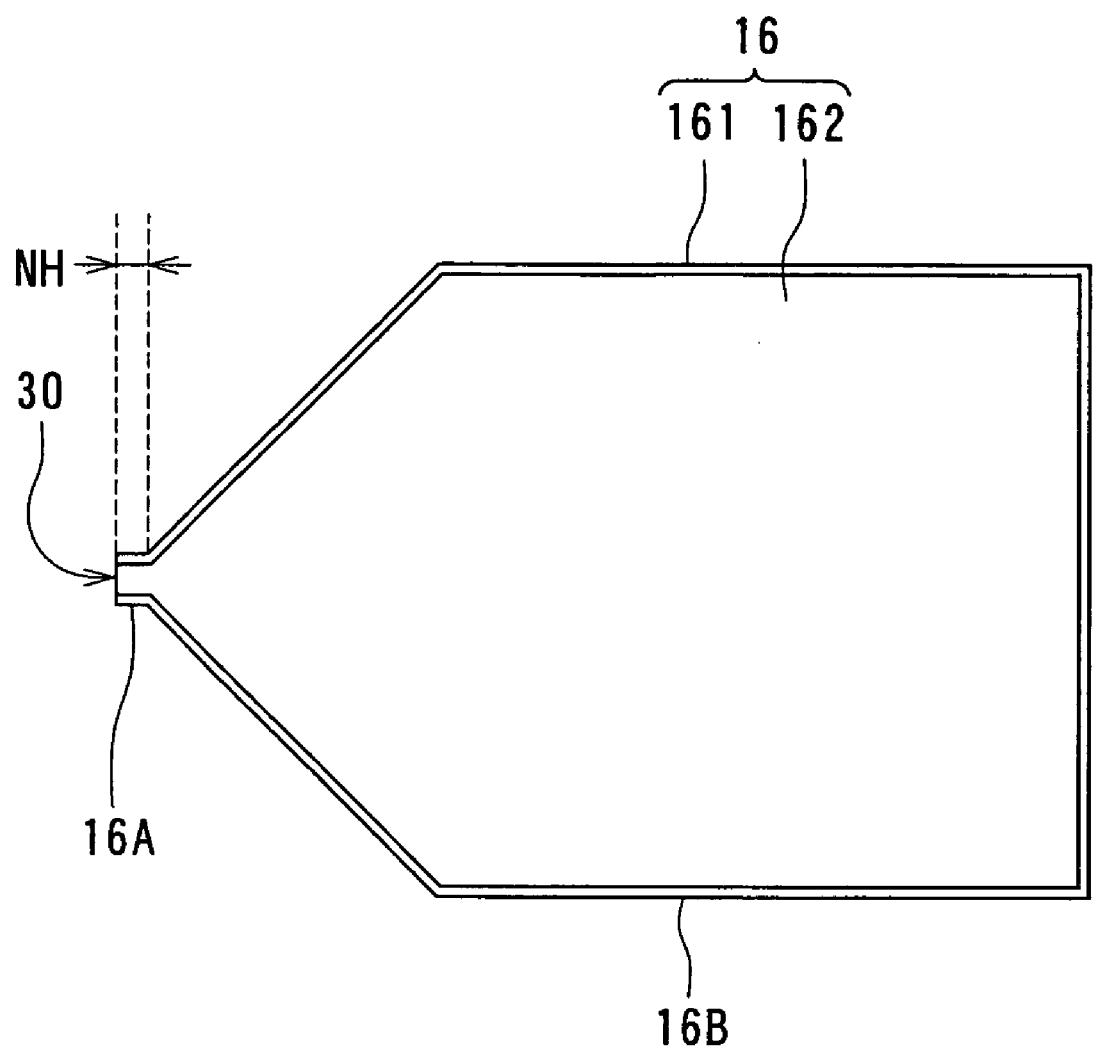
FIG. 3 is a top view of the pole layer of the magnetic head of the first embodiment of the invention.

FIG. 3 is a top view of the pole layer 16. As shown in FIG. 3, the pole layer 16 incorporates a track width defining portion 16A and a wide portion 16B. The track width defining portion 16A has an end located in the medium facing surface 30 and has a uniform width. The wide portion 16B is coupled to the other end of the track width defining portion 16A and has a width greater than the width of the track width defining portion 16A. The wide portion 16B is equal in width to the track width defining portion 16A at the interface with the track width defining portion 16A, and gradually increases in width as the distance from the medium facing surface 30 increases and then maintains a specific width to the end of the wide portion 16B. Here, the length of the track width defining portion 16A orthogonal to the medium facing surface 30 is called a neck height NH. The neck height NH falls within a range of 0.1 to 0.3 μm inclusive, for example.

As shown in FIG. 1, the end face of the pole layer 16 located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the pole layer 16 located in the medium facing surface 30 decreases as the distance from the first side A1 decreases.

The length of the second side A2, that is, the track width, falls within a range of 0.08 to 0.12 μm inclusive, for example. The thickness of the pole layer 16 falls within a range of 0.20 to 0.30 μm inclusive, for example. Each of the third side A3 and the fourth side A4 forms an angle that falls within a range of 5 to 12 degrees inclusive, for example, with respect to the direction orthogonal to the top surface of the substrate 1. The thickness of the gap layer 18 falls within a range of 40 to 80 nm inclusive, for example.

The polishing stopper layer 13 is disposed on the top surface of the pole-layer-encasing layer 12. The polishing stopper layer 13 has the opening 13a that penetrates, and the edge of the opening 13a is located directly above the edge of the groove 12a in the top surface of the pole-layer-encasing layer 12. The polishing stopper layer 13 has a thickness that falls within a range of 20 to 60 nm inclusive, for example.

The nonmagnetic film 14 is disposed in the groove 12a and on the top surface of the polishing stopper layer 13. The pole layer 16 is disposed in the groove 12a such that the nonmagnetic film 14 is disposed between the pole-layer-encasing layer 12 and the pole layer 16. The nonmagnetic film 14 has a thickness that falls within a range of 20 to 50 nm inclusive, for example.

The pole layer 16 incorporates: the first layer 161 located closer to the surface of the groove 12a; and the second layer 162 located farther from the surface of the groove 12a. The first layer 161 has a thickness that falls within a range of 40 to 100 nm inclusive, for example.

The first layer 20A of the shield layer 20 has: a first end located in the medium facing surface 30; and a second end opposite to the first end. The second layer 20C of the shield layer 20 also has: a first end located in the medium facing surface 30; and a second end opposite to the first end. The second end of the first layer 20A defines the throat height TH. That is, as shown in FIG. 2, the throat height TH is the minimum distance between the first end and the second end of the portion of the first layer 20A facing toward the pole layer 16 with the gap layer 18 disposed in between. The throat height TH falls within a range of 0.1 to 0.3 μm inclusive, for example. The minimum distance between the first end and the second end of the portion of the second layer 20C facing toward the pole layer 16 with the gap layer 18 and the first layer 20A disposed in between falls within a range of 0.5 to 0.8 μm inclusive, for example. The first layer 20A and the coupling layer 20B have a thickness that falls within a range of 0.3 to 0.8 μm inclusive, for example. The second layer 20C and the coupling layer 20D have a thickness that falls within a range of 2.0 to 2.5 μm inclusive, for example. The third layer 20E has a thickness that falls within a range of 2.0 to 3.0 μm inclusive, for example.

As shown in FIG. 2, the nonmagnetic layer 21 is disposed on a side of the first layer 20A. The nonmagnetic layer 21 has a thickness that is equal to or greater than the thickness of the first layer 20A and that falls within a range of 0.3 to 0.8 μm inclusive, for example. At least part of the coil 22 is disposed on the nonmagnetic layer 21. The coil 22 has a thickness that is equal to or smaller than the thickness of the second layer 20C and that falls within a range of 2.0 to 2.5 μm inclusive, for example. The at least part of the coil 22 is disposed in a region of the nonmagnetic layer 21 that is opposite to the pole layer 16 and farther from the pole layer 16 than a surface (the top surface) of the first layer 20A opposite to the pole layer 16.

Reference is now made to FIG. 4A to FIG. 10A, FIG. 4B to FIG. 10B, and FIG. 4C to FIG. 8C to describe a method of manufacturing the magnetic head of the embodiment. FIG. 4A to FIG. 8A each illustrate the top surface of a layered structure of the magnetic head in the course of the manufacturing process. FIG. 4B to FIG. 8B each illustrate a cross section of the layered structure orthogonal to the medium facing surface and the substrate. FIG. 4C to FIG. 8C each illustrate a cross section of a portion of the layered structure near the medium facing surface, the cross section being parallel to the medium facing surface. FIG. 9A and FIG. 10A each illustrate a cross section of the layered structure orthogonal to the medium facing surface and the substrate. FIG. 9B and FIG. 10B each illustrate a cross section of a portion of the layered structure near the medium facing surface, the cross section being parallel to the medium facing surface. Portions closer to the substrate 1 than the pole-layer-encasing layer 12 are omitted in FIG. 4A to FIG. 10A, FIG. 4B to FIG. 10B, and FIG. 4C to FIG. 8C.

According to the method of manufacturing the magnetic head of the embodiment, as shown in FIG. 2, the insulating layer 2, the bottom shield layer 3 and the bottom shield gap film 4 are first formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6. Next, the coil 9 and the insulating layers 10 and 11 are formed on the insulating layer 8. Next, the top surfaces of the coil 9 and the insulating layers 10 and 11 are flattened by CMP, for example.

FIG. 4A to FIG. 4C illustrate the following step. In the step, first, a nonmagnetic layer 12P is formed on the flattened top surfaces of the coil 9 and the insulating layers 10 and 11. The groove 12a will be formed in the nonmagnetic layer 12P and the nonmagnetic layer 12P will be thereby formed into the pole-layer-encasing layer 12 later. Next, the polishing stopper layer 13 is formed by sputtering, for example, on the nonmagnetic layer 12P. Next, a photoresist layer having a thickness of 1.0 µm, for example, is formed on the polishing stopper layer 13. The photoresist layer is then patterned to form a mask 31 for making the groove 12a in the encasing layer 12. The mask 31 has an opening having a shape corresponding to the groove 12a.

Next, the polishing stopper layer 13 is selectively etched, using the mask 31. The opening 13a that penetrates is thereby formed in the polishing stopper layer 13. The opening 13a has a shape corresponding to the plane geometry of the pole layer 16 to be formed later. Furthermore, a portion of the nonmagnetic layer 12P exposed from the opening 13a of the polishing stopper layer 13 is selectively etched so as to form the groove 12a of the nonmagnetic layer 12P. The mask 31 is then removed. The nonmagnetic layer 12P is formed into the pole-layer-encasing layer 12 by forming the groove 12a therein. The polishing stopper layer 13 indicates the level at which polishing to be performed later is stopped. The edge of the opening 13a of the polishing stopper layer 13 is located directly above the edge of the groove 12a located in the top surface of the pole-layer-encasing layer 12.

The etching of each of the polishing stopper layer 13 and the nonmagnetic layer 12P is performed by reactive ion etching or ion beam etching, for example. The etching for forming the groove 12a of the nonmagnetic layer 12P is performed such that the walls of the groove 12a corresponding to both sides of the track width defining portion 16A of the pole layer 16 each form an angle that falls within a range of 5 to 12 degrees inclusive, for example, with respect to the direction orthogonal to the top surface of the substrate 1. The conditions for etching the nonmagnetic layer 12P by reactive ion etching will be described in detail later.

Next, the width of the opening 13a of the polishing stopper layer 13 is measured, using an electron microscope. It is preferred to use a critical dimension measurement scanning electron microscope as the electron microscope. Since the edge of the opening 13a of the polishing stopper layer 13 is located directly above the edge of the groove 12a located in the top surface of the pole-layer-encasing layer 12, the width of the opening 13a is equal to the width of the groove 12a taken in the top surface of the pole-layer-encasing layer 12. Therefore, it is possible to measure the width of the groove 12a taken in the top surface of the pole-layer-encasing layer 12 by measuring the width of the opening 13a. As a result, the track width is obtained in the following manner. As shown in FIG. 1, the track width is equal to the length of the second side A2 of the end face of the pole layer 16 located in the medium facing surface 30. The track width has a value obtained by subtracting the value of twice the thickness of the nonmagnetic film 14 from the width of the groove 12a in the top surface of the pole-layer-encasing layer 12 in the medium facing surface 30. It is possible to control the thickness of the nonmagnetic film 14 with precision. Therefore, it is possible to obtain the track width by measuring the width of the groove 12a in the top surface of the pole-layer-encasing layer 12 in the medium facing surface 30.

A case is now assumed wherein the polishing stopper layer 13 is not disposed on the top surface of the pole-layer-encasing layer 12 and the encasing layer 12 is made of an insulating material such as alumina. In this case, if an attempt is made to measure the width of the groove 12a in the top surface of the pole-layer-encasing layer 12 by an electron microscope, electric charges accumulate on the top surface of the encasing layer 12 and it is impossible to obtain a correct image. According to the embodiment, in contrast, the polishing stopper layer 13 made of a conductive material is disposed on the top surface of the encasing layer 12. In addition, the edge of the opening 13a of the polishing stopper layer 13 is located directly above the edge of the groove 12a located in the top surface of the encasing layer 12. As a result, a correct image is obtained when the polishing stopper layer 13 is observed by an electron microscope, and it is thereby possible to measure the width of the opening 13a of the polishing stopper layer 13 with accuracy. It is thereby possible to measure the width of the groove 12a in the top surface of the encasing layer 12 with accuracy.

When the width of the groove 12a in the top surface of the encasing layer 12 is measured by an electron microscope as described above, the width of the bottom of the groove 12a of the encasing layer 12 may be measured at the same time. It is thereby possible to obtain the angle between each of the walls of the groove 12a and the direction orthogonal to the top surface of the substrate 1. This will be described in detail later.

FIG. 5A to FIG. 5C illustrate the following step. In the step, first, the nonmagnetic film 14 is formed in the groove 12a of the pole-layer-encasing layer 12 and on the polishing stopper layer 13. The nonmagnetic film 14 is formed by sputtering or CVD, for example. It is possible to control the thickness of the nonmagnetic film 14 with precision. If the nonmagnetic film 14 is formed by CVD, it is preferred to employ a method called 'atomic layer CVD' (ALCVD) in which formation of a single atomic layer is repeated. In this case, it is possible to control the thickness of the nonmagnetic film 14 with higher precision. If the nonmagnetic film 14 is made of a semiconductor material, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, a first magnetic layer 161P to be the first layer 161 of the pole layer 16 is formed on the nonmagnetic film 14. The first magnetic layer 161P is formed by sputtering or ion beam deposition (hereinafter referred to as IBD), for example. If the first magnetic layer 161P is formed by sputtering, it is preferred to employ collimation sputtring or long throw sputtering.

Figure 6A:
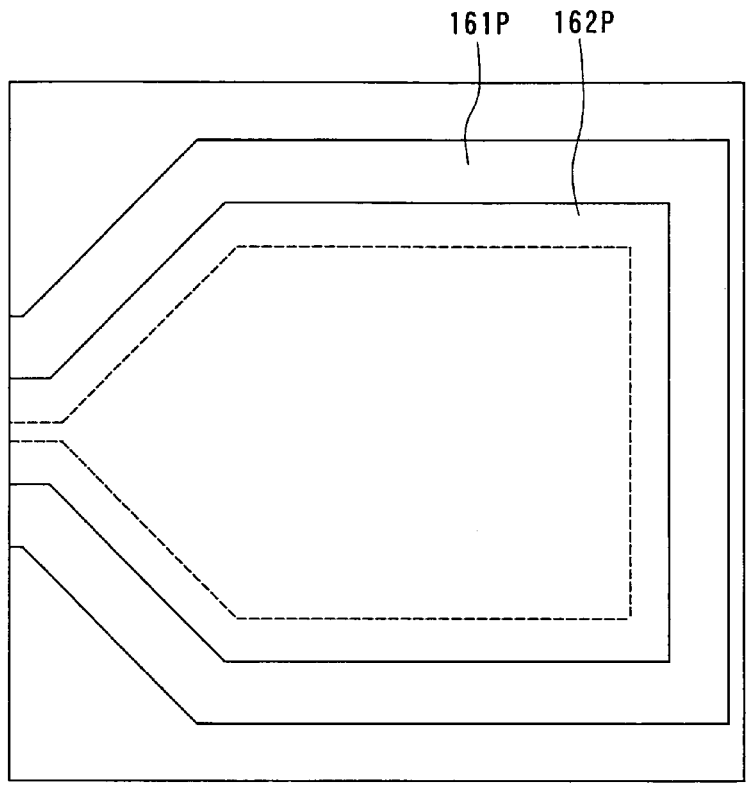
FIG. 6A to FIG. 6C are views for illustrating a step that follows the step shown in FIG. 5A to FIG. 5C.
Figures 6B, 6C:
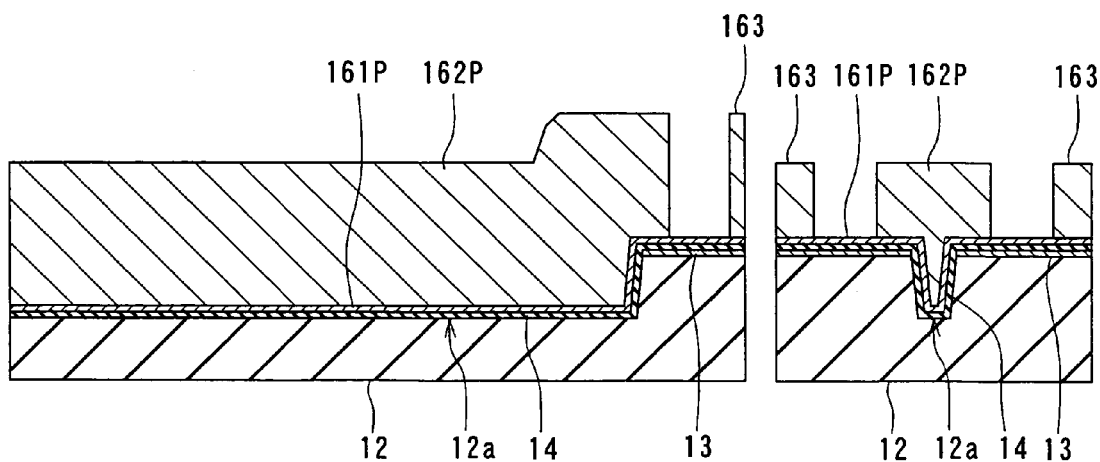

Next, as shown in FIG. 6A to FIG. 6C, a second magnetic layer 162P to be the second layer 162 of the pole layer 16 is formed on the magnetic layer 161P. The second magnetic layer 162P is formed by frame plating, for example. In this case, the first magnetic layer 161P is used as an electrode for plating. In FIG. 6B and FIG. 6C, numeral 163 indicates an unwanted plating layer formed outside the frame.

Figure 7A:
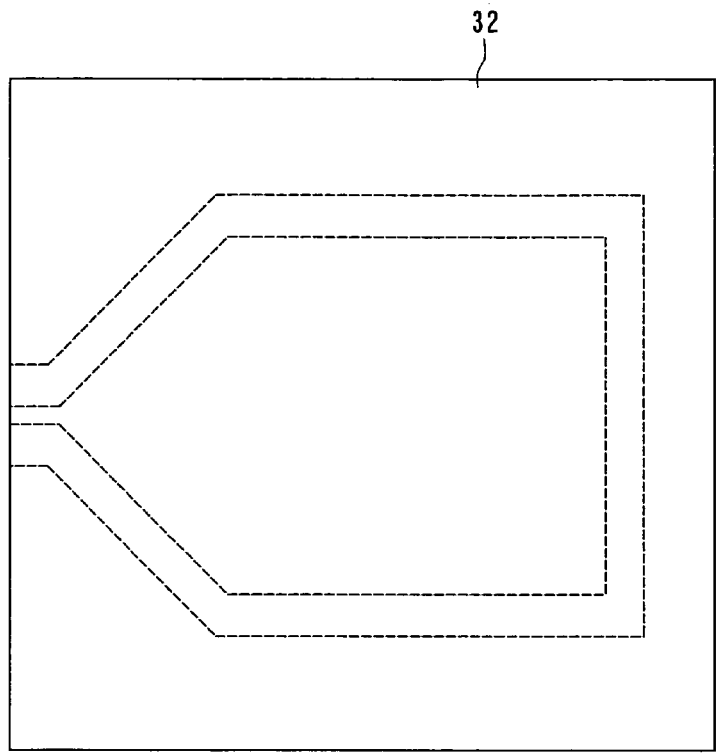
FIG. 7A to FIG. 7C are views for illustrating a step that follows the step shown in FIG. 6A to FIG. 6C.
Figure 7B:
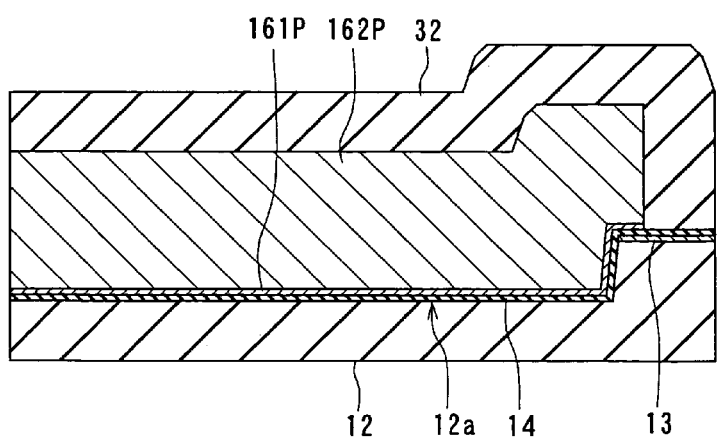
Figure 7C:
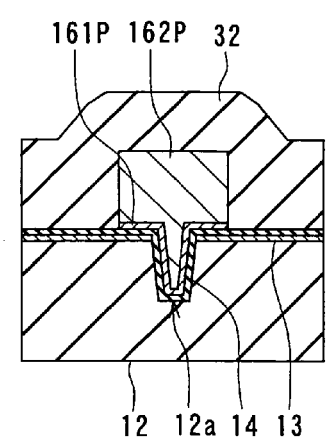

FIG. 7A to FIG. 7C illustrate the following step. In the step, first, the plating layer 163 and the magnetic layer 161P except a portion below the second magnetic layer 162P are removed by etching. Next, a coating layer 32 made of alumina, for example, and having a thickness of 0.5 to 1.2 µm, for example, is formed on the entire top surface of the layered structure.

Figure 8A:
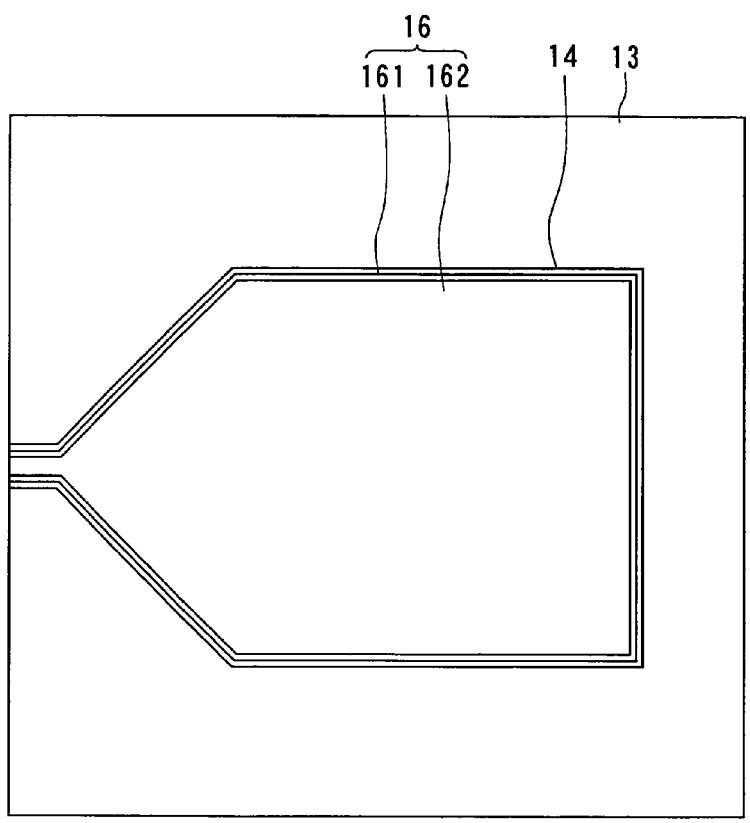
FIG. 8A to FIG. 8C are views for illustrating a step that follows the step shown in FIG. 7A to FIG. 7C.
Figure 8B:
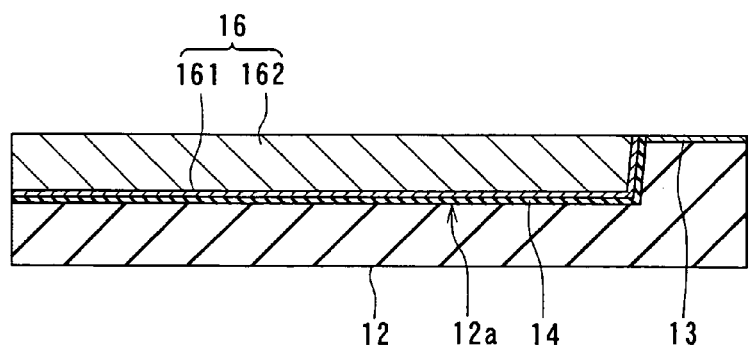
Figure 8C:
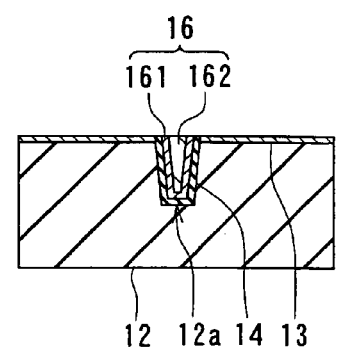

Next, as shown in FIG. 8A to FIG. 8C, the coating layer 32, the second magnetic layer 162P, the first magnetic layer 161P and the nonmagnetic film 14 are polished by CMP, for example, so that the polishing stopper layer 13 is exposed, and the top surfaces of the polishing stopper layer 13, the nonmagnetic film 14, the first magnetic layer 161P and the second magnetic layer 162P are thereby flattened. As a result, portions of the first magnetic layer 161P and the second magnetic layer 162P that are disposed on the top surface of the polishing stopper layer 13 are removed, and the remaining portions of the first magnetic layer 161P and the second magnetic layer 162P become the first layer 161 and the second layer 162, respectively.

If the coating layer 32, the second magnetic layer 162P, the first magnetic layer 161P and the nonmagnetic film 14 are polished by CMP, such a slurry is used that polishing is stopped when the polishing stopper layer 13 is exposed, such as an alumina-base slurry. It is possible to control the thickness of the pole layer 16 made up of the first layer 161 and the second layer 162 with accuracy by stopping the polishing when the polishing stopper layer 13 is exposed as thus described.

FIG. 9A and FIG. 9B illustrate the following step. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. The first layer 20A and the coupling layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask. Next, the nonmagnetic layer 21 is formed on the entire top surface of the layered structure. Next, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened.

FIG. 10A and FIG. 10B illustrate the following step. In the step, first, the coil 22 is formed by frame plating, for example, such that at least part of the coil 22 is disposed on the nonmagnetic layer 21. Next, the second layer 20C and the coupling layer 20D are formed by frame plating, for example. Alternatively, the coil 22 may be formed after the second layer 20C and the coupling layer 20D are formed.

Next, the insulating layer 23 made of photoresist, for example, is selectively formed in the space between adjacent ones of the turns of the coil 22 and around the coil 22. Next, the insulating layer 24 having a thickness of 4 to 4.5 μm, for example, is formed on the entire top surface of the layered structure. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 22 generates a magnetic field that corresponds to the data to be written on the medium. The pole layer 16 and the shield layer 20 form a magnetic path through which a magnetic flux corresponding to the magnetic field generated by the coil 22 passes. The pole layer 16 allows the flux corresponding to the field generated by the coil 22 to pass and generates a write magnetic field used for writing the data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 1, the end face of the pole layer 16 located in the medium facing surface 30 has a width that decreases as the distance from the first side A1 decreases. It is thereby possible to prevent the problems resulting from the skew.

According to the embodiment, the pole layer 16 is disposed in the groove 12a of the pole-layer-encasing layer 12 made of a nonmagnetic insulating material with the nonmagnetic film 14 provided between the encasing layer 12 and the pole layer 16. Consequently, the pole layer 16 has a width smaller than the width of the groove 12a. It is thereby possible to easily form the groove 12a and to easily reduce the width of the pole layer 16 and in particular, the width of the top surface of the track width defining portion 16A for defining the track width. For example, if a portion of the opening of the groove 12a corresponding to the track width defining portion 16A has a width of 0.2 μm and the nonmagnetic film 14 has a thickness of 50 nm (0.05 μm), then the width of the top surface of the track width defining portion 16A, that is, the track width, is 0.1 m. According to the embodiment, it is possible to easily implement and precisely control the track width smaller than the minimum track width that can be formed by photolithography.

The method of manufacturing the magnetic head of the embodiment comprises the following first to sixth steps relating to formation of the pole layer 16. The first step is the step of forming the nonmagnetic layer 12P that will be formed into the pole-layer-encasing layer 12 by forming the groove 12a therein. The second step is the step of forming the polishing stopper layer 13 on the top surface of the nonmagnetic layer 12P, wherein the polishing stopper layer 13 is made of a nonmagnetic conductive material, has the penetrating opening 13a having a shape corresponding to the plane geometry of the pole layer 16, and indicates the level at which polishing performed later is stopped. The third step is the step of forming the groove 12a of the nonmagnetic layer 12P by selectively etching the portion of the nonmagnetic layer 12P exposed from the opening 13a of the polishing stopper layer 13, so that the nonmagnetic layer 12P is formed into the pole-layer-encasing layer 12. The fourth step is the step of forming the magnetic layers 161P and 162P to be the pole layer 16 such that the groove 12a is filled and the top surfaces of the magnetic layers 161P and 162P are located higher than the top surface of the polishing stopper layer 13. The fifth step is the step of forming the coating layer 32 to cover the magnetic layers 161P and 162P and the polishing stopper layer 13. The sixth step is the step of polishing the coating layer 32 and the magnetic layers 161P and 162P until the polishing stopper layer 13 is exposed, so that the magnetic layers 161P and 162P are formed into the first layer 161 and the second layer 162 of the pole layer 16, respectively.

According to the embodiment, the polishing of the magnetic layers 161P and 162P is stopped when the polishing stopper layer 13 is exposed. The edge of the opening 13a of the polishing stopper layer 13 is located directly above the edge of the groove 12a located in the top surface of the encasing layer 12. Therefore, a difference in level is hardly created between the top surface of the polishing stopper layer 13 and the top surface of the pole layer 16 when the polishing of the magnetic layers 161P and 162P is stopped. As a result, according to the embodiment, it is possible to control the thickness of the pole layer 16 with accuracy. Furthermore, it is thereby possible to control the width of the top surface of the pole layer 16 with accuracy. As a result, it is possible to control the track width with accuracy.

According to the embodiment, it is possible to measure the width of the groove 12a in the top surface of the pole-layer-encasing layer 12 by measuring the width of the opening 13a of the polishing stopper layer 13. As a result, it is possible to measure the track width in the course of the manufacturing process of the magnetic head. It is thereby possible to improve the efficiency in manufacturing the magnetic head.

According to the embodiment, the side portions of the pole layer 16 are not etched. As a result, it is impossible that the neck height NH is made greater than a desired value and/or the pole layer 16 goes out of a desired shape. It is therefore possible to improve the overwrite property.

Because of the foregoing features of the embodiment, it is possible to form the pole layer 16 with accuracy that has a small width and a shape capable of preventing the problems resulting from the skew.

Figure 11:
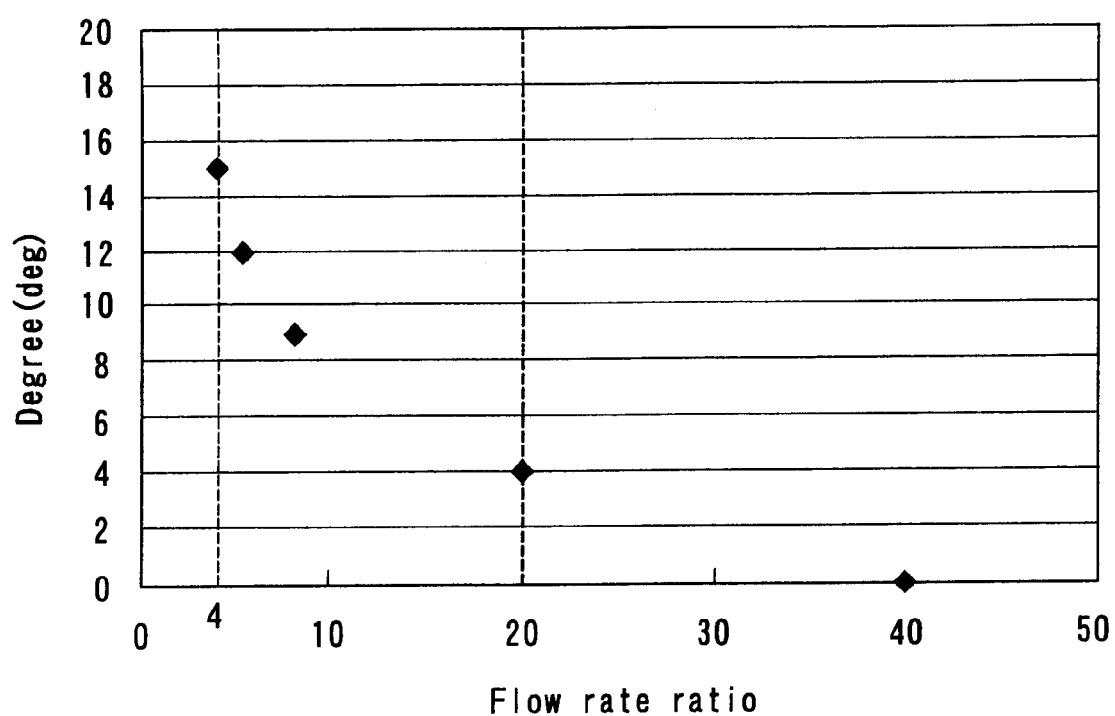
FIG. 11 is a plot for showing a result of a first experiment for finding out conditions for etching of the first embodiment of the invention.
Figure 12:
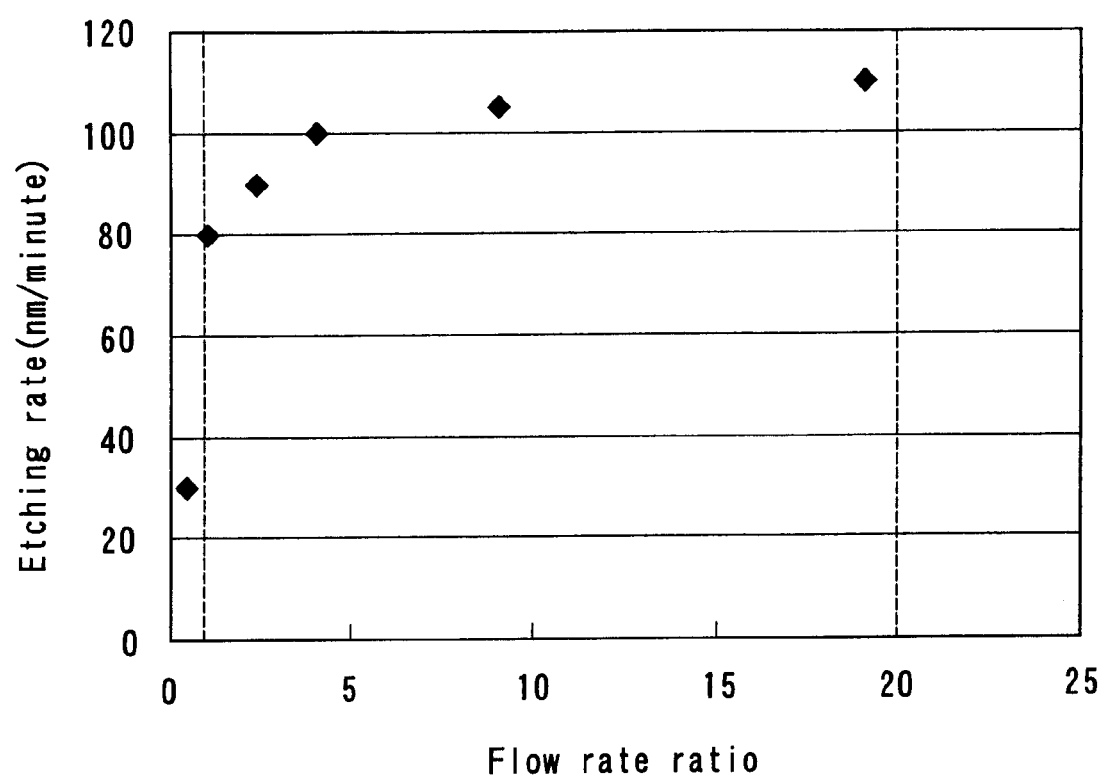
FIG. 12 is a plot for showing a result of a second experiment for finding out conditions for etching of the first embodiment of the invention.

Reference is now made to FIG. 11 and FIG. 12 to describe details of the conditions for etching the nonmagnetic layer 12P by reactive ion etching to form the groove 12a of the nonmagnetic layer 12P. The following is a description of an example in which the nonmagnetic layer 12P is made of $Al_2O_3$. In this case, an etching gas used for reactive ion etching preferably includes a first gas containing chlorine (Cl) or bromine (Br) and a second gas containing fluorine (F). The first gas contains any of $BCl_3$, $Cl_2$, $BBr_3$ and HCl, for example. The second gas contains any of $CF_4$, $C_2F_6$, $SF_6$ and $CHF_3$, for example.

The first gas is a main component that contributes to etching of the nonmagnetic layer 12P. The second gas is provided for forming a sidewall protection film on the sidewall of the groove 12a during etching. That is, when the nonmagnetic layer 12P made of $Al_2O_3$ is etched by reactive ion etching with the etching gas including the second gas, a reaction product made of AlF is formed during the etching reaction of $Al_2O_3$. Since this product is very hard to evaporate, it deposits on the sidewall of the groove 12a and forms the sidewall protection film. Because of formation of the sidewall protection film, the etching exhibits anisotropy, and an angle greater than 0 degree is formed between the wall of the groove 12a and the direction orthogonal to the top surface of the substrate 1. This angle is controllable by controlling the components of the etching gas. The following is a description of first and second experiments performed for obtaining preferred conditions for the etching.

In the first experiment the first gas is a mixed gas of a $BCl_3$ gas and a $Cl_2$ gas, and the second gas is a $CF_4$ gas. A value is obtained by dividing the flow rate of the first gas by the flow rate of the second gas. The relationship between this value and the angle formed between the wall of the groove 12a and the direction orthogonal to the top surface of the substrate 1 is obtained. FIG. 11 shows the result of the first experiment. In FIG. 11 the horizontal axis indicates the value obtained by dividing the flow rate of the first gas by the flow rate of the second gas (indicated as flow rate ratio in FIG. 11). The vertical axis indicates the angle formed between the wall of the groove 12a and the direction orthogonal to the top surface of the substrate 1 (indicated as degree in FIG. 11). According to the first experiment, as the value obtained by dividing the flow rate of the first gas by the flow rate of the second gas increases in a range of 4 to 20, the angle formed between the wall of the groove 12a and the direction orthogonal to the top surface of the substrate 1 decreases in a range of 4 to 15 degrees. If the value obtained by dividing the flow rate of the first gas by the flow rate of the second gas is greater than 20, the angle is smaller than 4 degrees, and the wall of the groove 12a is nearly orthogonal to the top surface of the substrate 1. If the value obtained by dividing the flow rate of the first gas by the flow rate of the second gas is smaller than 4, etching of the nonmagnetic layer 12P is stopped when the width of the groove 12a is small, in particular, and a phenomenon in which accumulation of a reaction product starts may occur. From these findings, it is preferable that the flow rate of the first gas fall within a range of four times to twenty times the flow rate of the second gas when the nonmagnetic layer 12P is made of $Al_2O_3$, the first gas is a mixed gas of a $BCl_3$ gas and a $Cl_2$ gas, and the second gas is a $CF_4$ gas.

In the second experiment a mixed gas of a $BCl_3$ gas and a $Cl_2$ gas is used as an etching gas. A value is obtained by dividing the flow rate of the $BCl_3$ gas by the flow rate of the $Cl_2$ gas. The relationship between this value and the etching rate of the nonmagnetic layer 12P is obtained. FIG. 12 shows the result. In FIG. 12 the horizontal axis indicates the value obtained by dividing the flow rate of the $BCl_3$ gas by the flow rate of the $Cl_2$ gas (indicated as flow rate ratio in FIG. 12). The vertical axis indicates the etching rate of the nonmagnetic layer 12P (wherein the unit is nm/minute). The $BCl_3$ gas has a greater contribution to etching of $Al_2O_3$ than the $Cl_2$ gas does. Consequently, as the result of the experiment of FIG. 12 shows, the etching rate increases as the value obtained by dividing the flow rate of the $BCl_3$ gas by the flow rate of the $Cl_2$ gas increases. According to the second experiment, it is noted that the etching rate abruptly decreases if the value obtained by dividing the flow rate of the $BCl_3$ gas by the flow rate of the $Cl_2$ gas is smaller than 1. According to the second experiment, it is noted that, if the value obtained by dividing the flow rate of the $BCl_3$ gas by the flow rate of the $Cl_2$ gas is greater than 20, a boron (B)-base reaction product may deposit on the mask 31 or the polishing stopper layer 13. If this product deposits, there arises a problem that it is difficult to remove the mask 31 and/or a problem that particles develop. From the above findings, it is preferable that the flow rate of the BCl$_3$ gas fall within a range of one time to twenty times the flow rate of the Cl$_2$ gas inclusive when the nonmagnetic layer 12P is made of Al$_2$O$_3$, and the first gas is a mixed gas of a BCl$_3$ gas and a Cl$_2$ gas.

Figure 13:
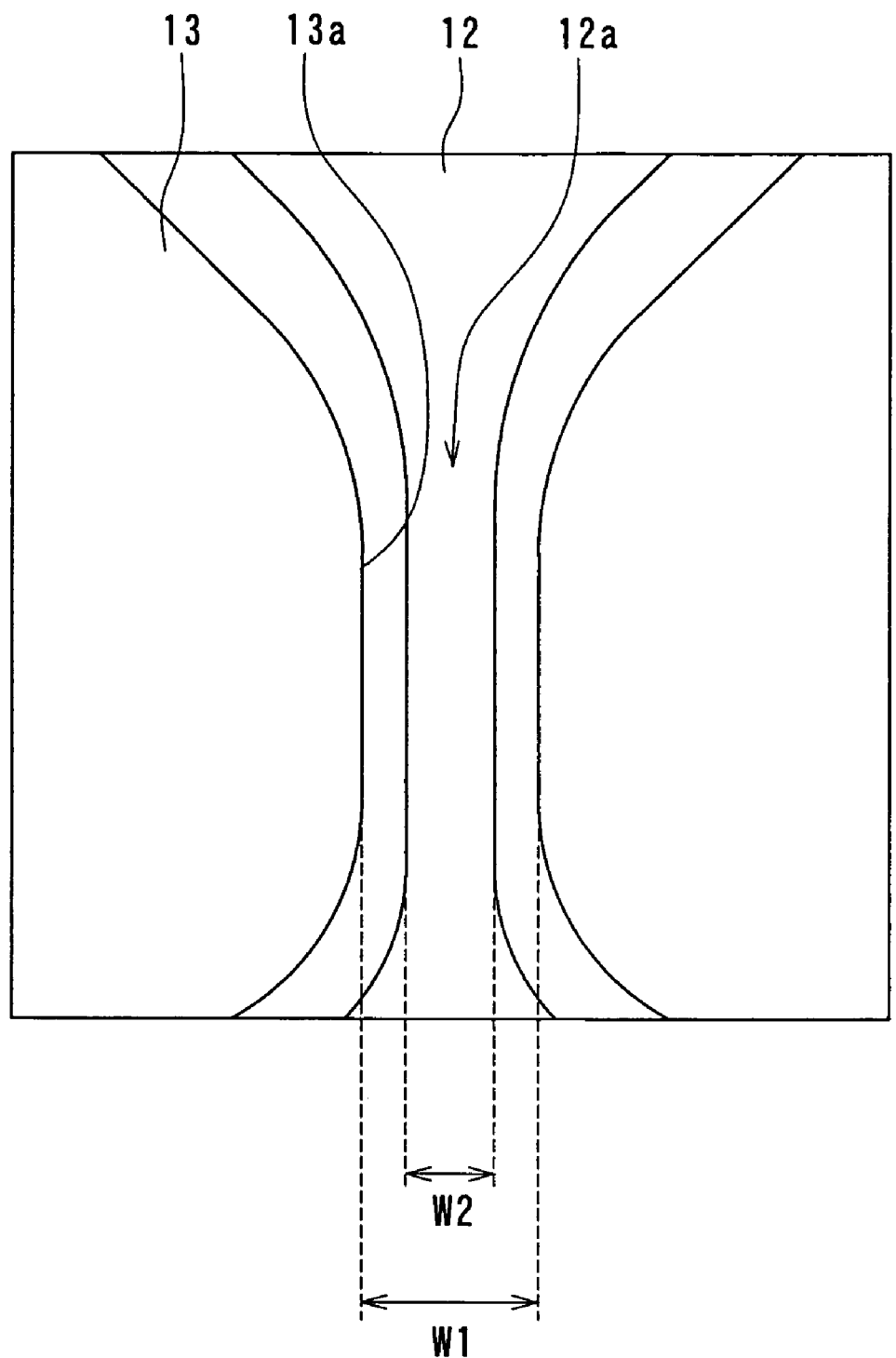
FIG. 13 is a view for illustrating a method of obtaining an angle formed between the wall of the groove and the direction orthogonal to the top surface of the substrate in the first embodiment of the invention.

Reference is now made to FIG. 13 to describe details of the method of obtaining the angle between the wall of the groove 12a and the direction orthogonal to the top surface of the substrate 1 by measuring the width of the groove 12a in the top surface of the pole-layer-encasing layer 12 and the width of the bottom of the groove 12a. FIG. 13 schematically illustrates an image obtained by observing through a scanning electron microscope the top surface of the layered structure obtained by removing the mask 31 from the layered structure illustrated in FIG. 4A to FIG. 4C. FIG. 13 illustrates a neighborhood of the portion of the layered structure corresponding to the track width defining portion 16A of the pole layer 16.

As described above, the edge of the opening 13a of the polishing stopper layer 13 is located directly above the edge of the groove 12a located in the top surface of the pole-layer-encasing layer 12. Therefore, the width W1 of the opening 13a is equal to the width of the groove 12a in the top surface of the encasing layer 12. As a result, the width W1 of the opening 13a is measured in the image obtained by the scanning electron microscope so as to measure the width of the groove 12a in the top surface of the encasing layer 12. Since the polishing stopper layer 13 is made of a conductive material, the location of the edge of the opening 13a of the polishing stopper layer 13 is clearly shown in the image obtained by the scanning electron microscope.

The pole-layer-encasing layer 12 is made of Al$_2$O$_3$, for example. In this case, electric charges accumulate on the surface of the encasing layer 12 when observation by the scanning electron microscope is performed. However, charges are hard to accumulate on the wall of the groove 12a since the wall is tilted with a great angle with respect to the top surface of the substrate 1. Therefore, the location of the boundary between the wall of the groove 12a and the bottom thereof is clearly shown in the image obtained by the scanning electron microscope. As a result, it is possible to measure the width W2 of the bottom of the groove 12a in the image obtained by the scanning electron microscope.

It is possible to obtain the angle between the wall of the groove 12a and the direction orthogonal to the top surface of the substrate 1 by calculation if the depth of the groove 12a is known, in addition to the widths W1 and W2 measured as described above. Here, it is possible to obtain the depth of the groove 12a by preparing a sample for measuring the depth of the groove 12a in advance, cutting the sample so that the cross section shown in FIG. 4C appears, and observing the cross section by a scanning electron microscope, for example. When the nonmagnetic layer 12P is etched by reactive ion etching, the etching rate of the nonmagnetic layer 12P is nearly constant. Consequently, if the etching period is constant, the depth of the groove 12a is nearly uniform, too. Therefore, the depth of the groove 12a is obtained without measuring in the course of the manufacturing process of the magnetic head if the depth of the groove 12a is measured in advance through the use of the sample for measuring the depth.

As thus described, if the width of the groove 12a in the top surface of the pole-layer-encasing layer 12 and the width of the bottom of the groove 12a are measured in the course of the manufacturing process of the magnetic head, it is possible to obtain the angle between the wall of the groove 12a and the direction orthogonal to the top surface of the substrate 1 by calculation using the above-mentioned widths and the known depth of the groove 12a. As a result, it is possible to confirm whether the groove 12a having a desired shape is formed in the course of the manufacturing process of the magnetic head, and the efficiency in manufacturing the magnetic head is thereby improved.

Figures 14A, 14B:
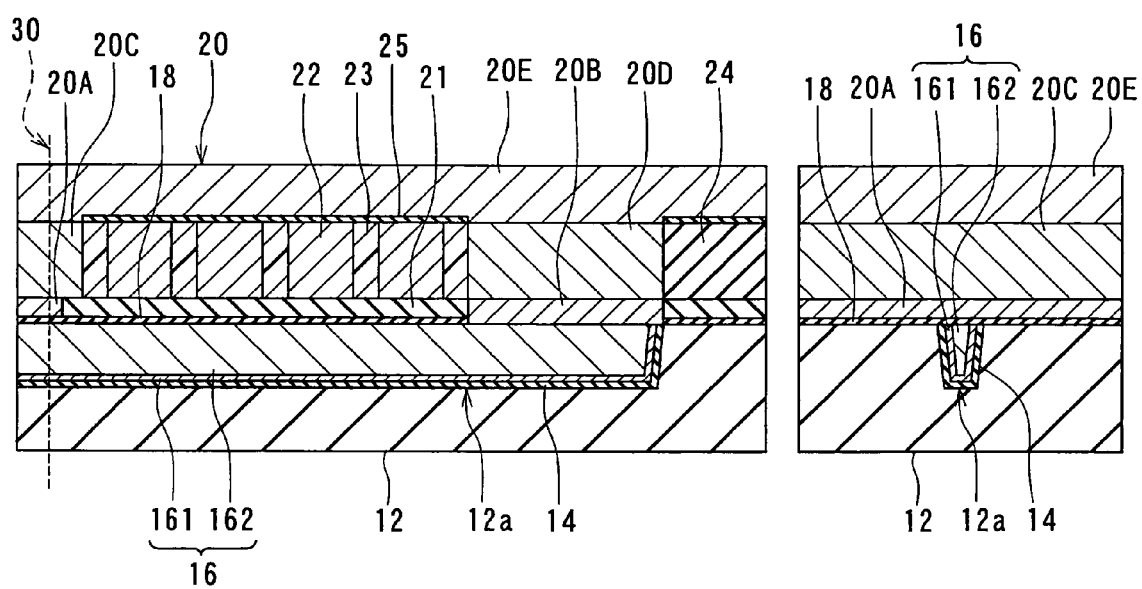
FIG. 14A and FIG. 14B are views for illustrating a first modification example of the magnetic head of the first embodiment of the invention.

FIG. 14A and FIG. 14B illustrate a first modification example of the magnetic head of the embodiment. FIG. 14A illustrates a cross section of the main part of the magnetic head orthogonal to the medium facing surface and the substrate. FIG. 14B illustrates a cross section of the main part of the magnetic head near the medium facing surface, the cross section being parallel to the medium facing surface. In FIG. 14A and FIG. 14B the portion closer to the substrate 1 than the pole-layer-encasing layer 12 is omitted.

In the first modification example, the polishing stopper layer 13 is removed. In addition, the top surfaces of the pole-layer-encasing layer 12, the nonmagnetic film 14, the first layer 161 and the second layer 162 are flattened, and the gap layer 18 is disposed on these top surfaces. The remainder of configuration of the magnetic head of the first modification example is the same as that of the magnetic head shown in FIG. 1 and FIG. 2.

In the method of manufacturing the magnetic head of the first modification example, as shown in FIG. 8A to FIG. 8C, the coating layer 32, the second magnetic layer 162P, the first magnetic layer 161P and the nonmagnetic film 14 are polished until the polishing stopper layer 13 is exposed, and then the polishing stopper layer 13 is selectively removed by reactive ion etching or ion beam etching, for example. Next, the nonmagnetic film 14, the first magnetic layer 161P and the second magnetic layer 162P are slightly polished by CMP, for example, and the top surfaces of the pole-layer-encasing layer 12, the nonmagnetic film 14, the first magnetic layer 161P and the second magnetic layer 162P are thereby flattened.

Alternatively, after the coating layer 32, the second magnetic layer 162P, the first magnetic layer 161P and the nonmagnetic film 14 are polished until the polishing stopper layer 13 is exposed, ion beam etching may be performed to remove the polishing stopper layer 13 and to etch portions of the nonmagnetic film 14, the first magnetic layer 161P and the second magnetic layer 162P, so that the top surfaces of the pole-layer-encasing layer 12, the nonmagnetic film 14, the first magnetic layer 161P and the second magnetic layer 162P are flattened. Preferably, this etching is performed such that the direction in which ion beams move forms an angle that falls within a range of 40 to 75 degrees inclusive with respect to the direction orthogonal to the top surface of the substrate 1. More preferably, this angle falls within a range of 40 to 55 degrees inclusive. If the pole-layer-encasing layer 12 is made of alumina, the etching rate E2 of the magnetic layers 161P and 162P for ion beam etching is higher than the etching rate E1 of the encasing layer 12, and the etching rate E3 of the polishing stopper layer 13 is higher than the etching rate E2 of the magnetic layers 161P and 162P. Here, if ion beam etching is performed such that the direction in which ion beams move forms an angle that falls within the above-mentioned range with respect to the direction orthogonal the top surface of the substrate 1, it is possible to increase the etching selectivities E2/E1 and E3/E1. It is thereby possible that the top surfaces of the encasing layer 12 and the magnetic layers 161P and 162P are located at the nearly same levels. As a result, the track width is easily controlled.

As thus described, the first magnetic layer 161P and the second magnetic layer 162P are formed into the first layer 161 and the second layer 162, respectively, and the structure is obtained wherein the top surfaces of the pole-layer-encasing layer 12, the nonmagnetic film 14, the first layer 161 and the second layer 162 are flattened. Next, the gap layer 18 is formed on the entire top surface of the layered structure. The following steps of the method of manufacturing the magnetic head of the first modification example are the same as those of the method of manufacturing the magnetic head shown in FIG. 1 and FIG. 2.

Figure 15A:
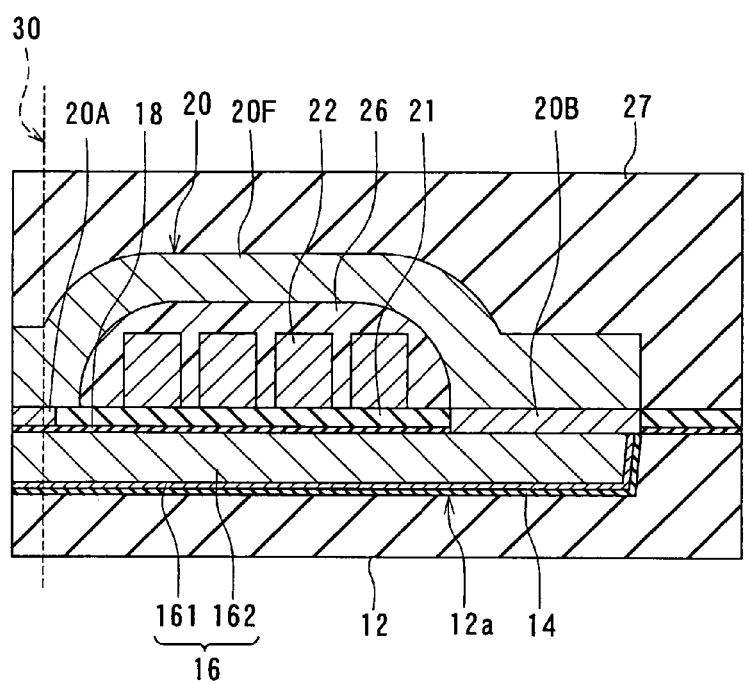
FIG. 15A and FIG. 15B are views for illustrating a second modification example of the magnetic head of the first embodiment of the invention.
Figure 15B:
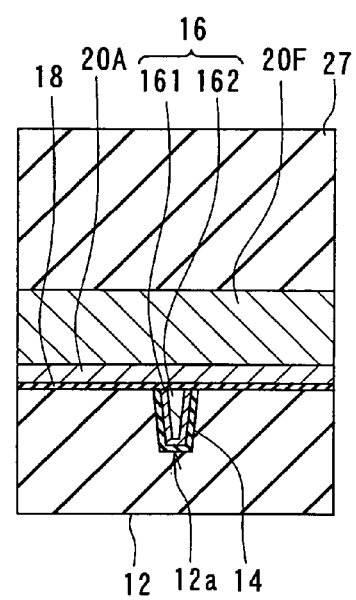

FIG. 15A and FIG. 15B illustrate a second modification example of the magnetic head of the embodiment. FIG. 15A illustrates a cross section of the main part of the magnetic head orthogonal to the medium facing surface and the substrate. FIG. 15B illustrates a cross section of the main part of the magnetic head near the medium facing surface, the cross section being parallel to the medium facing surface. In FIG. 15A and FIG. 15B the portion closer to the substrate 1 than the pole-layer-encasing layer 12 is omitted.

The second modification example comprises an insulating layer 26 covering at least part of the coil 22 in place of the insulating layers 23 and 25 of FIG. 2. The shield layer 20 of the second modification example comprises a second layer 20F in place of the second layer 20C, the coupling layer 20D and the third layer 20E of FIG. 2. The second layer 20F has an end located in the medium facing surface 30, and is disposed to couple the first layer 20A to the coupling layer 20B. The second layer 20F includes a portion located on a side of the at least part of the coil 22 covered with the insulating layer 26, the side being opposite to the pole layer 16. The second layer 20F includes a portion located between the medium facing surface 30 and the coil 22. In this portion the distance between the end located in the medium facing surface 30 and the other end increases as the distance from the first layer 20A increases. The second layer 20F is made of CoNiFe or NiFe, for example.

The second modification example comprises an insulating layer 27 in place of the insulating layer 24 of FIG. 2. The insulating layer 27 is disposed around the second layer 20F, and is made of alumina, for example. The remainder of configuration of the magnetic head of the second modification example is the same as that of the first modification example.

A method of manufacturing the magnetic head of the second modification example includes the steps up to the step of forming the coil 22 that are the same as those of the first modification example. In the second modification example, after the coil 22 is formed, the insulating layer 26, the second layer 20F, and the insulating layer 27 are formed one by one. The following steps of the method of manufacturing the magnetic head of the second modification example are the same as those of the method of manufacturing the magnetic head shown in FIG. 1 and FIG. 2.

Second Embodiment

A magnetic head and a method of manufacturing the same of a second embodiment of the invention will now be described. Reference is now made to FIG. 16A to FIG. 23A, FIG. 16B to FIG. 23B, and FIG. 16C to FIG. 21C to describe the method of manufacturing the magnetic head of the second embodiment. FIG. 16A to FIG. 21A each illustrate the top surface of a layered structure in the course of the manufacturing process of the magnetic head. FIG. 16B to FIG. 21B each illustrate a cross section of the layered structure orthogonal to the medium facing surface and the substrate. FIG. 16C to FIG. 21C each illustrate a cross section of a portion of the layered structure near the medium facing surface, the cross section being parallel to the medium facing surface. FIG. 22A and FIG. 23A each illustrate a cross section of the layered structure orthogonal to the medium facing surface and the substrate. FIG. 22B and FIG. 23B each illustrate a cross section of a portion of the layered structure near the medium facing surface, the cross section being parallel to the medium facing surface. Portions closer to the substrate 1 than the pole-layer-encasing layer 12 are omitted in FIG. 16A to FIG. 23A, FIG. 16B to FIG. 23B, and FIG. 16C to FIG. 21C.

The method of manufacturing the magnetic head of the second embodiment includes the steps up to the step of forming the nonmagnetic layer 12P that are the same as those of the first embodiment. FIG. 16A to FIG. 16C illustrate the following step. In the step, first, a lower polishing stopper layer 33 made of a nonmagnetic material is formed by sputtering, for example, on the nonmagnetic layer 12P. The lower polishing stopper layer 33 is made of a nonmagnetic conductive material, for example. The material of the lower polishing stopper layer 33 may be the same as the material of the polishing stopper layer 13 of the first embodiment. The lower polishing stopper layer 33 has a thickness that falls within a range of 20 to 60 nm inclusive, for example.

Next, a photoresist layer having a thickness of 1.0 μm, for example, is formed on the lower polishing stopper layer 33. The photoresist layer is then patterned to form the mask 31 for making the groove 12a in the encasing layer 12. The mask 31 has an opening having a shape corresponding to the groove 12a.

Next, the lower polishing stopper layer 33 is selectively etched, using the mask 31. An opening 33a that penetrates is thereby formed in the lower polishing stopper layer 33. The opening 33a has a shape corresponding to the plane geometry of the pole layer 16 to be formed later. Furthermore, a portion of the nonmagnetic layer 12P exposed from the opening 33a of the lower polishing stopper layer 33 is selectively etched so as to form the groove 12a of the nonmagnetic layer 12P. The mask 31 is then removed. The nonmagnetic layer 12P is formed into the pole-layer-encasing layer 12 by forming the groove 12a therein. The lower polishing stopper layer 33 indicates the level at which polishing of a second polishing step to be performed later is stopped. The edge of the opening 33a of the lower polishing stopper layer 33 is located directly above the edge of the groove 12a located in the top surface of the pole-layer-encasing layer 12. The conditions for etching of each of the lower polishing stopper layer 33 and the nonmagnetic layer 12P are the same as the conditions for etching of the polishing stopper layer 13 and the nonmagnetic layer 12P of the first embodiment.

Next, the width of the groove 12a in the top surface of the pole-layer-encasing layer 12 is measured by measuring the width of the opening 33a of the lower polishing stopper layer 33 through the use of an electron microscope. At the same time, the width of the bottom of the groove 12a of the encasing layer 12 may be measured. It is thereby possible to obtain the angle between the wall of the groove 12a and the direction orthogonal to the top surface of the substrate 1. The same methods as the first embodiment are employed as the methods of measuring the width of the groove 12a in the top surface of the encasing layer 12 and the width of the bottom of the groove 12a, and as the method of obtaining the angle between the wall of the groove 12a and the direction orthogonal to the top surface of the substrate 1.

In a step of the second embodiment that will be performed later, the pole layer 16 is formed in the groove 12a with a spacer layer 34 and an upper polishing stopper layer 35 provided between the pole layer 16 and the pole-layer-encasing layer 12. Therefore, the track width is a value obtained by subtracting the value of twice the thickness of the spacer layer 34 and the value of twice the thickness of the upper polishing stopper layer 35 from the width of the groove 12a in the top surface of the encasing layer 12 in the medium facing surface 30. The thickness of the spacer layer 34 and the thickness of the upper polishing stopper layer 35 are controllable with precision. Therefore, the track width is obtained by measuring the width of the groove 12a in the top surface of the encasing layer 12 in the medium facing surface 30.

Figure 17A:
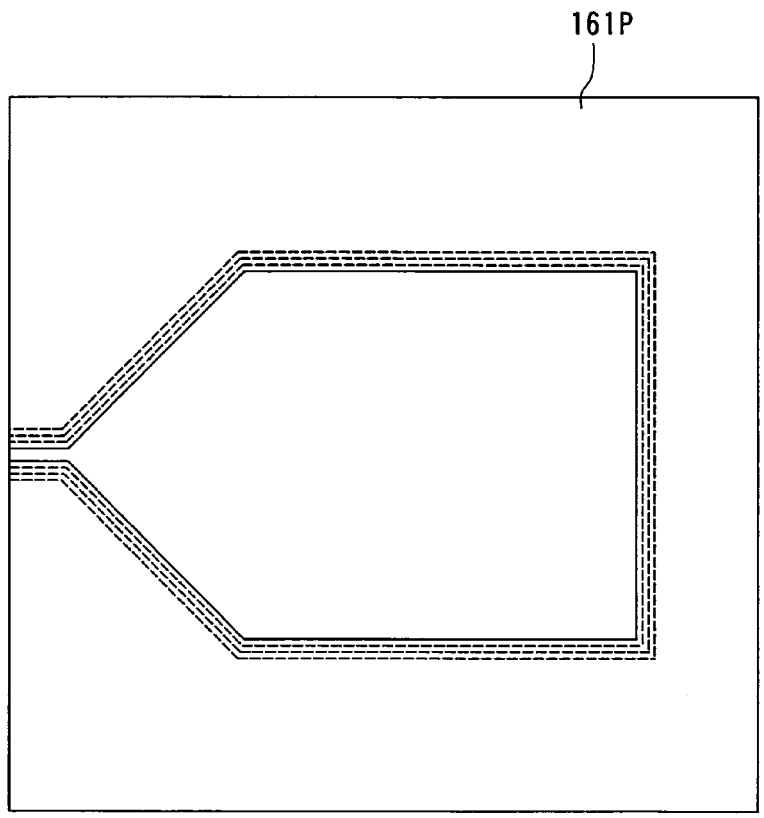
FIG. 17A to FIG. 17C are views for illustrating a step that follows the step shown in FIG. 16A to FIG. 16C.
Figure 17B:
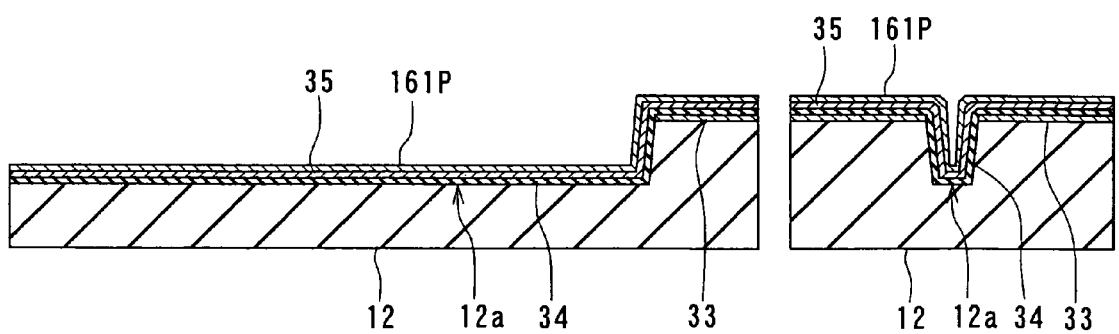
Figure 17C:
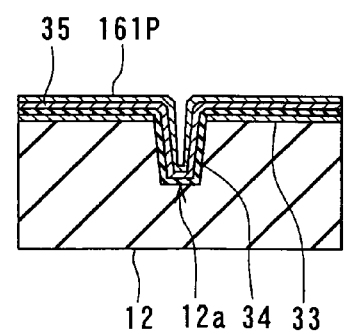

FIG. 17A to FIG. 17C illustrate the following step. In the step, first, the spacer layer 34 made of a nonmagnetic material and having a specific thickness is formed in the groove 12a of the pole-layer-encasing layer 12 and on the lower polishing stopper layer 33. The spacer layer 34 is made of an insulating material or a semiconductor material, for example. The material, thickness and forming method of the spacer layer 34 are the same as those of the nonmagnetic film 14 of the first embodiment.

Next, the upper polishing stopper layer 35 made of a nonmagnetic material is formed on the spacer layer 34. The upper polishing stopper layer 35 is formed by sputtering or IBD, for example. If the upper polishing stopper layer 35 is formed by sputtering, it is preferred to employ collimation sputtering or long throw sputtering. The material of the upper polishing stopper layer 35 may be the same as that of the polishing stopper layer 13 of the first embodiment. The upper polishing stopper layer 35 has a thickness that falls within a range of 20 to 60 nm inclusive, for example.

Next, the first magnetic layer 161P to be the first layer 161 of the pole layer 16 is formed on the upper polishing stopper layer 35. The first magnetic layer 161P has a thickness that falls within a range of 40 to 60 nm inclusive, for example. The material and forming method of the first magnetic layer 161P are the same as those of the first embodiment.

Figure 18A:
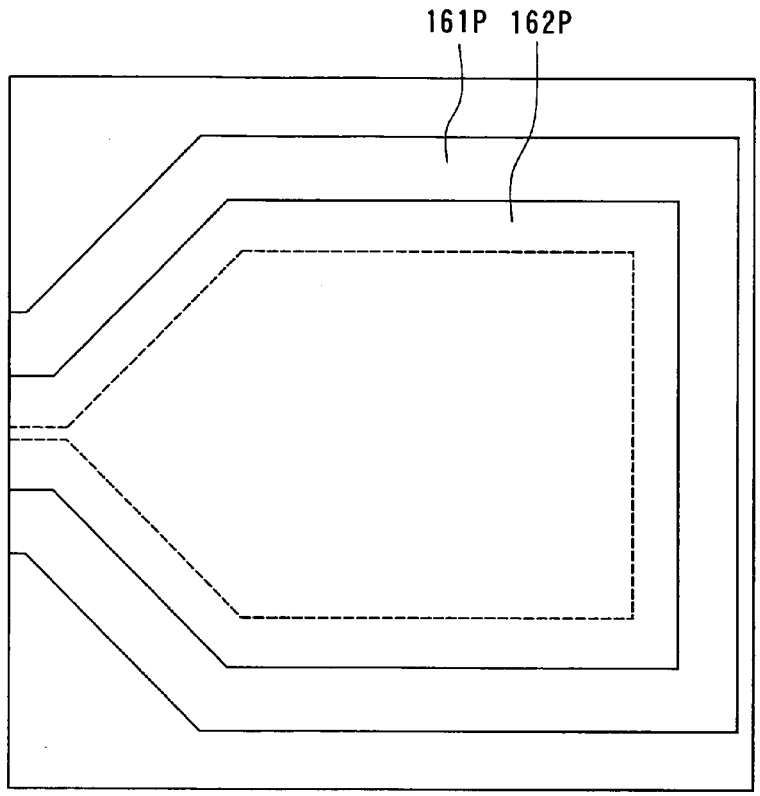
FIG. 18A to FIG. 18C are views for illustrating a step that follows the step shown in FIG. 17A to FIG. 17C.
Figure 18B:
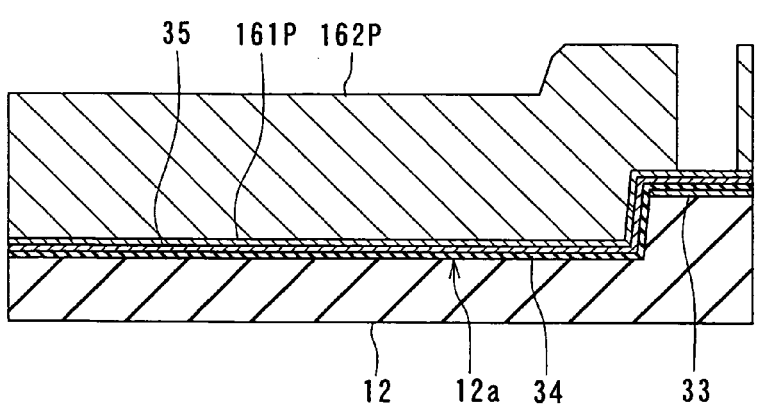
Figure 18C:
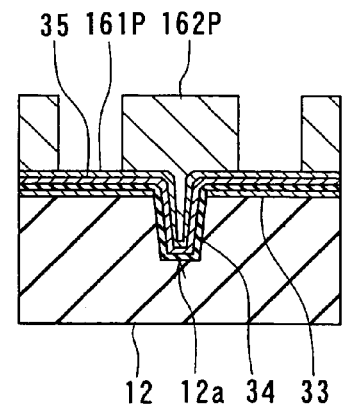

Next, as shown in FIG. 18A to FIG. 18C, the second magnetic layer 162P to be the second layer 162 of the pole layer 16 is formed on the magnetic layer 161P. The second magnetic layer 162P is formed by frame plating, for example. In this case, the first magnetic layer 161P is used as an electrode for plating. If the upper polishing stopper layer 35 is made of a conductive material, the upper polishing stopper layer 35 is used as an electrode for plating, too.

Figure 19A:
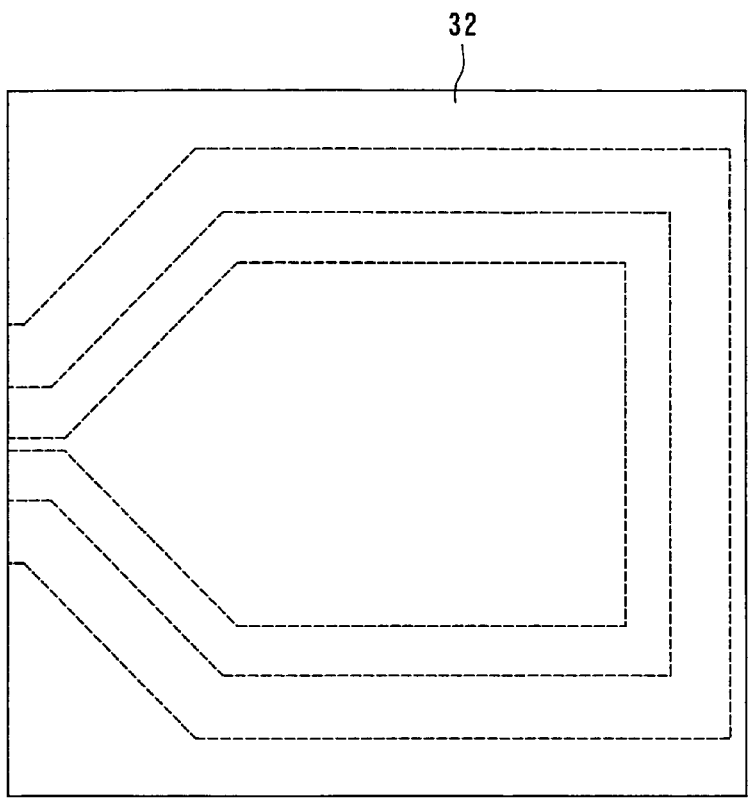
FIG. 19A to FIG. 19C are views for illustrating a step that follows the step shown in FIG. 18A to FIG. 18C.
Figure 19B:
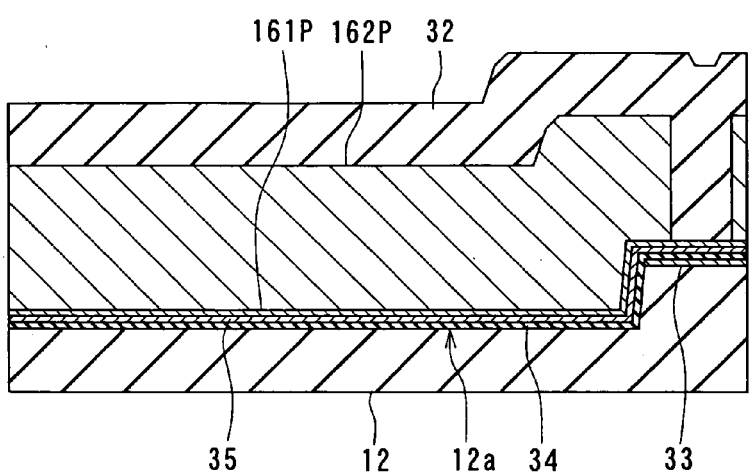
Figure 19C:
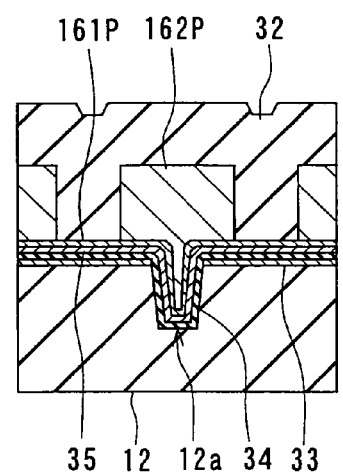

Next, as shown in FIG. 19A to FIG. 19C, the coating layer 32 made of alumina, for example, and having a thickness of 0.5 to 1.2 μm, for example, is formed on the entire top surface of the layered structure.

Next, as shown in FIG. 20A to FIG. 20C, the coating layer 32, the second magnetic layer 162P and the first magnetic layer 161P are polished by CMP, for example, so that the upper polishing stopper layer 35 is exposed, and the top surfaces of the upper polishing stopper layer 35, the first magnetic layer 161P and the second magnetic layer 162P are thereby flattened. This step of polishing corresponds to the first polishing step of the invention. If the coating layer 32, the second magnetic layer 162P and the first magnetic layer 161P are polished by CMP, such a slurry is used that polishing is stopped when the upper polishing stopper layer 35 is exposed, such as an alumina-base slurry.

Figure 21A:
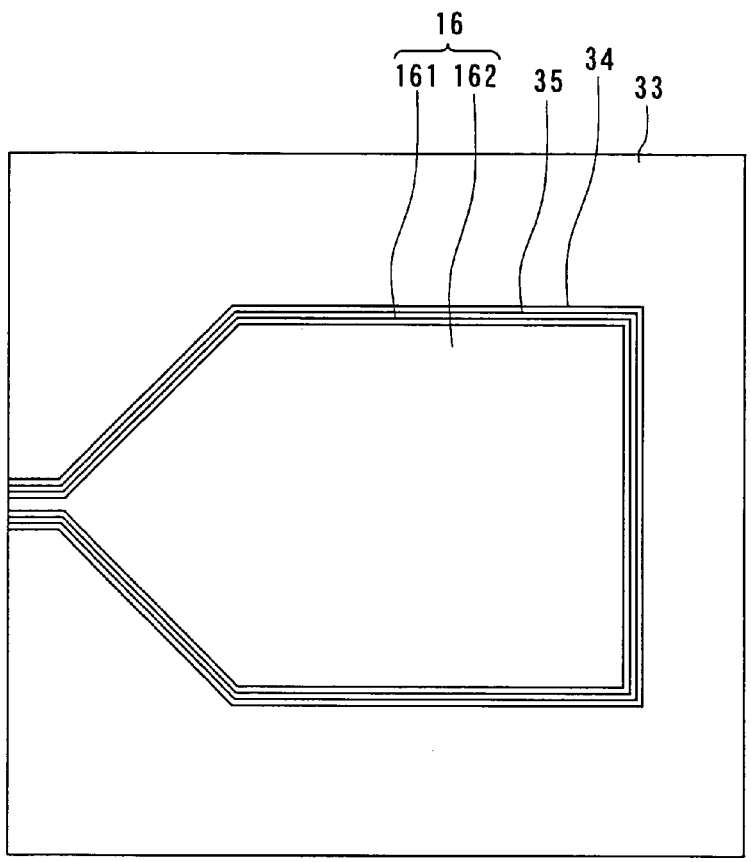
FIG. 21A to FIG. 21C are views for illustrating a step that follows the step shown in FIG. 20A to FIG. 20C.
Figure 21B:
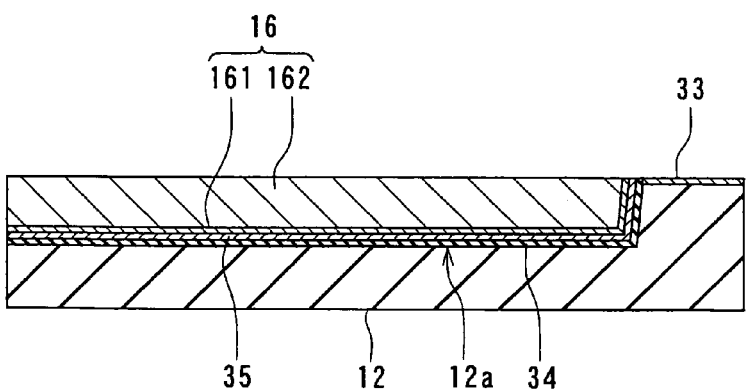
Figure 21C:
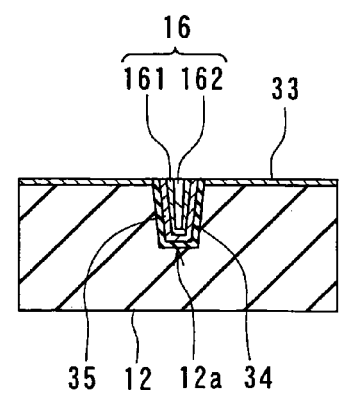

FIG. 21A to FIG. 21C illustrate the following step. In the step, first, a portion of the upper polishing stopper layer 35 exposed from the top surface of the layered structure is selectively removed by reactive ion etching or ion beam etching, for example. Next, the spacer layer 34, the upper polishing stopper layer 35, the first magnetic layer 161P and the second magnetic layer 162P are polished by CMP, for example, so that the lower polishing stopper layer 33 is exposed, and the top surfaces of the lower polishing stopper layer 33, the spacer layer 34, the upper polishing stopper layer 35, the first magnetic layer 161P and the second magnetic layer 162P are thereby flattened. As a result, the remaining first magnetic layer 161P and second magnetic layer 162P are formed into the first layer 161 and the second layer 162, respectively. This step of polishing corresponds to the second polishing step of the invention. If the spacer layer 34, the upper polishing stopper layer 35, the first magnetic layer 161P and the second magnetic layer 162P are polished by CMP, such a slurry is used that polishing is stopped when the lower polishing stopper layer 33 is exposed, such as an alumina-base slurry. It is possible to control the thickness of the pole layer 16 made up of the first layer 161 and the second layer 162 with accuracy by stopping the polishing when the lower polishing stopper layer 33 is exposed as thus described.

FIG. 22A and FIG. 22B illustrate the following step. The steps that follow are the same as those of the first embodiment. That is, in the step illustrated in FIG. 22A and FIG. 22B, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. Next, the nonmagnetic layer 21 is formed on the entire top surface of the layered structure. Next, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened.

FIG. 23A and FIG. 23B illustrate the following step. In the step, first, the coil 22, the second layer 20C and the coupling layer 20D are formed as in the first embodiment. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the magnetic head of the second embodiment, the lower polishing stopper layer 33 and the spacer layer 34 are provided in place of the polishing stopper layer 13 and the nonmagnetic film 14, respectively, of the first embodiment. Furthermore, in the magnetic head of the second embodiment, the upper polishing stopper layer 35 is provided between the first layer 161 and the spacer layer 34 in the groove 12a of the pole-layer-encasing layer 12. The remainder of configuration of the magnetic head of the second embodiment is the same as that of the first embodiment. In the magnetic head of the second embodiment, the pole layer 16 is disposed in the groove 12a of the encasing layer 12 with the spacer layer 34 and the upper polishing stopper layer 35 disposed between the pole layer 16 and the encasing layer 12. As a result, according to the embodiment, it is possible that the width of the top surface of the track width defining portion 16A that defines the track width is made much smaller.

The method of manufacturing the magnetic head of the second embodiment comprises the following first to tenth steps relating to formation of the pole layer 16. The first step is the step of forming the nonmagnetic layer 12P that will be formed into the pole-layer-encasing layer 12 by forming the groove 12a therein. The second step is the step of forming the lower polishing stopper layer 33 on the top surface of the nonmagnetic layer 12P wherein the lower polishing stopper layer 33 has the penetrating opening 33a having a shape corresponding to the plane geometry of the pole layer 16, and indicates the level at which polishing of the second polishing step to be performed later is stopped. The third step is the step of forming the groove 12a in the nonmagnetic layer 12P by selectively etching the portion of the nonmagnetic layer 12P exposed from the opening 33a of the lower polishing stopper layer 33, so that the nonmagnetic layer 12P is formed into the pole-layer-encasing layer 12. The fourth step is the step of forming the spacer layer 34 having a specific thickness on the lower polishing stopper layer 33 after the third step.

The fifth step is the step of forming the upper polishing stopper layer 35 on the spacer layer 34 wherein the stopper layer 35 indicates the level at which polishing of the first polishing step to be performed later is stopped. The sixth step is the step of forming the magnetic layers 161P and 162P to be the pole layer 16 after the groove 12a and the polishing stopper layer 35 are formed, such that the groove 12a is filled and the top surfaces of the magnetic layers 161P and 162P are located higher than the top surface of the polishing stopper layer 35. The seventh step is the step of forming the coating layer 32 to cover the magnetic layers 161P and 162P and the polishing stopper layer 35.

The eighth step is the first polishing step of polishing the coating layer 32 and the magnetic layers 161P and 162P until the upper polishing stopper layer 35 is exposed. The ninth step is the step of removing the upper polishing stopper layer 35 after the first polishing step. The tenth step is the second polishing step of polishing the spacer layer 34 and the magnetic layers 161P and 162P until the lower polishing stopper layer 33 is exposed, so that the magnetic layers 161P and 162P are formed into the pole layer 16.

According to the second embodiment, even if there is a great variation in thickness of the magnetic layer 162P, it is possible through the first polishing step that the top surfaces of the magnetic layers 161P and 162P are located at a level almost the same as the level at which the top surface of the upper polishing stopper layer 35 is located. However, since the amount of polishing of the first polishing step is great, a small difference in level may be created between the top surface of the stopper layer 35 and the top surfaces of the magnetic layers 161P and 162P when the first polishing step is completed. However, according to the second embodiment, the second polishing step with a small amount of polishing is performed after the stopper layer 35 is removed, and it is thereby possible to flatten the top surfaces of the lower polishing stopper layer 33, the first magnetic layer 161P and the second magnetic layer 162P, such that a difference in level is hardly created between the top surface of the stopper layer 33 and the top surfaces of the magnetic layers 161P and 162P. As a result, according to the embodiment, it is possible to control the thickness of the pole layer 16 made up of the first layer 161 and the second layer 162 with high accuracy. It is therefore possible to control the track width with high accuracy.

According to the second embodiment, if the upper polishing stopper layer 35 is made of a conductive material, the stopper layer 35 and the first magnetic layer 161P function as electrodes for plating when the second magnetic layer 162P is formed by plating. Therefore, even if the first magnetic layer 161P is thin, it is possible to feed a sufficient current to the stopper layer 35 and the first magnetic layer 161P as the electrodes. It is thereby possible to form the second magnetic layer 162P that is uniform in the groove 12a. As a result, according to the embodiment, it is possible to form the pole layer 16 that is uniform with accuracy even if the groove 12a has a small width.

In the second embodiment, the first layer 161 of the pole layer 16 may be omitted if the upper polishing stopper layer 35 is made of a conductive material. If the first layer 161 is omitted, a magnetic layer to be the pole layer 16 is formed by plating, for example, on the stopper layer 35.

The remainder of configuration, operation and effects of the second embodiment are similar to those of the first embodiment.

Figures 24A, 24B:
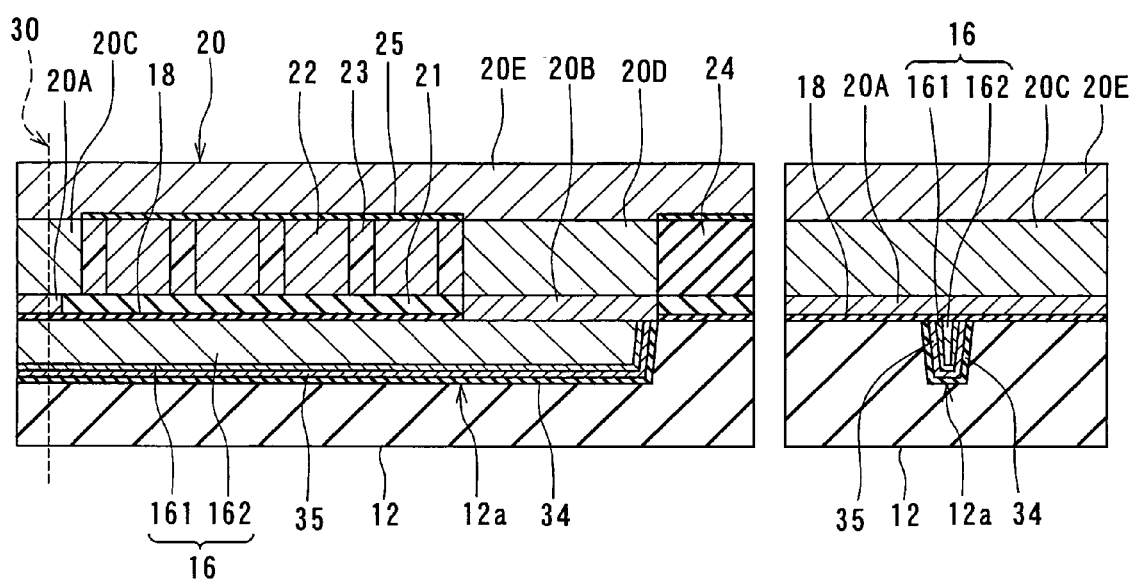
FIG. 24A and FIG. 24B are views for illustrating a modification example of the magnetic head of the second embodiment of the invention.

FIG. 24A and FIG. 24B illustrate a modification example of the magnetic head of the second embodiment. FIG. 24A illustrates a cross section of the main part of the magnetic head orthogonal to the medium facing surface and the substrate. FIG. 24B illustrates a cross section of the main part of the magnetic head near the medium facing surface, the cross section being parallel to the medium facing surface. In FIG. 24A and FIG. 24B the portion closer to the substrate 1 than the pole-layer-encasing layer 12 is omitted.

In the modification example, the lower polishing stopper layer 33 is removed. In addition, the top surfaces of the pole-layer-encasing layer 12, the spacer layer 34, the upper polishing stopper layer 35, the first layer 161 and the second layer 162 are flattened, and the gap layer 18 is disposed on these top surfaces. The remainder of configuration of the magnetic head of the modification example is the same as that of the magnetic head shown in FIG. 23A and FIG. 23B.

In a method of manufacturing the magnetic head of the modification example, as shown in FIG. 21A to FIG. 21C, the spacer layer 34, the upper polishing stopper layer 35, the first magnetic layer 161P and the second magnetic layer 162P are polished until the lower polishing stopper layer 33 is exposed, and then the lower polishing stopper layer 33 is selectively removed by reactive ion etching or ion beam etching, for example. Next, the spacer layer 34, the upper polishing stopper layer 35, the first magnetic layer 161P and the second magnetic layer 162P are slightly polished by CMP, for example, and the top surfaces of the pole-layer-encasing layer 12, the spacer layer 34, the upper polishing stopper layer 35, the first magnetic layer 161P and the second magnetic layer 162P are thereby flattened.

Alternatively, after the spacer layer 34, the upper polishing stopper layer 35, the first magnetic layer 161P and the second magnetic layer 162P are polished until the lower polishing stopper layer 33 is exposed, ion beam etching may be performed to remove the lower polishing stopper layer 33 and to etch portions of the spacer layer 34, the upper polishing stopper layer 35, the first magnetic layer 161P and the second magnetic layer 162P, so that the top surfaces of the pole-layer-encasing layer 12, the spacer layer 34, the upper polishing stopper layer 35, the first magnetic layer 161P and the second magnetic layer 162P are flattened. Preferably, this etching is performed such that the direction in which ion beams move forms an angle that falls within a range of 40 to 75 degrees inclusive with respect to the direction orthogonal to the top surface of the substrate 1. More preferably, this angle falls within a range of 40 to 55 degrees inclusive. As described in the first modification example of the first embodiment, it is thereby possible that the top surfaces of the encasing layer 12 and the magnetic layers 161P and 162P are located at nearly the same levels. As a result, the track width is easily controlled.

As thus described, the first magnetic layer 161P and the second magnetic layer 162P are formed into the first layer 161 and the second layer 162, respectively, and the structure is obtained wherein the top surfaces of the pole-layer-encasing layer 12, the spacer layer 34, the upper polishing stopper layer 35, the first layer 161 and the second layer 162 are flattened. Next, the gap layer 18 is formed on the entire top surface of the layered structure. The following steps of the method of manufacturing the magnetic head of the modification example are the same as those of the method of manufacturing the magnetic head shown in FIG. 23A and FIG. 23B.

In the second embodiment, the shield layer 20 may have a structure the same as that of the second modification example of the first embodiment.

Third Embodiment

A magnetic head and a method of manufacturing the same of a third embodiment of the invention will now be described. Reference is now made to FIG. 25A to FIG. 30A, FIG. 25B to FIG. 30B, and FIG. 25C to FIG. 28C to describe the method of manufacturing the magnetic head of the third embodiment. FIG. 25A to FIG. 28A each illustrate the top surface of a layered structure in the course of the manufacturing process of the magnetic head. FIG. 25B to FIG. 28B each illustrate a cross section of the layered structure orthogonal to the medium facing surface and the substrate. FIG. 25C to FIG. 28C each illustrate a cross section of a portion of the layered structure near the medium facing surface, the cross section being parallel to the medium facing surface. FIG. 29A and FIG. 30A each illustrate a cross section of the layered structure orthogonal to the medium facing surface and the substrate. FIG. 29B and FIG. 30B each illustrate a cross section of a portion of the layered structure near the medium facing surface, the cross section being parallel to the medium facing surface. Portions closer to the substrate 1 than the pole-layer-encasing layer 12 are omitted in FIG. 25A to FIG. 30A, FIG. 25B to FIG. 30B, and FIG. 25C to FIG. 28C.

The method of manufacturing the magnetic head of the third embodiment includes the steps up to the step of forming the second magnetic layer 162P that are the same as those of the second embodiment. FIG. 25A to FIG. 25C illustrate the following step. In the step, first, reactive ion etching or ion beam etching, for example, is performed to selectively remove the first magnetic layer 161P, the upper polishing stopper layer 35, the spacer layer 34 and the lower polishing stopper layer 33 except portions of these layers located below the second magnetic layer 162P and the plating layer 163 formed outside the frame at the same time as the second magnetic layer 162P. Next, the coating layer 32 made of alumina, for example, and having a thickness of 0.5 to 1.2 µm, for example, is formed on the entire top surface of the layered structure.

Figure 26A:
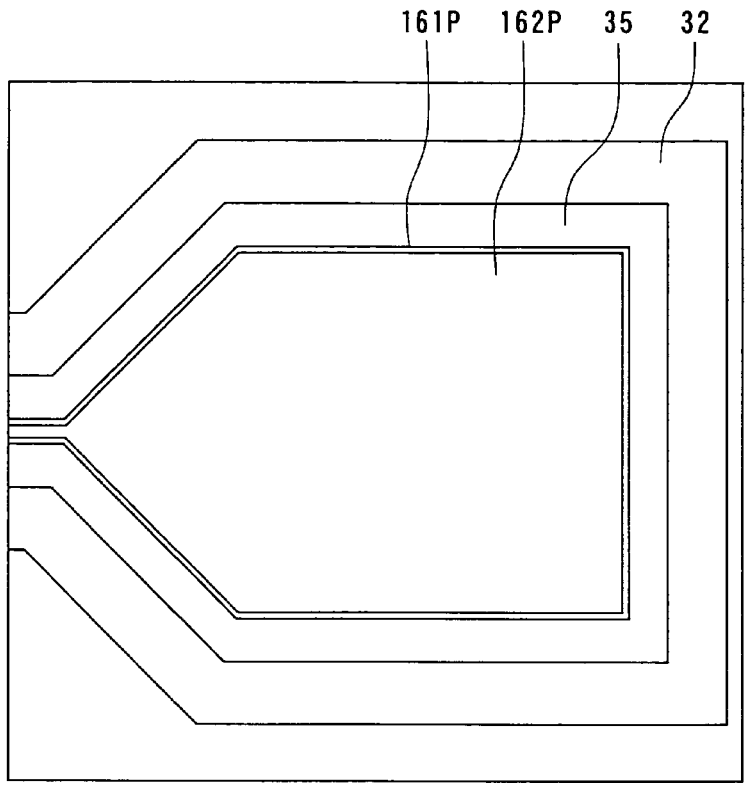
FIG. 26A to FIG. 26C are views for illustrating a step that follows the step shown in FIG. 25A to FIG. 25C.
Figure 26B:
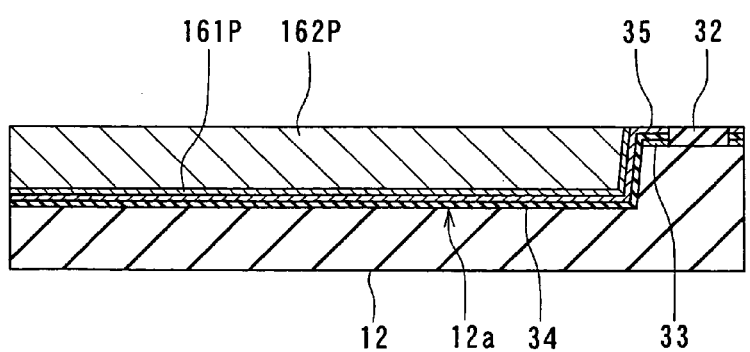
Figure 26C:
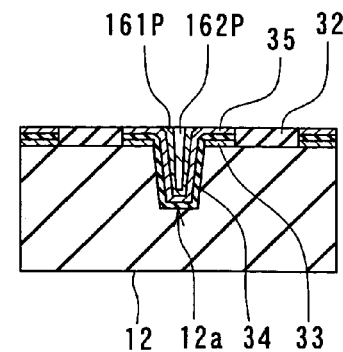

Next, as shown in FIG. 26A to FIG. 26C, the coating layer 32, the second magnetic layer 162P and the first magnetic layer 161P are polished by CMP, for example, so that the upper polishing stopper layer 35 is exposed, and the top surfaces of the coating layer 32, the upper polishing stopper layer 35, the first magnetic layer 161P and the second magnetic layer 162P are thereby flattened. This step of polishing corresponds to the first polishing step of the invention. If the coating layer 32, the second magnetic layer 162P and the first magnetic layer 161P are polished by CMP, such a slurry is used that polishing is stopped when the upper polishing stopper layer 35 is exposed, such as an alumina-base slurry.

Figure 27A:
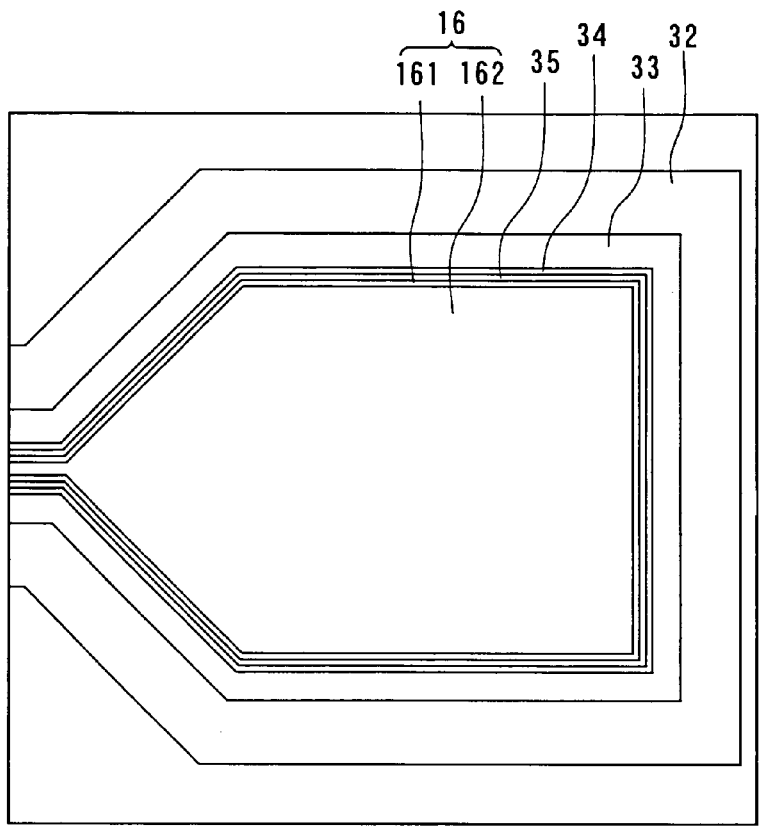
FIG. 27A to FIG. 27C are views for illustrating a step that follows the step shown in FIG. 26A to FIG. 26C.
Figure 27B:
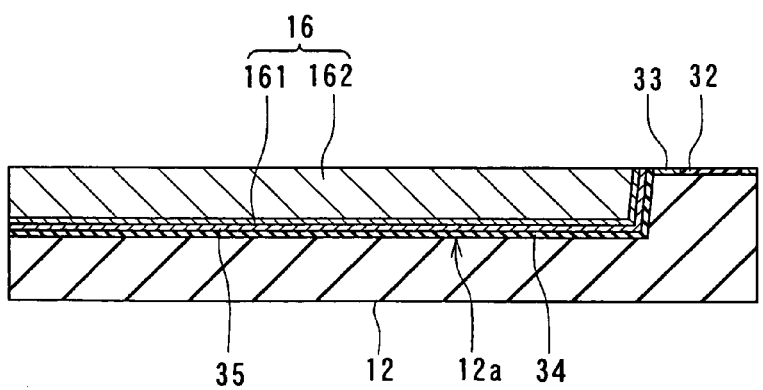
Figure 27C:
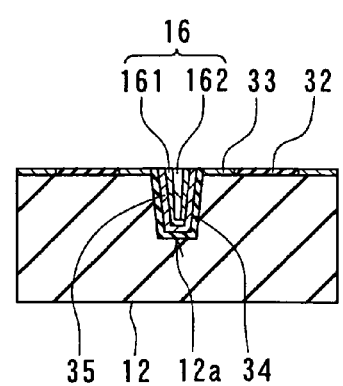

FIG. 27A to FIG. 27C illustrate the following step. In the step, first, a portion of the upper polishing stopper layer 35 exposed from the top surface of the layered structure is selectively removed by reactive ion etching or ion beam etching, for example. Next, the coating layer 32, the spacer layer 34, the upper polishing stopper layer 35, the first magnetic layer 161P and the second magnetic layer 162P are polished by CMP, for example, so that the lower polishing stopper layer 33 is exposed, and the top surfaces of the coating layer 32, the lower polishing stopper layer 33, the spacer layer 34, the upper polishing stopper layer 35, the first magnetic layer 161P and the second magnetic layer 162P are thereby flattened. As a result, the remaining first magnetic layer 161P and second magnetic layer 162P are formed into the first layer 161 and the second layer 162, respectively. This step of polishing corresponds to the second polishing step of the invention. If the coating layer 32, the spacer layer 34, the upper polishing stopper layer 35, the first magnetic layer 161P and the second magnetic layer 162P are polished by CMP, such a slurry is used that polishing is stopped when the lower polishing stopper layer 33 is exposed, such as an alumina-base slurry. It is possible to control the thickness of the pole layer 16 made up of the first layer 161 and the second layer 162 with accuracy by stopping the polishing when the lower polishing stopper layer 33 is exposed as thus described.

Figure 28A:
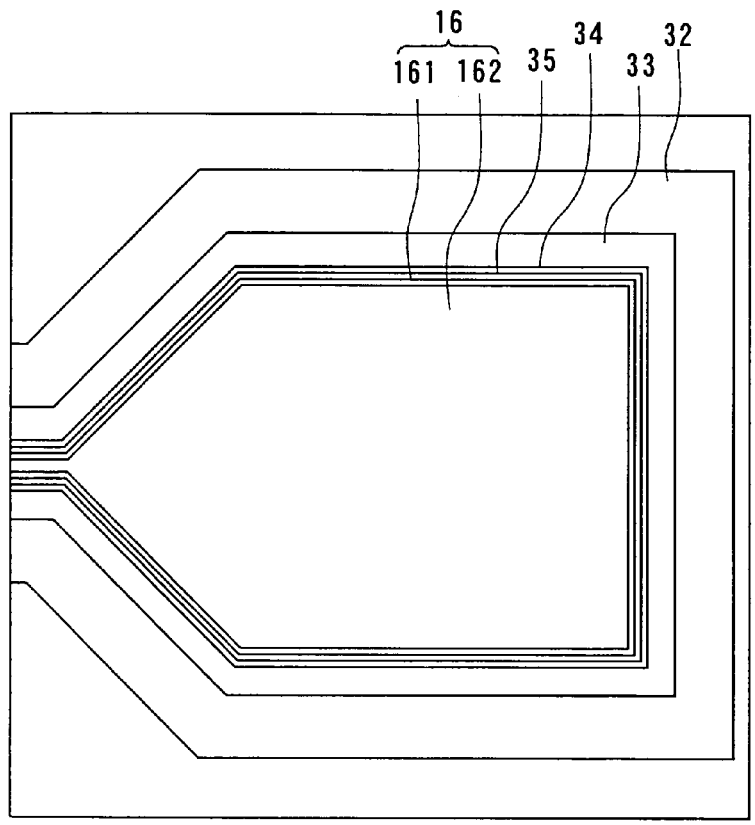
FIG. 28A to FIG. 28C are views for illustrating a step that follows the step shown in FIG. 27A to FIG. 27C.
Figure 28B:
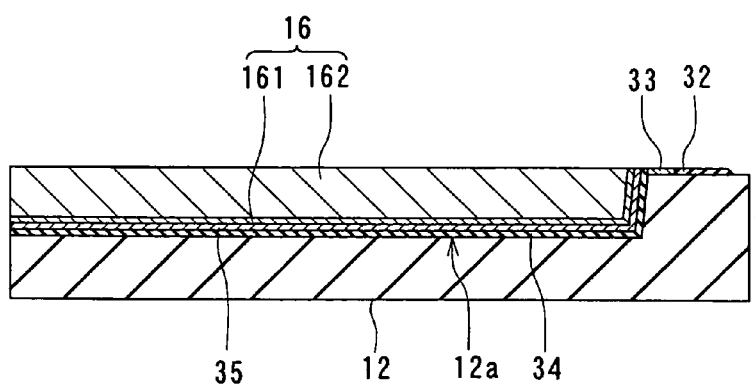
Figure 28C:
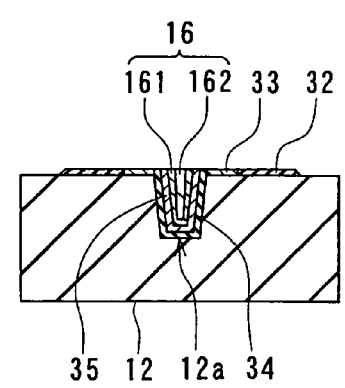

Next, as shown in FIG. 28A to FIG. 28C, reactive ion etching or ion beam etching, for example, is performed to selectively remove the lower polishing stopper layer 33 except the portion adjacent to the spacer layer 34.

FIG. 29A and FIG. 29B illustrate the following step. The steps that follow are the same as those of the first embodiment. That is, in the step illustrated in FIG. 29A and FIG. 29B, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the coupling layer 20B is formed on a portion of the pole layer 16 where the opening of the gap layer 18 is formed. Next, the nonmagnetic layer 21 is formed on the entire top surface of the layered structure. Next, the nonmagnetic layer 21 is polished by CMP, for example, so that the first layer 20A and the coupling layer 20B are exposed, and the top surfaces of the first layer 20A, the coupling layer 20B and the nonmagnetic layer 21 are flattened.

FIG. 30A and FIG. 30B illustrate the following step. In the step, first, the coil 22, the second layer 20C and the coupling layer 20D are formed as in the first embodiment. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the magnetic head of the second embodiment, the lower polishing stopper layer 33 occupies a wide region as shown in FIG. 23A and FIG. 23B. In the magnetic head of the third embodiment, in contrast, the lower polishing stopper layer 33 occupies only a small region adjacent to the spacer layer 34.

The remainder of configuration, operation and effects of the third embodiment are similar to those of the second embodiment.

Figures 31A, 31B:
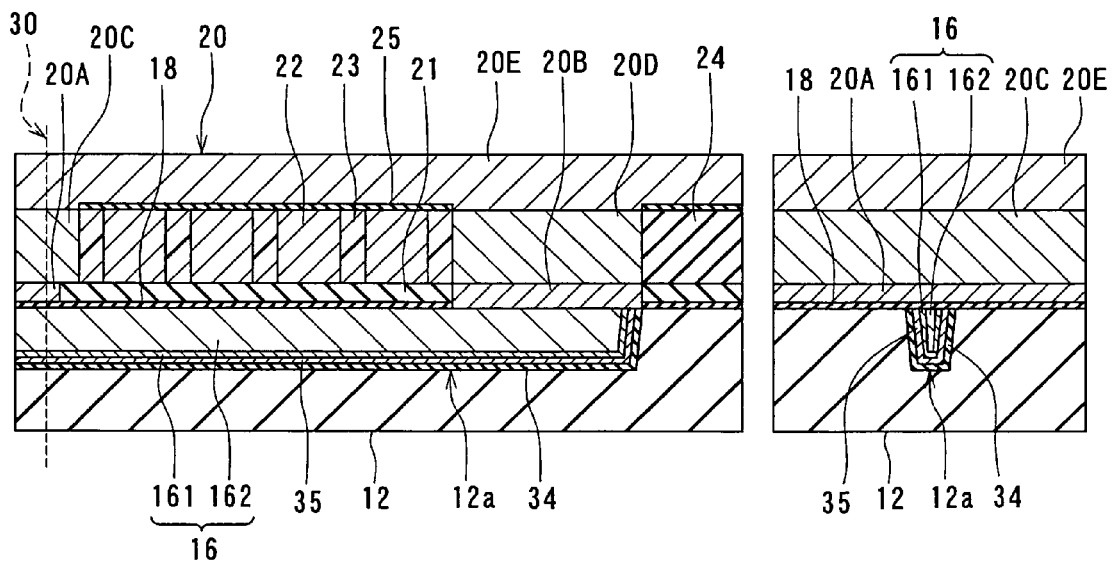
FIG. 31A and FIG. 31B are views for illustrating a modification example of the magnetic head of the third embodiment of the invention.

FIG. 31A and FIG. 31B illustrate a modification example of the magnetic head of the third embodiment. FIG. 31A illustrates a cross section of the main part of the magnetic head orthogonal to the medium facing surface and the substrate. FIG. 31B illustrates a cross section of the main part of the magnetic head near the medium facing surface, the cross section being parallel to the medium facing surface. In FIG. 31A and FIG. 31B the portion closer to the substrate 1 than the pole-layer-encasing layer 12 is omitted.

In the modification example, the lower polishing stopper layer 33 is removed. In addition, the top surfaces of the pole-layer-encasing layer 12, the spacer layer 34, the upper polishing stopper layer 35, the first layer 161 and the second layer 162 are flattened, and the gap layer 18 is disposed on these top surfaces. The remainder of configuration of the magnetic head of the modification example is the same as that of the magnetic head shown in FIG. 30A and FIG. 30B.

In a method of manufacturing the magnetic head of the modification example, as shown in FIG. 27A to FIG. 27C, the coating layer 32, the spacer layer 34, the upper polishing stopper layer 35, the first magnetic layer 161P and the second magnetic layer 162P are polished until the lower polishing stopper layer 33 is exposed, and then the entire lower polishing stopper layer 33 is removed by reactive ion etching or ion beam etching, for example. Next, the coating layer 32, the spacer layer 34, the upper polishing stopper layer 35, the first magnetic layer 161P and the second magnetic layer 162P are slightly polished by CMP, for example, and the top surfaces of the pole-layer-encasing layer 12, the spacer layer 34, the upper polishing stopper layer 35, the first magnetic layer 161P and the second magnetic layer 162P are thereby flattened.

Alternatively, after the coating layer 32, the spacer layer 34, the upper polishing stopper layer 35, the first magnetic layer 161P and the second magnetic layer 162P are polished until the lower polishing stopper layer 33 is exposed, ion beam etching may be performed to remove the coating layer 32 and the lower polishing stopper layer 33 and to etch portions of the spacer layer 34, the upper polishing stopper layer 35, the first magnetic layer 161P and the second magnetic layer 162P, so that the top surfaces of the pole-layer-encasing layer 12, the spacer layer 34, the upper polishing stopper layer 35, the first magnetic layer 161P and the second magnetic layer 162P are flattened. Preferably, this etching is performed such that the direction in which ion beams move forms an angle that falls within a range of 40 to 75 degrees inclusive with respect to the direction orthogonal to the top surface of the substrate 1. More preferably, this angle falls within a range of 40 to 55 degrees inclusive. As described in the first modification example of the first embodiment, it is thereby possible that the top surfaces of the encasing layer 12 and the magnetic layers 161P and 162P are located at nearly the same levels. As a result, the track width is easily controlled.

As thus described, the first magnetic layer 161P and the second magnetic layer 162P are formed into the first layer 161 and the second layer 162, respectively, and the structure is obtained wherein the top surfaces of the pole-layer-encasing layer 12, the spacer layer 34, the upper polishing stopper layer 35, the first layer 161 and the second layer 162 are flattened. Next, the gap layer 18 is formed on the entire top surface of the layered structure. The following steps of the method of manufacturing the magnetic head of the modification example are the same as those of the method of manufacturing the magnetic head shown in FIG. 30A and FIG. 30B.

In the third embodiment, the shield layer 20 may have a structure the same as that of the second modification example of the first embodiment.

Fourth Embodiment

A magnetic head and a method of manufacturing the same of a fourth embodiment of the invention will now be described. Reference is now made to FIG. 32A to FIG. 38A and FIG. 32B to FIG. 38B to describe the method of manufacturing the magnetic head of the fourth embodiment. FIG. 32A to FIG. 38A each illustrate a cross section of the layered structure in the course of the manufacturing process of the magnetic head, the cross section being orthogonal to the medium facing surface and the substrate. FIG. 32B to FIG. 38B each illustrate a cross section of a portion of the layered structure near the medium facing surface, the cross section being parallel to the medium facing surface. Portions closer to the substrate 1 than the pole-layer-encasing layer 12 are omitted in FIG. 32A to FIG. 38A and FIG. 32B to FIG. 38B.

Figures 32A, 32B:
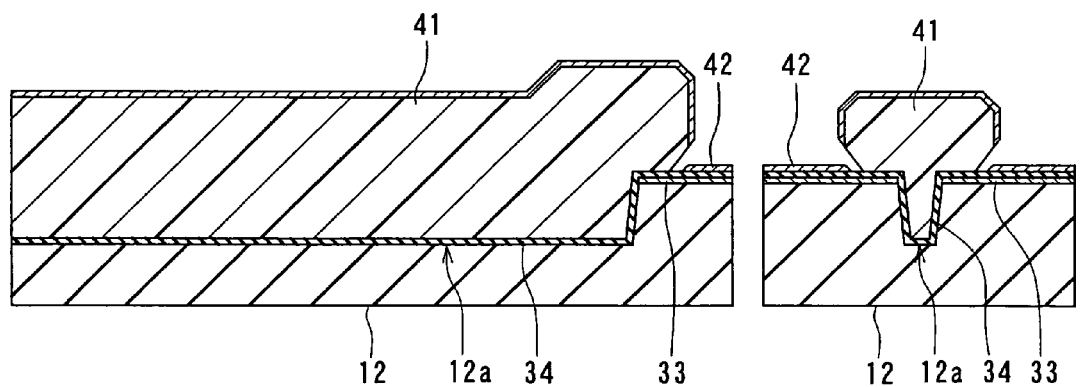
FIG. 32A and FIG. 32B are views for illustrating a step of a method of manufacturing a magnetic head of a fourth embodiment of the invention.

The method of manufacturing the magnetic head of the fourth embodiment includes the steps up to the step of forming the spacer layer 34 that are the same as those of the second embodiment. FIG. 32A and FIG. 32B illustrate the following step. In the step, first, a mask 41 is formed on the spacer layer 34. The mask 41 has an area slightly greater than that of the groove 12a of the pole-layer-encasing layer 12. It is preferred that a portion of the mask 41 located over the top surface of the encasing layer 12 with the spacer layer 34 provided between the encasing layer 12 and the mask 41 has a shape having an undercut. Next, an upper polishing stopper layer 42 made of a nonmagnetic material is formed on the entire top surface of the layered structure. The upper polishing stopper layer 42 is formed by sputtering or IBD, for example. The material of the polishing stopper layer 42 may be the same as that of the polishing stopper layer 13 of the first embodiment. The polishing stopper layer 42 has a thickness that falls within a range of 40 to 60 nm inclusive, for example.

Figures 33A, 33B:
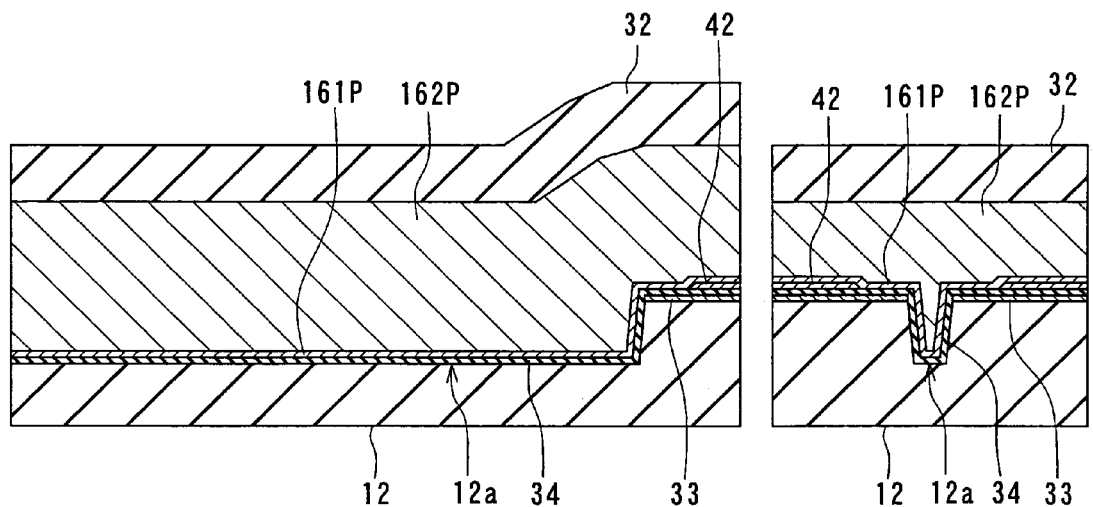
FIG. 33A and FIG. 33B are views for illustrating a step that follows the step shown in FIG. 32A and FIG. 32B.

FIG. 33A and FIG. 33B illustrate the following step. In the step, first, the mask 41 is removed. As a result, the upper polishing stopper layer 42 is disposed on the spacer layer 34 in a region except the groove 12a and a region near the groove 12a. Next, the first magnetic layer 161P to be the first layer 161 of the pole layer 16 is formed on the entire top surface of the layered structure. The first magnetic layer 161P has a thickness that falls within a range of 40 to 60 nm inclusive, for example. The material and forming method of the first magnetic layer 161P are the same as those of the first embodiment. Next, the second magnetic layer 162P to be the second layer 162 of the pole layer 16 is formed on the magnetic layer 161P. The second magnetic layer 162P may be formed by frame plating, for example. In this case, the first magnetic layer 161P is used as an electrode for plating. Next, the coating layer 32 made of alumina, for example, and having a thickness of 0.5 to 1.2 µm, for example, is formed on the entire top surface of the layered structure. Alternatively, the unwanted plating layer formed outside the frame may be removed before the coating layer 32 is formed.

Figures 34A, 34B:
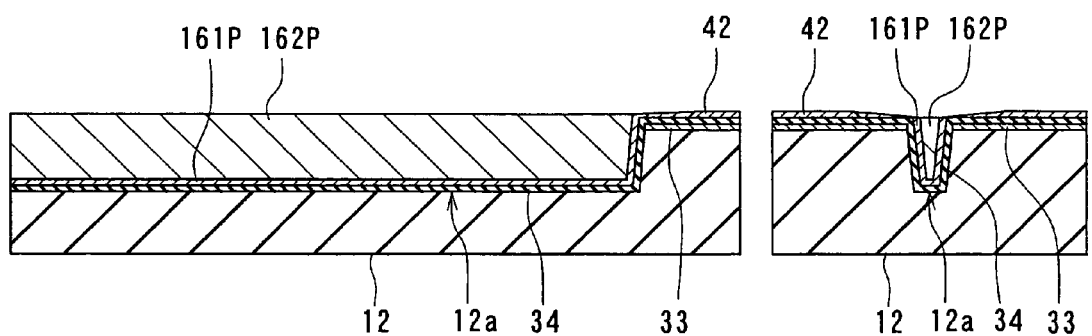
FIG. 34A and FIG. 34B are views for illustrating a step that follows the step shown in FIG. 33A and FIG. 33B.

Next, as shown in FIG. 34A and FIG. 34B, the coating layer 32, the second magnetic layer 162P and the first magnetic layer 161P are polished by CMP, for example, so that the upper polishing stopper layer 42 is exposed, and the top surfaces of the coating layer 32, the upper polishing stopper layer 42, the first magnetic layer 161P and the second magnetic layer 162P are thereby flattened. This step of polishing corresponds to the first polishing step of the invention. If the coating layer 32, the second magnetic layer 162P and the first magnetic layer 161P are polished by CMP, such a slurry is used that polishing is stopped when the upper polishing stopper layer 42 is exposed, such as an alumina-base slurry. FIG. 34A and FIG. 34B illustrate the state in which there is a small difference in level between the top surface of the upper polishing stopper layer 42 and the top surfaces of the first magnetic layer 161P and the second magnetic layer 162P when the above-mentioned polishing step is completed.

Next, as shown in FIG. 35A and FIG. 35B, the upper polishing stopper layer 42 is selectively removed by reactive ion etching or ion beam etching, for example.

Next, as shown in FIG. 36A and FIG. 36B, the spacer layer 34, the first magnetic layer 161P and the second magnetic layer 162P are polished by CMP, for example, so that the lower polishing stopper layer 33 is exposed, and the top surfaces of the lower polishing stopper layer 33, the spacer layer 34, the first magnetic layer 161P and the second magnetic layer 162P are thereby flattened. As a result, the remaining first magnetic layer 161P and second magnetic layer 162P are formed into the first layer 161 and the second layer 162, respectively. This step of polishing corresponds to the second polishing step of the invention. If the spacer layer 34, the first magnetic layer 161P and the second magnetic layer 162P are polished by CMP, such a slurry is used that polishing is stopped when the lower polishing stopper layer 33 is exposed, such as an alumina-base slurry. It is possible to control the thickness of the pole layer 16 made up of the first layer 161 and the second layer 162 with accuracy by stopping the polishing when the lower polishing stopper layer 33 is exposed as thus described.

FIG. 37A and FIG. 37B illustrate the following step. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and a yoke layer 20G is formed on a portion of the pole layer 16 where the opening of the gap layer 18 is formed. The first layer 20A and the yoke layer 20G may be formed by frame plating, or may be formed through making a magnetic layer by sputtering and then selectively etching the magnetic layer. At this time, the first layer 20A and the yoke layer 20G have a thickness of 1.0 µm, for example.

Next, a nonmagnetic layer 43 is formed on the entire top surface of the layered structure. The nonmagnetic layer 43 is made of a material the same as the material of the nonmagnetic layer 21 of the first embodiment. Next, the nonmagnetic layer 43 is polished by CMP, for example, so that the first layer 20A and the yoke layer 20G are exposed, and the top surfaces of the first layer 20A, the yoke layer 20G and the nonmagnetic layer 43 are flattened. Through this polishing, the first layer 20A and the yoke layer 20G are made to have a thickness of 0.8 µm, for example.

FIG. 38A and FIG. 38B illustrate the following step. In the step, first, an insulating layer 44 made of alumina and having a thickness that falls within a range of 0.2 to 0.3 µm inclusive, for example, is formed by sputtering, for example, on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20G at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20. The shield layer 20 of the fourth embodiment incorporates the first layer 20A, the yoke layer 20G, the second layer 20C, the coupling layer 20D and the third layer 20E. These layers are made of any of CoFeN, CoNiFe and NiFe, for example.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the magnetic head of the fourth embodiment, the upper polishing stopper layer 42 is not provided in the groove 12a, as shown in FIG. 38A and FIG. 38B. In the magnetic head of the embodiment, the yoke layer 20G, the nonmagnetic layer 43 and the insulating layer 44 are provided in place of the coupling layer 20B and the nonmagnetic layer 21 of the first embodiment.

The remainder of configuration, operation and effects of the fourth embodiment are similar to those of the second embodiment.

In the fourth embodiment the lower polishing stopper layer 33 may be removed as in the modification example of the second embodiment. In the fourth embodiment the shield layer 20 may have a structure of the shield layer 20 of the second modification example of the first embodiment.

Fifth Embodiment

Figure 39:
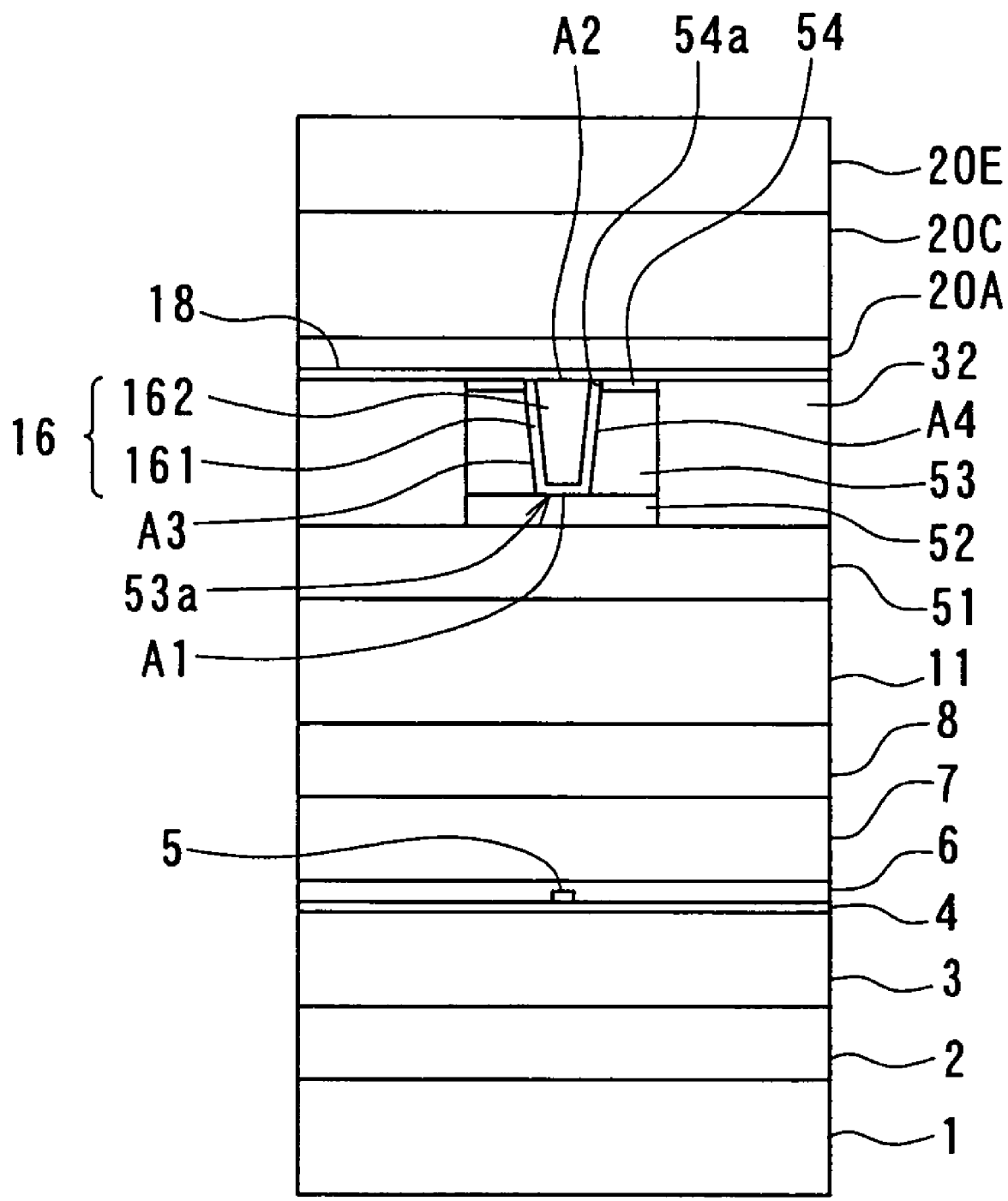
FIG. 39 is a front view of the medium facing surface of a magnetic head of a fifth embodiment of the invention.
Figure 40:
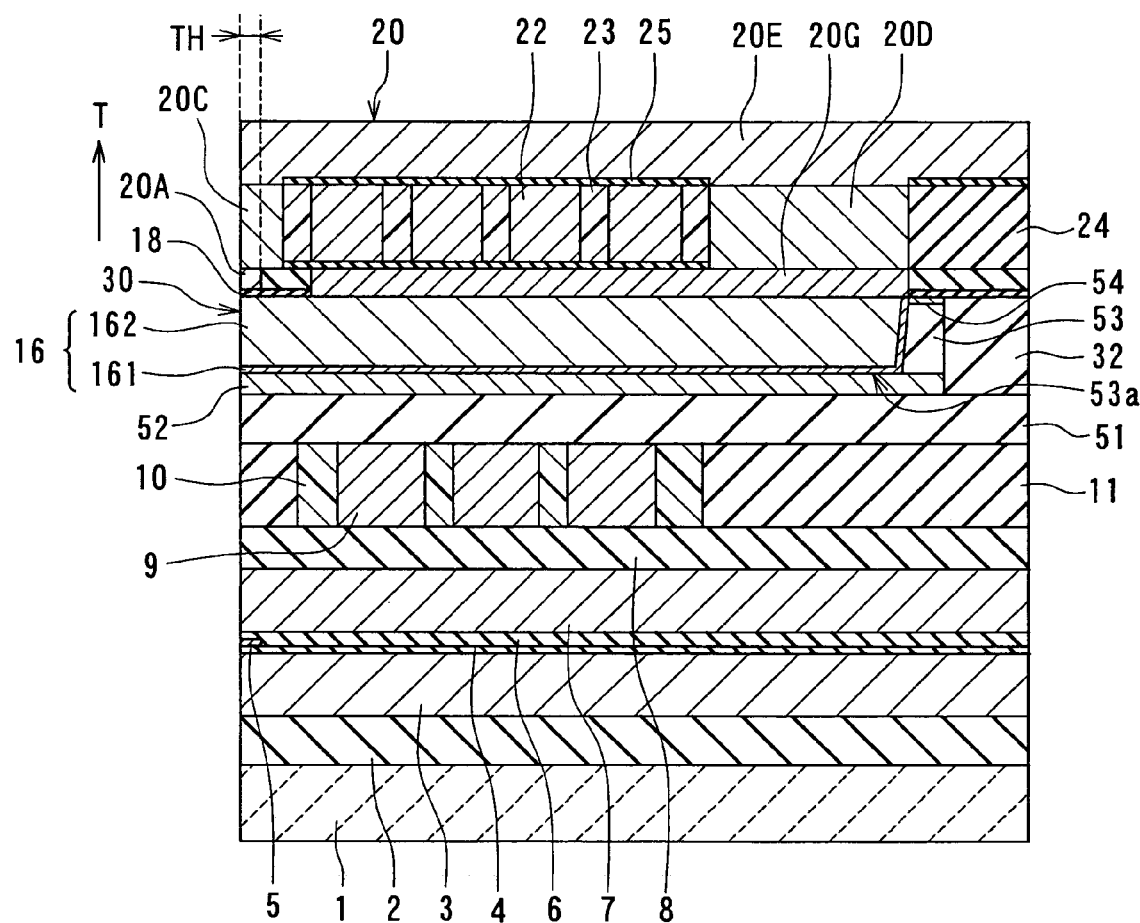
FIG. 40 is a cross-sectional view for illustrating the configuration of the magnetic head of the fifth embodiment of the invention.

A magnetic head and a method of manufacturing the same of a fifth embodiment of the invention will now be described. Reference is now made to FIG. 39 and FIG. 40 to describe the configuration of the magnetic head of the fifth embodiment. FIG. 39 is a front view of the medium facing surface of the magnetic head of the embodiment. FIG. 40 is a cross-sectional view for illustrating the configuration of the magnetic head of the embodiment. FIG. 40 illustrates a cross section orthogonal to the medium facing surface and the surface of the substrate. The arrow with T of FIG. 40 indicates the direction in which the recording medium travels.

The magnetic head of the fifth embodiment comprises an insulating layer 51, an underlying layer 52, a pole-layer-encasing layer 53, a polishing stopper layer 54 and the coating layer 32 that are provided in place of the pole-layer-encasing layer 12, the polishing stopper layer 13 and the nonmagnetic film 14 of the magnetic head of the first embodiment.

The insulating layer 51 is made of an insulating material and disposed on the flattened top surfaces of the coil 9 and the insulating layers 10 and 11. The insulating layer 51 may be made of any of alumina, silicon oxide ($SiO_x$), and silicon oxynitride (SiON).

The underlying layer 52 is made of a nonmagnetic conductive material and disposed on the insulating layer 51. The underlying layer 52 may be made of any of Ta, Mo, W, Ti, Ru, Rh, Re, Pt, Pd, Ir, TiN, TiW, and NiCr, for example. The underlying layer 52 has a thickness of 0.1 μm, for example.

The pole-layer-encasing layer 53 is made of a nonmagnetic material and disposed on the underlying layer 52. The encasing layer 53 has a groove 53a that opens in the top surface thereof and accommodates the pole layer 16. The groove 53a penetrates the encasing layer 53. The encasing layer 53 may be made of any of alumina, silicon oxide ($SiO_x$), and silicon oxynitride (SiON), for example. The encasing layer 53 has a thickness that falls within a range of 0.20 to 0.35 μm inclusive, for example.

The pole layer 16 is disposed in the groove 53a. The pole layer 16 incorporates the first layer 161 located closer to the surface of the groove 53a; and the second layer 162 located farther from the surface of the groove 53a.

The polishing stopper layer 54 is made of a nonmagnetic conductive material and disposed on the top surface of the pole-layer-encasing layer 53. The polishing stopper layer 54 corresponds to the nonmagnetic conductive layer of the invention. The polishing stopper layer 54 has an opening 54a that penetrates, and the edge of the opening 54a is located directly above the edge of the groove 53a in the top surface of the encasing layer 53. The polishing stopper layer 54 may be made of any of Ta, Mo, W, Ti, Ru, Rh, Re, Pt, Pd, Ir, TiN, TiW and NiCr, for example. The polishing stopper layer 54 has a thickness that falls within a range of 20 to 60 nm inclusive, for example.

The coating layer 32 is made of alumina, for example, and disposed on the insulating layer 51 around the layered structure made up of the underlying layer 52, the encasing layer 53, the polishing stopper layer 54 and the pole layer 16. The coating layer 32, the polishing stopper layer 54 and the pole layer 16 have flattened top surfaces. The gap layer 18 is disposed on the flattened top surfaces of the coating layer 32, the polishing stopper layer 54 and the pole layer 16.

In the magnetic head of the fifth embodiment, the portion from the gap layer 18 to the third layer 20E has a configuration the same as that of the magnetic head of the fourth embodiment. The remainder of configuration of the magnetic head of the fifth embodiment is similar to that of the first embodiment.

Reference is now made to FIG. 41A to FIG. 47A and FIG. 41B to FIG. 47B to describe the method of manufacturing the magnetic head of the fifth embodiment. FIG. 41A to FIG. 47A each illustrate a cross section of the layered structure in the course of the manufacturing process of the magnetic head, the cross section being orthogonal to the medium facing surface and the substrate. FIG. 41B to FIG. 47B each illustrate a cross section of a portion of the layered structure near the medium facing surface, the cross section being parallel to the medium facing surface. Portions closer to the substrate 1 than the insulating layer 51 are omitted in FIG. 41A to FIG. 47A and FIG. 41B to FIG. 47B.

The method of manufacturing the magnetic head of the fifth embodiment includes the steps up to the step of flattening the top surfaces of the coil 9 and the insulating layers 10 and 11 that are the same as those of the first embodiment. FIG. 41A and FIG. 41B illustrate the following step. In the step, first, the insulating layer 51 and the underlying layer 52 are formed one by one on the flattened top surfaces of the coil 9 and the insulating layers 10 and 11. Next, a nonmagnetic layer 53P is formed on the underlying layer 52. The nonmagnetic layer 53P will be formed into the pole-layer-encasing layer 53 by making the groove 53a therein later. Next, the polishing stopper layer 54 is formed on the nonmagnetic layer 53P.

FIG. 42A and FIG. 42B illustrate the following step. In the step, first, a photoresist layer having a thickness of 1.0 μm, for example, is formed on the polishing stopper layer 54. The photoresist layer is then patterned to form a mask 55 for making the groove 53a in the encasing layer 53. The mask 55 has an opening having a shape corresponding to the groove 53a.

Next, the polishing stopper layer 54 is selectively etched, using the mask 55. The opening 54a that penetrates is thereby formed in the polishing stopper layer 54. The opening 54a has a shape corresponding to the plane geometry of the pole layer 16 to be formed later. Furthermore, a portion of the nonmagnetic layer 53P exposed from the opening 54a of the polishing stopper layer 54 is selectively etched so as to form the groove 53a in the nonmagnetic layer 53P. The mask 55 is then removed. The nonmagnetic layer 53P is formed into the pole-layer-encasing layer 53 by forming the groove 53a therein. The polishing stopper layer 54 indicates the level at which polishing to be performed later is stopped. The edge of the opening 54a of the polishing stopper layer 54 is located directly above the edge of the groove 53a located in the top surface of the pole-layer-encasing layer 53. The conditions for etching of each of the polishing stopper layer 54 and the nonmagnetic layer 53P are the same as the conditions for etching of the polishing stopper layer 13 and the nonmagnetic layer 12P of the first embodiment.

Next, the width of the groove 53a in the top surface of the pole-layer-encasing layer 53 is measured by measuring the width of the opening 54a of the polishing stopper layer 54 through the use of an electron microscope. At the same time, the width of the bottom of the groove 53a of the encasing layer 53 may be measured. It is thereby possible to obtain the angle between the wall of the groove 53a and the direction orthogonal to the top surface of the substrate 1. The same methods as the first embodiment are employed as the methods of measuring the width of the groove 53a in the top surface of the encasing layer 53 and the width of the bottom of the groove 53a, and as the method of obtaining the angle between the wall of the groove 53a and the direction orthogonal to the top surface of the substrate 1.

FIG. 43A and FIG. 43B illustrate the following step. In the step, first, the first magnetic layer 161P to be the first layer 161 of the pole layer 16 is formed in the groove 53a of the pole-layer-encasing layer 53 and on the polishing stopper layer 54. The method of forming the first magnetic layer 161P is the same as that of the first embodiment. Next, the second magnetic layer 162P to be the second layer 162 of the pole layer 16 is formed on the magnetic layer 161P. The second magnetic layer 162P is formed by frame plating, for example. In this case, the underlying layer 52 and the first magnetic layer 161P are used as electrodes for plating.

FIG. 44A and FIG. 44B illustrate the following step. In the step, first, the first magnetic layer 161P, the polishing stopper layer 54, the encasing layer 53 and the underlying layer 52 except portions of these layers located below the second magnetic layer 162P are selectively removed by reactive ion etching or ion beam etching, for example, using the second magnetic layer 162P as a mask. Next, the coating layer 32 made of alumina, for example, and having a thickness of 0.8 to 1.5 µm, for example, is formed on the entire top surface of the layered structure.

Next, as shown in FIG. 45A and FIG. 45B, the coating layer 32, the second magnetic layer 162P and the first magnetic layer 161P are polished by CMP, for example, so that the polishing stopper layer 54 is exposed, and the top surfaces of the coating layer 32, the polishing stopper layer 54, the first magnetic layer 161P and the second magnetic layer 162P are thereby flattened. If the coating layer 32, the second magnetic layer 162P and the first magnetic layer 161P are polished by CMP, such a slurry is used that polishing is stopped when the polishing stopper layer 54 is exposed, such as an alumina-base slurry. It is possible to control the thickness of the pole layer 16 made up of the first layer 161 and the second layer 162 with accuracy by stopping the polishing when the polishing stopper layer 54 is exposed as thus described.

FIG. 46A and FIG. 46B illustrate the following step. The steps that follow are the same as those of the fourth embodiment. That is, in the step illustrated in FIG. 46A and FIG. 46B, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the yoke layer 20G is formed on a portion of the pole layer 16 where the opening of the gap layer 18 is formed.

Next, the nonmagnetic layer 43 is formed on the entire top surface of the layered structure. The nonmagnetic layer 43 is made of a material the same as the material of the nonmagnetic layer 21 of the first embodiment. Next, the nonmagnetic layer 43 is polished by CMP, for example, so that the first layer 20A and the yoke layer 20G are exposed, and the top surfaces of the first layer 20A, the yoke layer 20G and the nonmagnetic layer 43 are flattened.

Figures 47A, 47B:
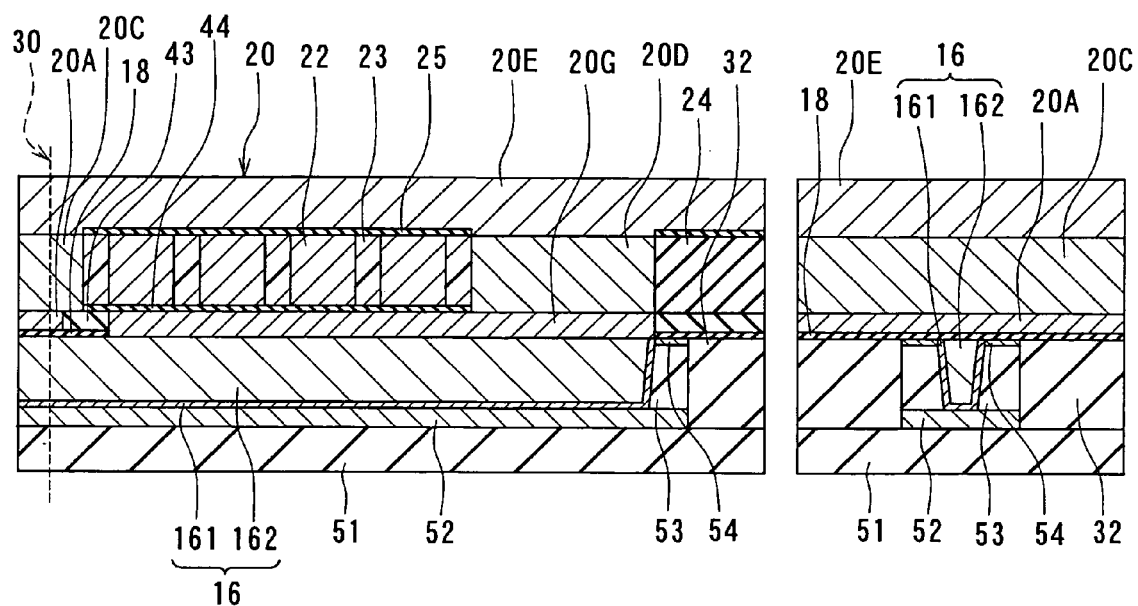
FIG. 47A and FIG. 47B are views for illustrating a step that follows the step shown in FIG. 46A and FIG. 46B.

FIG. 47A and FIG. 47B illustrate the following step. In the step, first, the insulating layer 44 made of alumina and having a thickness that falls within a range of 0.2 to 0.3 µm inclusive, for example, is formed by sputtering, for example, on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20G at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20. The shield layer 20 of the fifth embodiment incorporates the first layer 20A, the yoke layer 20G, the second layer 20C, the coupling layer 20D and the third layer 20E.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

Consideration will now be given to a case in which a groove that does not penetrate is formed in the pole-layer-encasing layer and the pole layer is formed in the groove by plating. In this case, if the track width is reduced, in particular, and the width of the groove is reduced, too, it is difficult to form an electrode film for plating at the bottom of the groove without defects. If the electrode film is not satisfactorily formed at the bottom of the groove, a plating film is not sufficiently grown near the bottom of the groove and defects such as keyholes may be caused when the pole layer is formed by plating.

In the fifth embodiment, the pole-layer-encasing layer 53 having the penetrating groove 53a is formed on the underlying layer 52 made of a nonmagnetic conductive material. The pole layer 16 is formed on the underlying layer 52 in the groove 53a. In such a manner, according to the fifth embodiment, the underlying layer 52 that functions as an electrode for plating exists at the bottom of the groove 53a. As a result, when the second magnetic layer 162P is formed by plating, a plating film is sufficiently grown near the bottom of the groove 53a, too. It is thereby possible to prevent defects such as keyholes. Therefore, according to the embodiment, the pole layer 16 having a desired shape is formed with accuracy even if the track width is reduced.

The remainder of configuration, operation and effects of the fifth embodiment are the same as those of the first embodiment.

In the fifth embodiment the polishing stopper layer 54 may be removed as in the first modification example of the first embodiment. In the fifth embodiment the shield layer 20 may have a structure of the shield layer 20 of the second modification example of the first embodiment.

Sixth Embodiment

A magnetic head and a method of manufacturing the same of a sixth embodiment of the invention will now be described. Reference is now made to FIG. 48A to FIG. 57A and FIG. 48B to FIG. 57B to describe the method of manufacturing the magnetic head of the sixth embodiment. FIG. 48A to FIG. 57A each illustrate a cross section of the layered structure in the course of the manufacturing process of the magnetic head, the cross section being orthogonal to the medium facing surface and the substrate. FIG. 48B to FIG. 57B each illustrate a cross section of a portion of the layered structure near the medium facing surface, the cross section being parallel to the medium facing surface. Portions closer to the substrate 1 than the insulating layer 51 are omitted in FIG. 48A to FIG. 57A and FIG. 48B to FIG. 57B.

Figures 48A, 48B:
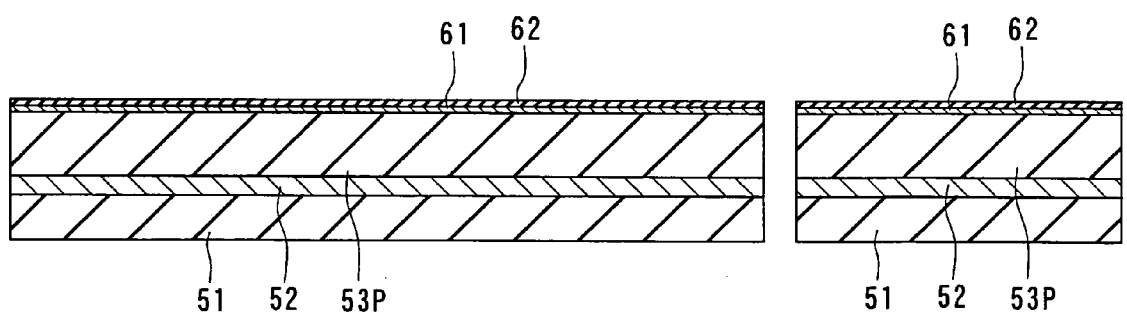
FIG. 48A and FIG. 48B are views for illustrating a step of a method of manufacturing a magnetic head of a sixth embodiment of the invention.

The method of manufacturing the magnetic head of the sixth embodiment includes the steps up to the step of forming the nonmagnetic layer 53P that are the same as those of the fifth embodiment. FIG. 48A and FIG. 48B illustrate the following step. In the step, first, a lower polishing stopper layer 61 made of a nonmagnetic material is formed by sputtering, for example, on the nonmagnetic layer 53P. The lower polishing stopper layer 61 is made of a nonmagnetic conductive material, for example. The material of the lower polishing stopper layer 61 may be the same as the material of the polishing stopper layer 54 of the fifth embodiment. The lower polishing stopper layer 61 has a thickness that falls within a range of 20 to 60 nm inclusive, for example.

Next, a spacer layer 62 made of a nonmagnetic material and having a specific thickness is formed on the lower polishing stopper layer 61 by sputtering, for example. The spacer layer 62 is made of an insulating material or a semiconductor material, for example. The material, thickness and forming method of the spacer layer 62 are the same as those of the nonmagnetic film 14 of the first embodiment. In the sixth embodiment the spacer layer 62 is formed on the lower polishing stopper layer 61 before the groove 53a is formed in the nonmagnetic layer 53P.

Figures 49A, 49B:
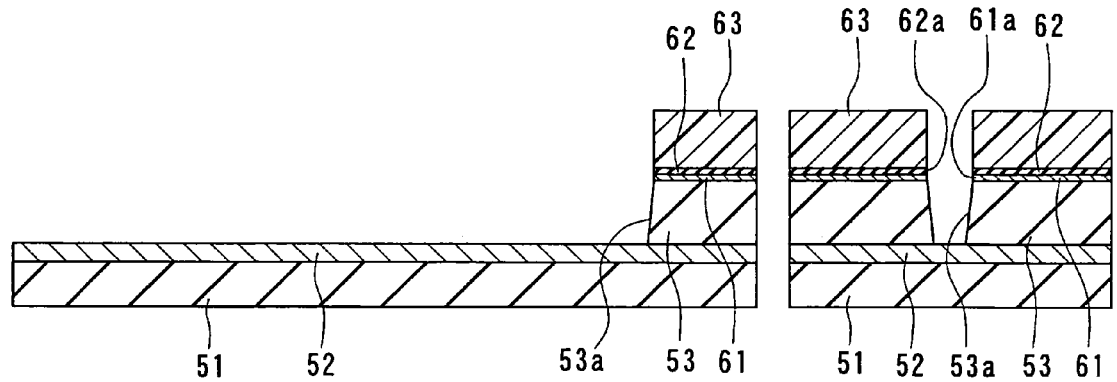
FIG. 49A and FIG. 49B are views for illustrating a step that follows the step shown in FIG. 48A and FIG. 48B.

FIG. 49A and FIG. 49B illustrate the following step. In the step, first, a photoresist layer having a thickness of 1.0 μm, for example, is formed on the spacer layer 62. The photoresist layer is then patterned to form a mask 63 for making the groove 53a in the encasing layer 53. The mask 63 has an opening having a shape corresponding to the groove 53a.

Next, the spacer layer 62 and the lower polishing stopper layer 61 are selectively etched, using the mask 63. Openings 62a and 61a that penetrate are thereby formed in the spacer layer 62 and the lower polishing stopper layer 61, respectively. The opening 61a has a shape corresponding to the plane geometry of the pole layer 16 to be formed later. Furthermore, a portion of the nonmagnetic layer 53P exposed from the opening 61a of the lower polishing stopper layer 61 is selectively etched so as to form the groove 53a of the nonmagnetic layer 53P. The mask 63 is then removed. The nonmagnetic layer 53P is formed into the pole-layer-encasing layer 53 by forming the groove 53a therein. The lower polishing stopper layer 61 indicates the level at which polishing of a second polishing step to be performed later is stopped. The edge of the opening 61a of the lower polishing stopper layer 61 is located directly above the edge of the groove 53a located in the top surface of the pole-layer-encasing layer 53. The conditions for etching of each of the spacer layer 62, the lower polishing stopper layer 61 and the nonmagnetic layer 53P are the same as the conditions for etching of the polishing stopper layer 13 and the nonmagnetic layer 12P of the first embodiment.

Alternatively, before the photoresist layer to be the mask 63 is formed on the spacer layer 62, a nonmagnetic layer made of a material the same as that of the lower polishing stopper layer 61 and having a thickness the same as that of the stopper layer 61 may be formed on the spacer layer 62, and the photoresist layer may be formed on this nonmagnetic layer. In this case, it is possible to form the edges of the openings 62a and 61a with higher precision.

Next, the width of the groove 53a in the top surface of the pole-layer-encasing layer 53 is measured through the use of an electron microscope in a manner the same as that of the fifth embodiment. At the same time, the width of the bottom of the groove 53a of the encasing layer 53 may be measured. It is thereby possible to obtain the angle between the wall of the groove 53a and the direction orthogonal to the top surface of the substrate 1.

Figures 50A, 50B:
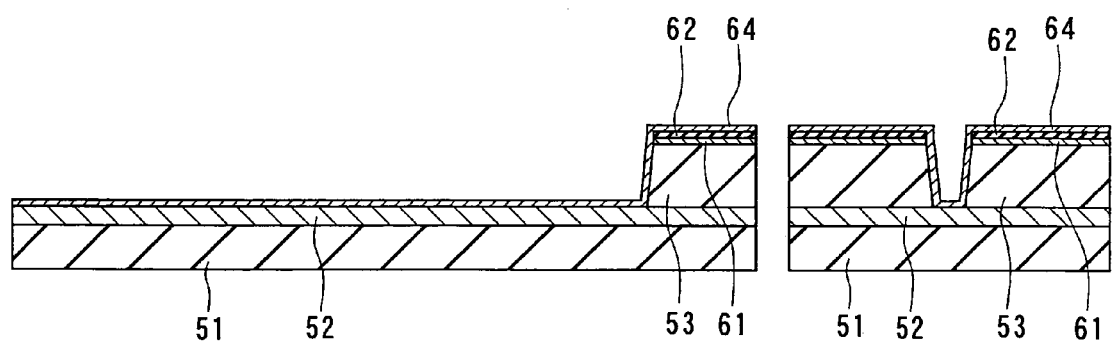
FIG. 50A and FIG. 50B are views for illustrating a step that follows the step shown in FIG. 49A and FIG. 49B.

Next, as shown in FIG. 50A and FIG. 50B, an upper polishing stopper layer 64 made of a nonmagnetic conductive material is formed in the groove 53a of the encasing layer 53 and on the spacer layer 62. The upper polishing stopper layer 64 may be formed by any of sputtering, CVD and IBD, for example. The upper polishing stopper layer 64 may be made of a material the same as the material of the polishing stopper layer 13 of the first embodiment. The upper polishing stopper layer 64 has a thickness that falls within a range of 20 to 30 nm inclusive, for example.

Figures 51A, 51B:
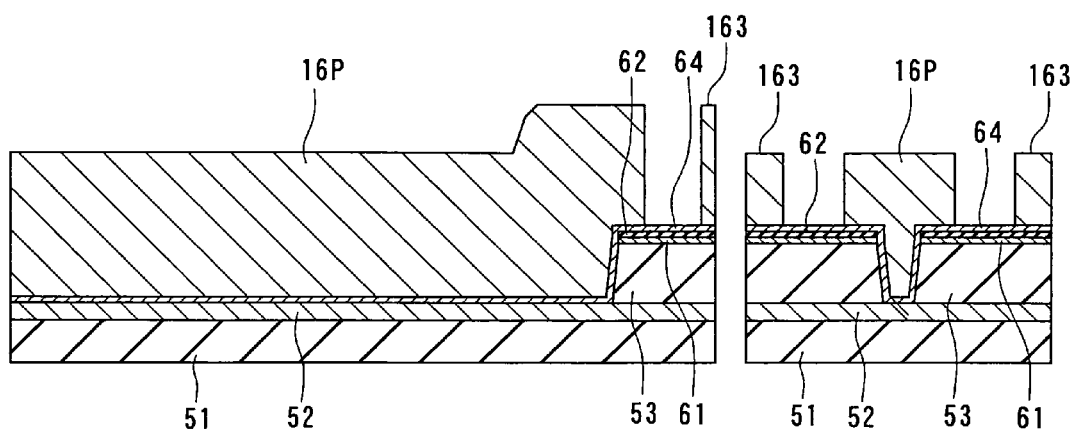
FIG. 51A and FIG. 51B are views for illustrating a step that follows the step shown in FIG. 50A and FIG. 50B.

Next, as shown in FIG. 51A and FIG. 51B, a magnetic layer 16P to be the pole layer 16 is formed on the upper polishing stopper layer 64. The magnetic layer 16P is made of a magnetic material. To be specific, the material of the magnetic layer 16P may be any of NiFe, CoNiFe and CoFe. The magnetic layer 16P is formed such that the groove 53a is filled and the top surface of the magnetic layer 16P is located higher than the top surface of the stopper layer 64. The magnetic layer 16P is formed by frame plating, for example. In this case, the underlying layer 52 and the stopper layer 64 are used as electrodes for plating. In FIG. 51A and FIG. 51B, numeral 163 indicates the unwanted plating layer formed outside the frame.

Figures 52A, 52B:
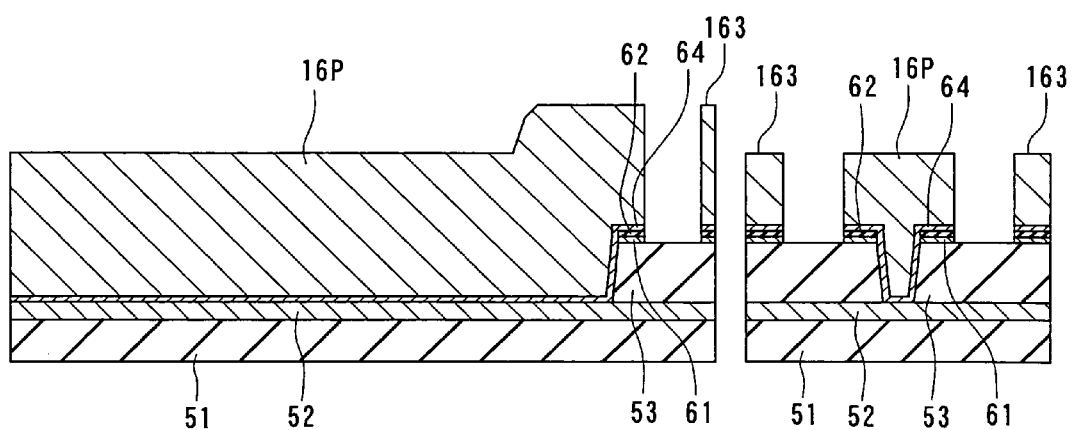
FIG. 52A and FIG. 52B are views for illustrating a step that follows the step shown in FIG. 51A and FIG. 51B.

Next, as shown in FIG. 52A and FIG. 52B, the upper polishing stopper layer 64, the spacer layer 62 and the lower polishing stopper layer 61 except portions of these layers located below the magnetic layer 16P and the plating layer 163 are selectively removed by reactive ion etching or ion beam etching, for example, using the magnetic layer 16P and the plating layer 163 as masks.

FIG. 53A and FIG. 53B illustrate the following step. In the step, first, the pole-layer-encasing layer 53 except a portion located below the magnetic layer 16P and the plating layer 163 is selectively removed by reactive ion etching or ion beam etching, for example, using the magnetic layer 16P and the plating layer 163 as masks. Next, the underlying layer 52 except a portion located below the encasing layer 53 is selectively removed by ion beam etching, for example. Next, the plating layer 163 is selectively removed. Next, the coating layer 32 made of alumina, for example, and having a thickness of 0.8 to 1.5 μm, for example, is formed on the entire top surface of the layered structure.

Next, as shown in FIG. 54A and FIG. 54B, the coating layer 32 and the magnetic layer 16P are polished by CMP, for example, so that the upper polishing stopper layer 64 is exposed, and the top surfaces of the coating layer 32, the polishing stopper layer 64 and the magnetic layer 16P are thereby flattened. This step corresponds to the first polishing step of the invention. If the coating layer 32 and the magnetic layer 16P are polished by CMP, such a slurry is used that polishing is stopped when the polishing stopper layer 64 is exposed, such as an alumina-base slurry.

Figures 55A, 55B:
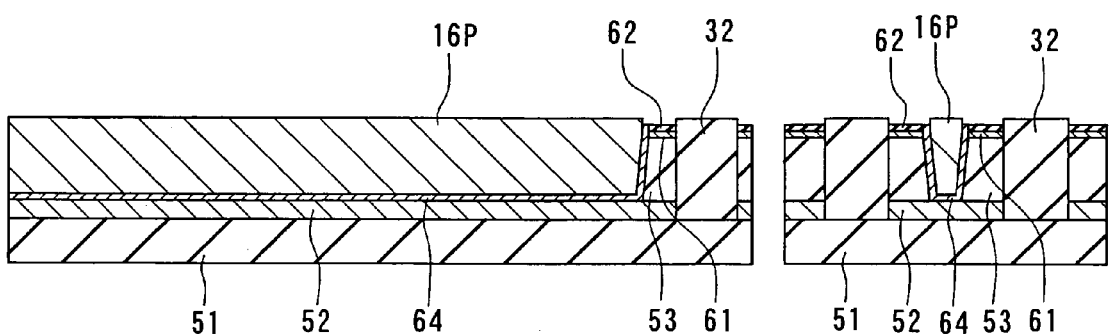
FIG. 55A and FIG. 55B are views for illustrating a step that follows the step shown in FIG. 54A and FIG. 54B.

Next, as shown in FIG. 55A and FIG. 55B, a portion of the upper polishing stopper layer 64 exposed from the top surface of the layered structure is selectively removed by reactive ion etching using an etching gas containing a $CF_4$ gas, for example.

Figures 56A, 56B:
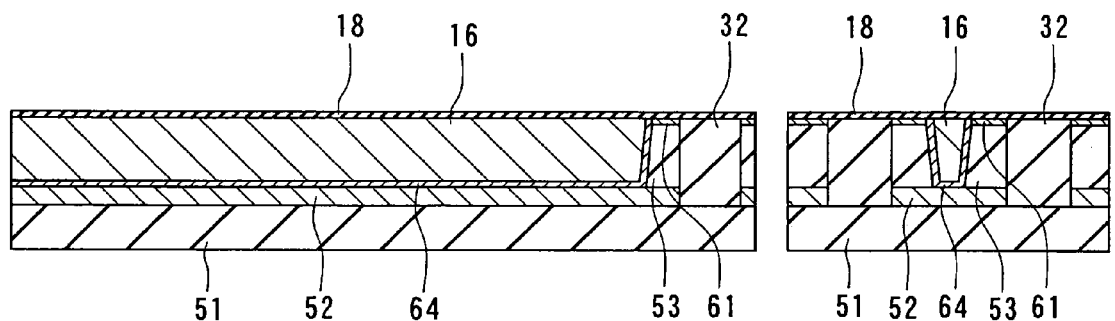
FIG. 56A and FIG. 56B are views for illustrating a step that follows the step shown in FIG. 55A and FIG. 55B.

FIG. 56A and FIG. 56B illustrate the following step. In the step, first, the spacer layer 62, the upper polishing stopper layer 64 and the magnetic layer 16P are polished by CMP, for example, so that the lower polishing stopper layer 61 is exposed, and the top surfaces of the lower polishing stopper layer 61, the spacer layer 62, the upper polishing stopper layer 64 and the magnetic layer 16P are thereby flattened. As a result, the remaining magnetic layer 16P is formed into the pole layer 16. This step of polishing corresponds to the second polishing step of the invention. If the spacer layer 62, the upper polishing stopper layer 64 and the magnetic layer 16P are polished by CMP, such a slurry is used that polishing is stopped when the lower polishing stopper layer 61 is exposed, such as an alumina-base slurry. It is possible to control the thickness of the pole layer 16 with accuracy by stopping the polishing when the lower polishing stopper layer 61 is exposed as thus described. Next, the gap layer 18 is formed on the entire top surface of the layered structure.

Figures 57A, 57B:
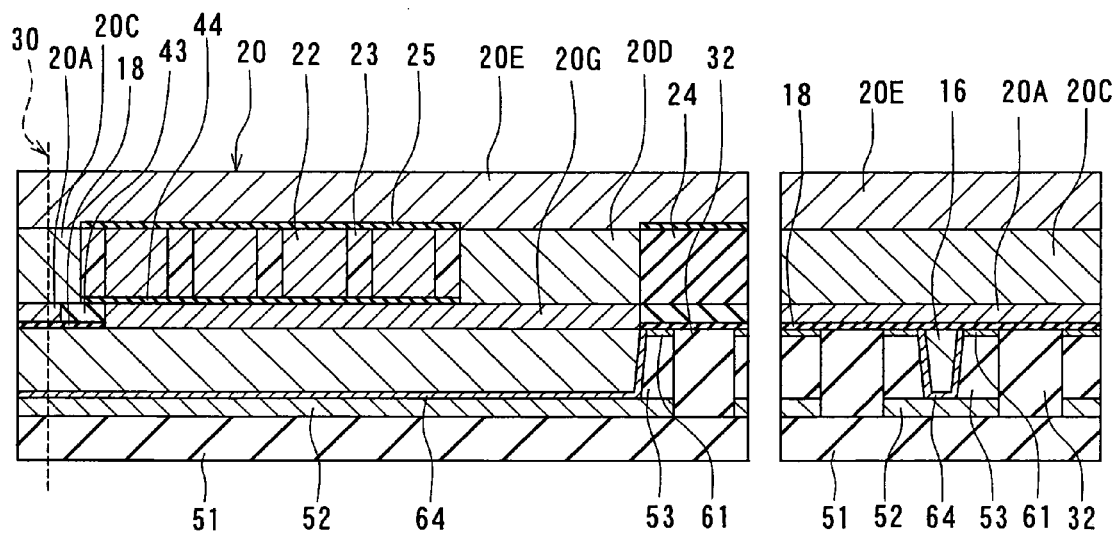
FIG. 57A and FIG. 57B are views for illustrating a step that follows the step shown in FIG. 56A and FIG. 56B.
Figure 58:
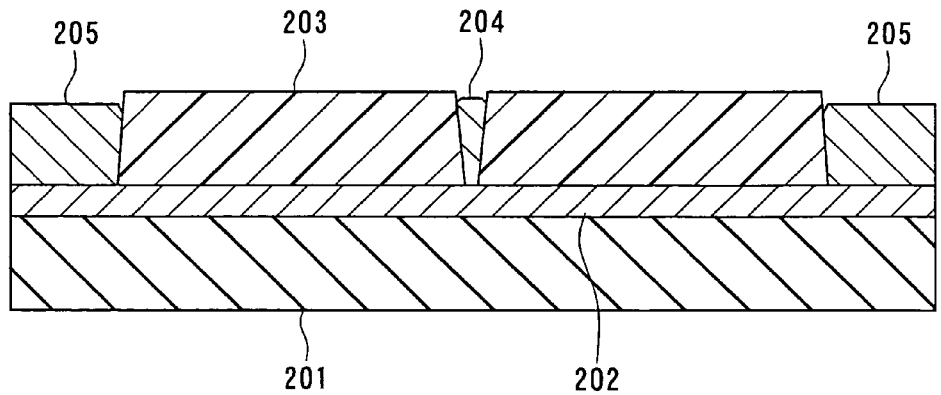
FIG. 58 is a cross-sectional view for illustrating a step of an example of method of forming a pole layer.
Figure 59:
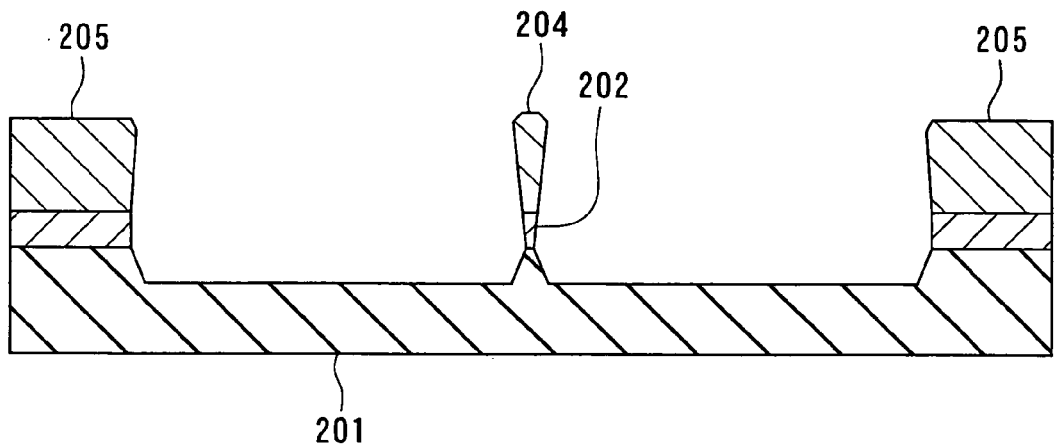
FIG. 59 is a view for illustrating a step that follows the step shown in FIG. 58.
Figure 60:
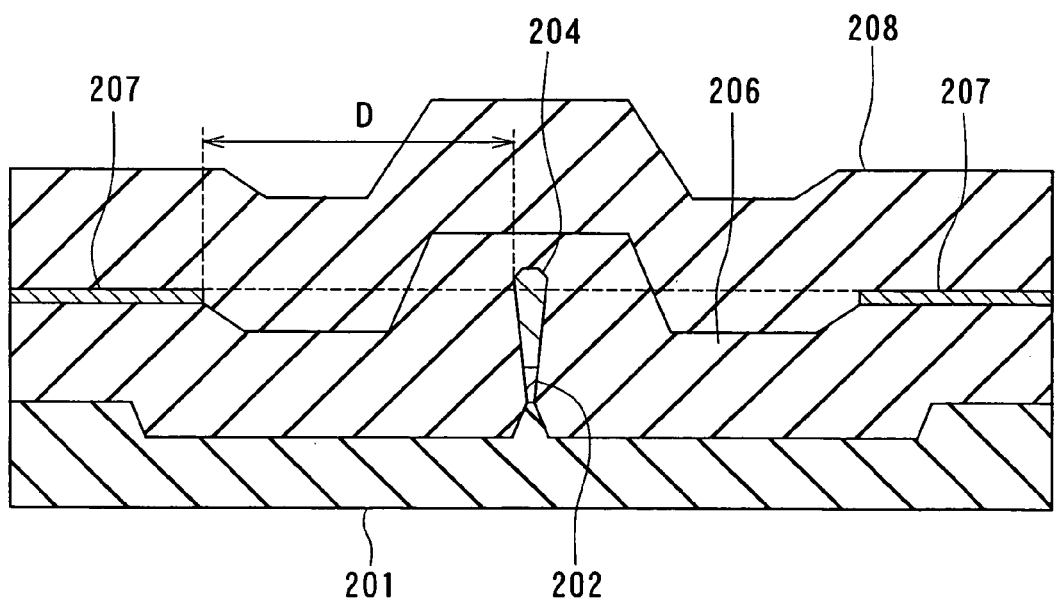
FIG. 60 is a view for illustrating a step that follows the step shown in FIG. 59.
Figure 61:
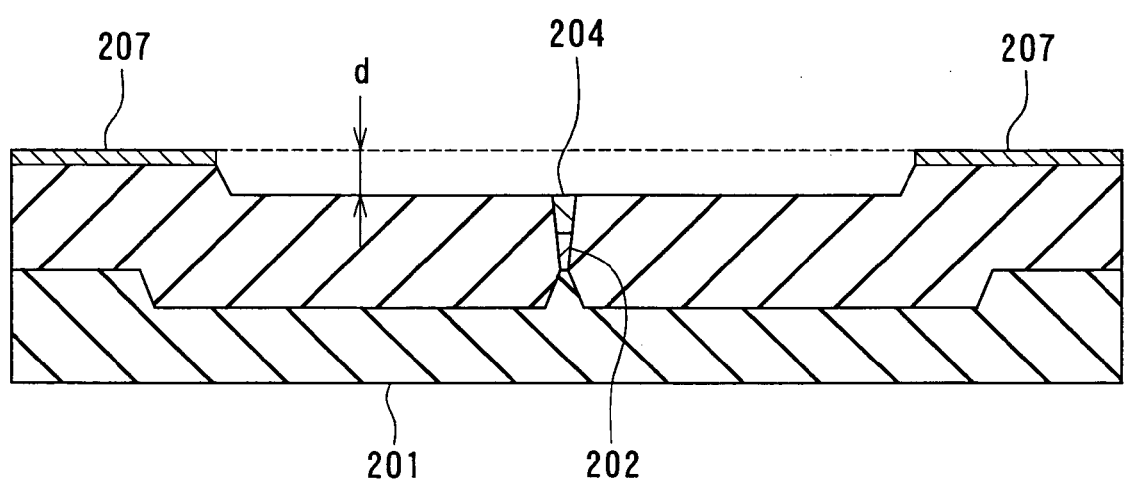
FIG. 61 is a view for illustrating a step that follows the step shown in FIG. 60.

FIG. 57A and FIG. 57B illustrate the following step. The steps that follow are the same as those of the fourth embodiment. That is, in the step illustrated in FIG. 57A and FIG. 57B, first, a portion of the gap layer 18 away from the medium facing surface 30 is selectively etched to form an opening in the gap layer 18. Next, the first layer 20A is formed on the gap layer 18, and the yoke layer 20G is formed on a portion of the pole layer 16 where the opening of the gap layer 18 is formed.

Next, the nonmagnetic layer 43 is formed on the entire top surface of the layered structure. The nonmagnetic layer 43 is made of a material the same as the material of the nonmagnetic layer 21 of the first embodiment. Next, the nonmagnetic layer 43 is polished by CMP, for example, so that the first layer 20A and the yoke layer 20G are exposed, and the top surfaces of the first layer 20A, the yoke layer 20G and the nonmagnetic layer 43 are thereby flattened.

Next, the insulating layer 44 made of alumina and having a thickness that falls within a range of 0.2 to 0.3 µm inclusive, for example, is formed by sputtering, for example, on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20G at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20. The shield layer 20 of the sixth embodiment incorporates the first layer 20A, the yoke layer 20G, the second layer 20C, the coupling layer 20D and the third layer 20E.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the sixth embodiment, it is possible through the first and second polishing steps to control the thickness of the pole layer 16 with high accuracy as in the second embodiment. It is thereby possible to control the track width with high accuracy. According to the sixth embodiment, the upper polishing stopper layer 64 made of a nonmagnetic conductive material is formed between the pole-layer-encasing layer 53 and the pole layer 16 in the groove 53a of the encasing layer 53. It is thereby possible to easily implement a small track width and to control the track width with accuracy by the thickness of the polishing stopper layer 64.

The remainder of configuration, operation and effects of the sixth embodiment are similar to those of the fifth embodiment.

In the sixth embodiment the lower polishing stopper layer 61 may be removed as in the modification example of the second embodiment. In the sixth embodiment the shield layer 20 may have a structure of the shield layer 20 of the second modification example of the first embodiment.

The present invention is not limited to the foregoing embodiments but may be practiced in still other ways. For example, a coil wound around the pole layer 16 in a helical manner may be provided in any of the embodiments in place of the flat-whorl-shaped coils 9 and 22.

In the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
   a medium facing surface that faces toward a recording medium;
   a coil for generating a magnetic field corresponding to data to be written on the recording medium;
   a pole layer having an end face located in the medium facing surface, allowing a magnetic flux corresponding to the field generated by the coil to pass therethrough, and generating a write magnetic field for writing the data on the recording medium through the use of a perpendicular magnetic recording system;
   a pole-layer-encasing layer made of a nonmagnetic material and having a groove that opens in a top surface of the encasing layer and accommodates the pole layer; and
   a nonmagnetic conductive layer made of a nonmagnetic conductive material and disposed on the top surface of the encasing layer, wherein
   the nonmagnetic conductive layer has a penetrating opening having an edge located directly above an edge of the groove located in the top surface of the encasing layer.

2. The magnetic head according to claim 1, further comprising a substrate on which the encasing layer, the pole layer, the nonmagnetic conductive layer and the coil are stacked, wherein:
   the end face of the pole layer located in the medium facing surface has: a first side close to the substrate; a second side located opposite to the first side; a third side connecting an end of the first side to an end of the second side; and a fourth side connecting the other end of the first side to the other end of the second side;
   the second side defines a track width; and
   the end face of the pole layer has a width that decreases as a distance from the first side decreases.

3. The magnetic head according to claim 1, further comprising a nonmagnetic film made of a nonmagnetic material and disposed in the groove between the encasing layer and the pole layer.

* * * * *